(12) United States Patent
Isoya et al.

(10) Patent No.: US 11,480,126 B2
(45) Date of Patent: Oct. 25, 2022

(54) FLOW-VOLUME DETECTING APPARATUS UTILIZING FILTER SELECTION

(71) Applicant: Hitachi Automotive Systems, Ltd., Hitachinaka (JP)

(72) Inventors: Yuki Isoya, Hitachinaka (JP); Hiroaki Hoshika, Hitachinaka (JP); Takahiro Miki, Hitachinaka (JP); Takayuki Yogo, Hitachinaka (JP); Takeo Hosokawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 833 days.

(21) Appl. No.: 16/334,112

(22) PCT Filed: Sep. 15, 2017

(86) PCT No.: PCT/JP2017/033401
§ 371 (c)(1),
(2) Date: Mar. 18, 2019

(87) PCT Pub. No.: WO2018/074120
PCT Pub. Date: Apr. 26, 2018

(65) Prior Publication Data
US 2019/0368439 A1    Dec. 5, 2019

(30) Foreign Application Priority Data

Oct. 19, 2016   (JP) .............................. JP2016-204856

(51) Int. Cl.
*G01F 1/05*     (2006.01)
*F02D 41/18*    (2006.01)
*G01F 15/06*    (2022.01)

(52) U.S. Cl.
CPC ............... *F02D 41/18* (2013.01); *G01F 1/05* (2013.01); *G01F 15/06* (2013.01)

(58) Field of Classification Search
None
See application file for complete search history.

(56) References Cited

U.S. PATENT DOCUMENTS

| 3,522,449 | A | * | 8/1970 | McMurtrie | ........ H03H 11/0405 |
| | | | | | 327/555 |
| 5,005,425 | A | * | 4/1991 | Ohmae | ................. G01F 1/3282 |
| | | | | | 73/861.23 |
| 2016/0209255 | A1 | * | 7/2016 | Doi | ........................ G01F 1/696 |

FOREIGN PATENT DOCUMENTS

JP    S57-175217 A    10/1982
JP    S64-032050 A    2/1989
(Continued)

OTHER PUBLICATIONS

International Search Report issued in corresponding application No. PCT/JP2017/0334014, dated Nov. 14, 2017.

*Primary Examiner* — Brandi N Hopkins
*Assistant Examiner* — Nigel H Plumb
(74) *Attorney, Agent, or Firm* — Foley & Lardner LLP

(57) ABSTRACT

A flow-volume detecting apparatus including a flow-volume detecting unit which measures a flow volume of a measured fluid, a flow-volume state determining unit which determines a flow-volume state of the measured fluid based on an output from the flow-volume detecting unit. The flow-volume detecting apparatus further including a plurality of filters which process a flow-volume signal, and a filter selecting unit which selects a filter that processes the flow-volume signal, wherein the filter selecting unit selects the filter that processes the flow-volume signal according to the flow-volume state determined by the flow-volume state determining unit.

7 Claims, 49 Drawing Sheets

(56) References Cited

FOREIGN PATENT DOCUMENTS

| | | |
|---|---|---|
| JP | H1-267422 A | 10/1989 |
| JP | 2001-003804 A | 1/2001 |
| JP | 2015-049135 A | 3/2015 |

\* cited by examiner (b) CROSS-SECTIONAL VIEW TAKEN ALONG B-B

CROSS-SECTIONAL VIEW
TAKEN ALONG LINE B-B

CROSS-SECTIONAL VIEW
TAKEN ALONG LINE B-B

CROSS-SECTIONAL VIEW
TAKEN ALONG LINE C-C

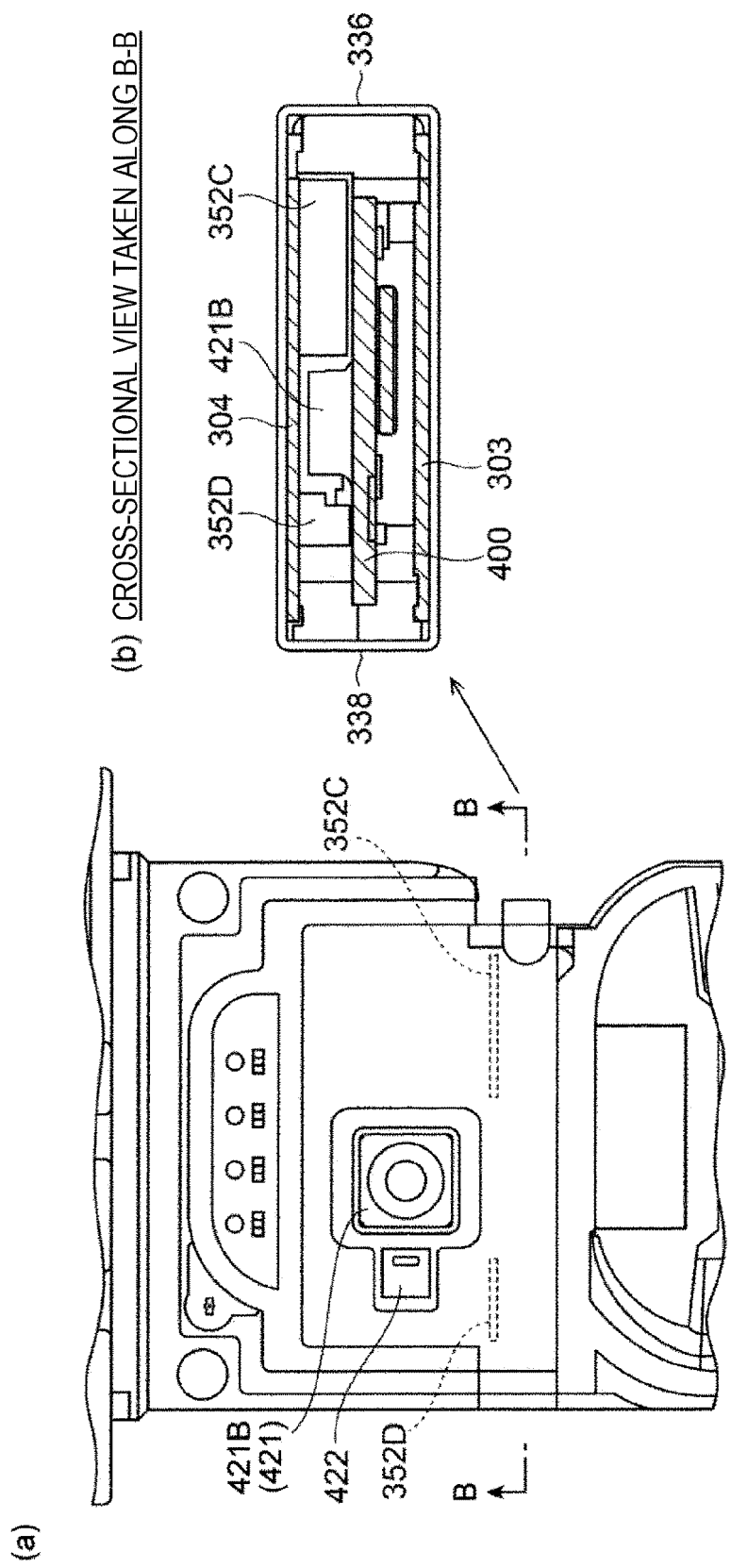

FLOW-VOLUME DETECTING APPARATUS UTILIZING FILTER SELECTION

TECHNICAL FIELD

The present invention relates to a physical quantity detecting apparatus for detecting a physical quantity of intake air of an internal combustion engine.

BACKGROUND ART

JP 2001-003804 A (PTL 1) discloses an intake state detecting device which effectively removes a noise component caused by intake pulsation from a signal indicating an intake state of an engine, such as an intake air amount, in a total rotation region of the engine without causing an increase in cost. This intake air state detecting device is configured to make an air quantity signal including a vibration component caused by intake pulsation from an air flow sensor pass through a filter unit which includes a band-rejection filter in which a center frequency of a rejection band changes in synchronization with a frequency of the intake pulsation and a second-order low pass filter which filters the air quantity signal in a radio frequency region equal to or higher than a practical frequency of the band-rejection filter (see an abstract). More specifically, the intake air state detecting device includes intake parameter detection means which detects a parameter indicative of the intake state of the engine, engine revolutions per minute detection means which detects a revolutions per minute of the engine, a band-rejection filter which has a center frequency of a rejection band varying depending on an engine revolutions per minute detected by the engine revolutions per minute detection means and filters an output signal from intake parameter detection means, a high-order low pass filter which filters the output signal from the intake parameter detection means in a high rotation region equal to or higher than a predetermined engine revolutions per minute, and filter function suppression means which reduces a function of the band-rejection filter operating in a low rotation region equal to or lower than the predetermined engine revolutions per minute in a low load region of the engine (see paragraphs 0011 and 0015).

CITATION LIST

Patent Literature

PTL 1: JP 2001-003804 A

SUMMARY OF INVENTION

Technical Problem

The intake state detecting device of PTL 1 does not sufficiently consider detection characteristics of the intake parameter detection means. Therefore, when the intake pulsation caused by the revolutions per minute and the load of the engine does not match the detection characteristics of the intake parameter detection means, the noise component caused by the intake pulsation according to the detection characteristics of the intake parameter detection means is unlikely to be removed. Therefore, in order to improve measurement accuracy of a flow volume, it is necessary to remove the noise component due to the intake pulsation according to the detection characteristics of the intake parameter detection means.

An object of the present invention is to provide a flow-volume detecting apparatus capable of detecting a flow volume with high accuracy even in a state in which a measurement range is wide and a fluid is pulsating.

Solution to Problem

In order to achieve the above object, a flow-volume detecting apparatus of the present invention includes: a flow-volume detecting unit which measures a flow volume of a measured fluid; a flow-volume state determining unit which determines a flow-volume state of the measured fluid based on an output from the flow-volume detecting unit, a plurality of filters which process a flow-volume signal; and a filter selecting unit which selects a filter that processes the flow-volume signal, in which the filter selecting unit selects the filter that processes the flow-volume signal according to the flow-volume state determined by the flow-volume state determining unit.

Advantageous Effects of Invention

According to the present invention, it is possible to reduce the detection error of the flow volume by mainly applying the filter corresponding to the intake pulsation in the state in which the measured fluid is pulsating. Meanwhile, it is possible to reduce the detection error of the flow volume by mainly applying the filter corresponding to the noise component other than the intake pulsation in the case in which, for example, the flow volume of the measured fluid is small. As a result, the flow-volume detecting apparatus of the present invention can handle the wide measurement flow-volume range and various flow-volume states.

In addition, problems, configurations and effects other than those described above will be apparent from the description of the following embodiments.

BRIEF DESCRIPTION OF DRAWINGS

FIG. 2-1 is a front view of the physical quantity detecting apparatus.

FIG. 2-2 is a rear view of the physical quantity detecting apparatus.

FIG. 2-3 is a left side view of the physical quantity detecting apparatus.

FIG. 2-4 is a right side view of the physical quantity detecting apparatus.

FIG. 2-5 is a plan view of the physical quantity detecting apparatus.

FIG. 2-6 is a bottom view of the physical quantity detecting apparatus.

FIG. 3-1 is a front view showing a state in which a front cover is removed from the physical quantity detecting apparatus.

FIG. 3-2 is a rearview showing a state in which a back cover is removed from the physical quantity detecting apparatus.

FIG. 3-3 is a left side view showing a state in which the front cover and the back cover are removed from the physical quantity detecting apparatus.

FIG. 3-4 is a right side view showing the state in which the front cover and the back cover are removed from the physical quantity detecting apparatus.

FIG. 3-5 is a cross-sectional view taken along line A-A in FIG. 3-1.

FIG. 4-1 is a rear view for describing another embodiment of a housing.

FIG. 4-2 is a right side view of the housing shown in FIG. 4-1.

FIG. 5 is a view for describing a configuration of the front cover.

FIG. 6 is a view for describing a configuration of the back cover.

FIG. 7-1 is a front view of a circuit board.

FIG. 7-2 is a right side view of the circuit board.

FIG. 7-3 is a rear view of the circuit board.

FIG. 7-4 is a left side view of the circuit board.

FIG. 7-5 is a cross-sectional view taken along line B-B in FIG. 7-1.

FIG. 7-6 is a view showing another embodiment corresponding to the cross-sectional view taken along line B-B in FIG. 7-1.

FIG. 7-7 is a cross-sectional view taken along line C-C in FIG. 7-1.

FIG. 8-1 is a diagram for describing a structure of a sensor chamber, in which FIG. 8-1(*a*) is an enlarged view of the sensor chamber and FIG. 8-1(*b*) is a cross-sectional view taken along line E1-E1 in FIG. 8-1(*a*).

FIG. 8-2 is a diagram for describing a structure of another embodiment of a sensor chamber, in which FIG. 8-2 (*a*) is an enlarged view of the sensor chamber and FIG. 8-2 (*b*) is a cross-sectional view taken along line E2-E2 in FIG. 8-2(*a*).

FIG. 8-3 is a diagram for describing a structure of still another embodiment of a sensor chamber, in which FIG. 8-3 (*a*) is an enlarged view of the sensor chamber and FIG. 8-3(*b*) is a cross-sectional view taken along line E3-E3 in FIG. 8-3(*a*).

FIG. 9-1 is a front view showing another embodiment of a circuit board.

FIG. 9-2 is a front view showing another embodiment of the circuit board.

FIG. 9-3 is a front view showing another embodiment of the circuit board.

FIG. 9-4 is a front view showing another embodiment of the circuit board.

FIG. 9-5 is a front view showing another embodiment of the circuit board.

FIG. 9-6 is a front view showing another embodiment of the circuit board.

FIG. 9-7 is a front view showing another embodiment of the circuit board.

FIG. 9-8 is a front view showing another embodiment of the circuit board.

FIG. 10-1 is a view for describing a structure of a terminal connecting portion.

FIG. 10-2 is a view for describing a structure of the terminal connecting portion.

FIG. 10-3 is a cross-sectional view taken along line F-F in FIG. 10-1.

FIG. 10-4 is a cross-sectional view taken along line G-G in FIG. 10-2.

FIG. 11-1 is a diagram for describing an example of a circuit configuration of the physical quantity detecting apparatus.

FIG. 11-2 is a diagram for describing another embodiment of the circuit configuration of the physical quantity detecting apparatus.

FIG. 12-1 is a block diagram showing a configuration of a physical quantity detecting apparatus according to an embodiment of the present invention.

FIG. 12-2 is a block diagram showing a configuration of a physical quantity detecting apparatus according to an embodiment of the present invention.

FIG. 12-3 is a block diagram showing a configuration of a physical quantity detecting apparatus according to an embodiment of the present invention.

FIG. 15-1 is a diagram showing a relationship between a determination condition and applied filter characteristics, according to an embodiment of the present invention.

FIG. 15-2 is a diagram showing a relationship between a determination condition and applied filter characteristics, according to an embodiment of the present invention.

FIG. 15-3 is a diagram showing a relationship between a determination condition and applied filter characteristics, according to an embodiment of the present invention.

DESCRIPTION OF EMBODIMENTS

Figure 1:
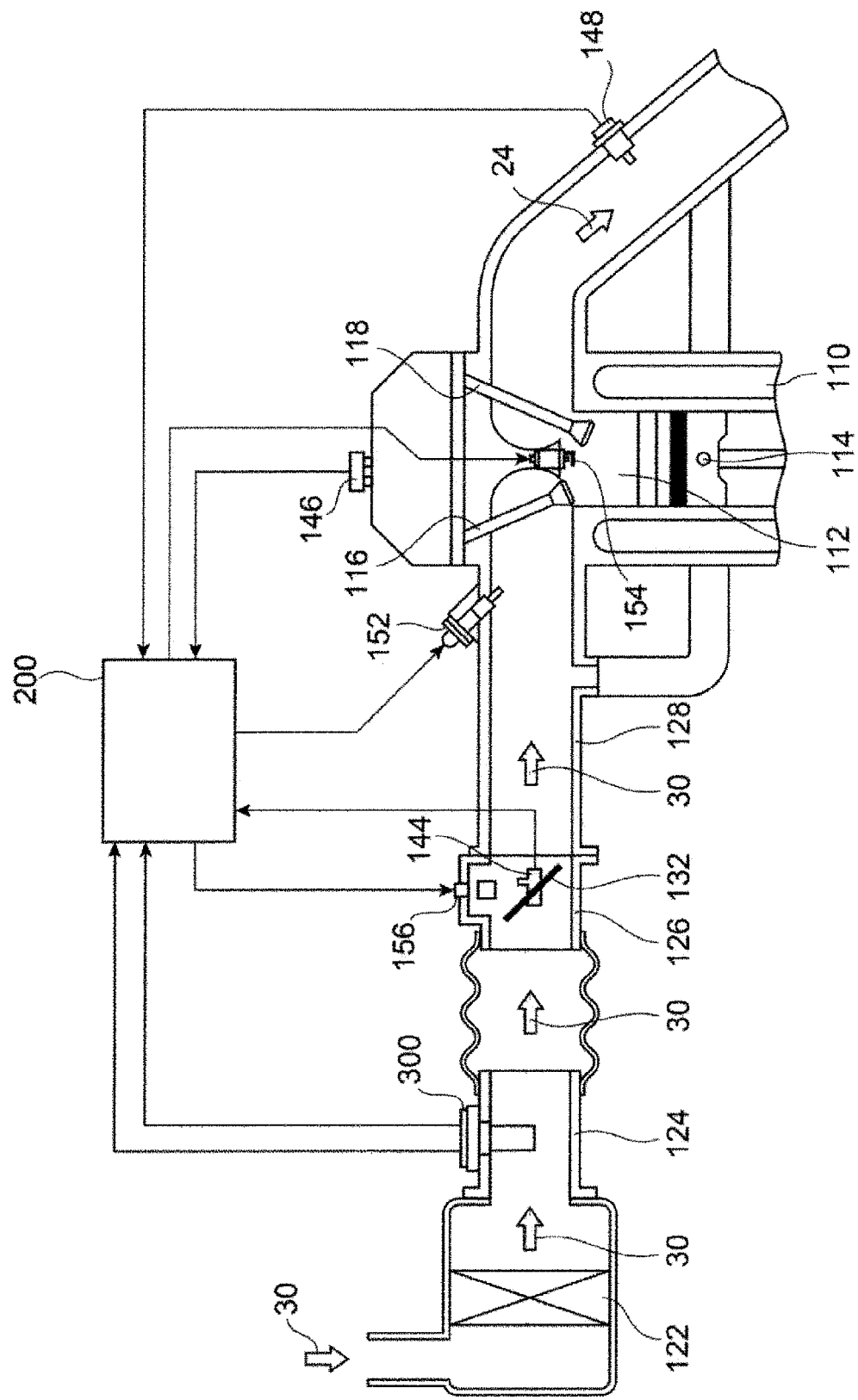
FIG. 1 is a system diagram showing an embodiment using a physical quantity detecting apparatus according to the present invention in an internal combustion engine control system.

Hereinafter, embodiments (hereinafter, referred to as embodiments) for implementing the invention solve various problems which are demanded as actual products, and in particular, are preferably used as a detecting device which detects a physical quantity of intake air of a vehicle, solve various problems, and achieve various effects. One of various problems solved by the following embodiments is contents described in a section of the solution to problem by the invention described above, and one of various effects achieved by the following embodiments is the effects described in a section of the advantageous effects of invention. Various problems solved by the following embodiments and various effects achieved by the following embodiments will be described in the description of the following embodiments. Therefore, the problems and the effects solved by the embodiments described in the following embodiments are also described in contents other than the contents of the section of the solution to problem by the invention and the contents of the advantageous effects of invention.

In the following embodiments, the same reference numerals indicate the same configurations even if drawing numbers are different from each other, and achieve the same action and effect. Regarding the configurations already described, only the reference numerals are attached to the drawings, and the description thereof may be omitted.

Embodiment Using Physical Quantity Detecting Apparatus According to the Present Invention in Internal Combustion Engine Control System FIG. 1 is a system diagram showing an embodiment using a physical quantity detecting apparatus according to the present invention in an internal combustion engine control system of an electronic fuel injection system. Based on an operation of an internal combustion engine 110 which includes an engine cylinder 112 and an engine piston 114, intake air is sucked from an air cleaner 122 as a measured gas 30, and is guided to a combustion chamber of the engine cylinder 112 via, for example, an intake body, a throttle body 126, and an intake manifold 128 which are a main passage 124. The physical quantity of the measured gas 30 which is the intake air guided to the combustion chamber is detected by the physical quantity detecting apparatus 300 according to the present invention, and fuel is supplied from a fuel injection valve 152 based on the detected physical quantity and is guided to the combustion chamber in a mixed gas state together with the intake air 30. In the present embodiment, the fuel injection valve 152 is provided in an intake port of the internal combustion engine, and the fuel injected into the intake port forms the mixed gas together with the measured gas 30 which is the intake air and is guided to the combustion chamber via an intake valve 116 to be combusted, thereby generating mechanical energy.

The fuel and the air guided to the combustion chamber form the mixed state of the fuel with the air, and explosively combusted by a spark ignition of an ignition plug 154 to generate mechanical energy. The gas after the combustion is guided from the exhaust valve 118 to an exhaust pipe and discharged from the exhaust pipe to the outside of the vehicle as an exhaust gas 24. A flow volume of the measured gas 30 which is the intake air guided to the combustion chamber is controlled by a throttle valve 132 whose opening degree varies based on an operation of an accelerator pedal. A fuel supply quantity is controlled based on the flow volume of the intake air guided to the combustion chamber, and a driver controls the opening degree of the throttle valve 132 to control the flow volume of the intake air guided to the combustion chamber, thereby controlling the mechanical energy generated by the internal combustion engine.

1.1 Outline of Control of Internal Combustion Engine Control System

The physical quantities such as the flow volume, the temperature, the humidity, and the pressure of the measured gas 30 taken in from the air cleaner 122 and flowing through the main passage 124 are detected by the physical quantity detecting apparatus 300, and the electrical signal indicating the physical quantity of the intake air from the physical quantity detecting apparatus 300 is input to a control device 200. In addition, an output from a throttle angle sensor 144 which measures an opening degree of the throttle valve 132 is input to the control device 200, and an output from a rotation angle sensor 146 is input to the control device 200 in order to measure a position or a state of the engine piston 114, the intake valve 116, or the exhaust valve 118 of the internal combustion engine and further a rotation speed of the internal combustion engine. In order to measure a state of a mixed ratio of a fuel quantity with an air quantity from the state of the exhaust gas 24, the output from an oxygen sensor 148 is input to the control device 200.

Based on the physical quantity of the intake air which is the output from the physical quantity detecting apparatus 300 and the rotation speed of the internal combustion engine which is measured based on the output from the rotation angle sensor 146, the control device 200 calculates a fuel injection quantity or ignition timing. Based on these calculation results, the fuel quantity supplied from the fuel injection valve 152 or the ignition timing ignited by the ignition plug 154 are controlled. The fuel supply quantity and the ignition timing are actually controlled carefully based on the change state of the temperature or the throttle angle detected by the physical quantity detecting apparatus 300, the change state of the engine rotation speed, and a state of an air fuel ratio measured by the oxygen sensor 148. Further, the control device 200 controls the air quantity bypassing the throttle valve 132 by an idle air control valve 156 in an idle operation state of the internal combustion engine, and controls the rotation speed of the internal combustion engine in the idle operation state.

1.2 Importance of Improving Detection Accuracy of Physical Quantity Detecting Apparatus and Installation Environment of Physical Quantity Detecting Apparatus Any of the fuel supply amount or the ignition timing which is the main control quantity of the internal combustion engine is calculated using the output of the physical quantity detecting apparatus 300 as a main parameter. Therefore, it is important to improve detection accuracy of the physical quantity detecting apparatus 300, suppress a change with time, improve reliability, improve control accuracy of a vehicle, or secure reliability Particularly in recent years, the demand for fuel saving of a vehicle is very high, and the demand for purification of the exhaust gas is very high. In order to meet these demands, it is extremely important to improve the detection accuracy of the physical quantity of the intake air 30 detected by the physical quantity detecting apparatus 300. In addition, it is also important that the physical quantity detecting apparatus 300 maintains high reliability.

A vehicle in which the physical quantity detecting apparatus 300 is mounted is used in the environment where the change in temperature or humidity is large. It is preferable that the physical quantity detecting apparatus 300 takes measures to cope with the change in temperature or humidity in its use environment and cope with dust and contaminants.

In addition, the physical quantity detecting apparatus 300 is mounted on the intake pipe which is affected by heat generation from the internal combustion engine. Therefore, the heat generation of the internal combustion engine is transferred to the physical quantity detecting apparatus 300 via the intake pipe which is the main passage 124. Since the physical quantity detecting apparatus 300 detects the flow volume of the measured gas by performing the heat transfer with the measured gas, it is important to suppress the influence of heat from the outside as much as possible.

As will be described below, the physical quantity detecting apparatus 300 mounted in a vehicle solves the problems described in the section of the solution to problem by the present invention, and achieves only the effects described in the section of the advantageous effects of invention, and furthermore, as will be described below, solves various problems required as products in sufficient consideration of the above-mentioned various problems and achieves various effects. Specific problems to be solved by the physical quantity detecting apparatus 300 or specific effects obtained will be described in the description of the following embodiments 2. Configuration of Physical Quantity Detecting Apparatus 300

2.1 Appearance Structure of Physical Quantity Detecting Apparatus 300

Figures 1, 2:
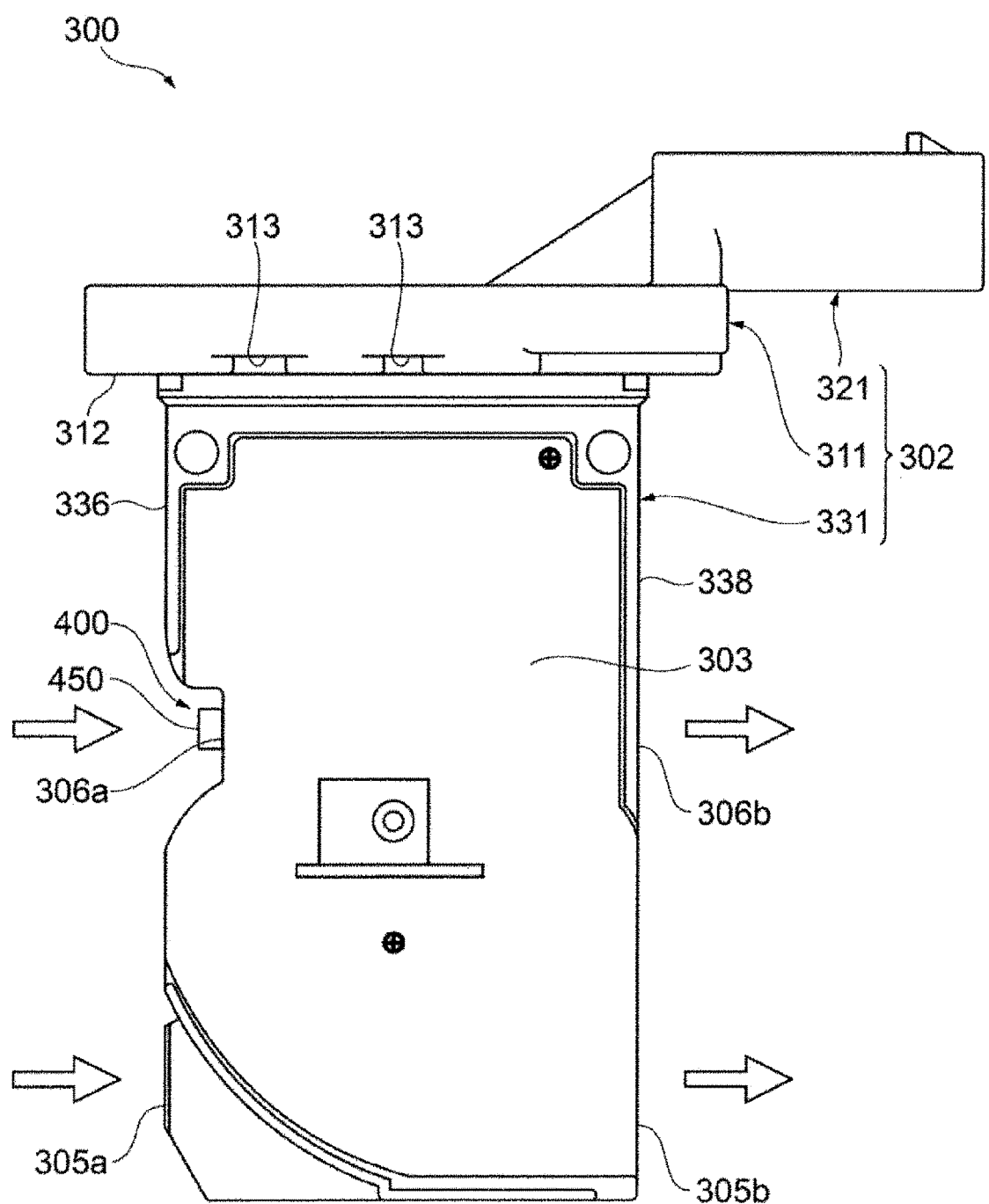
Figure 2:
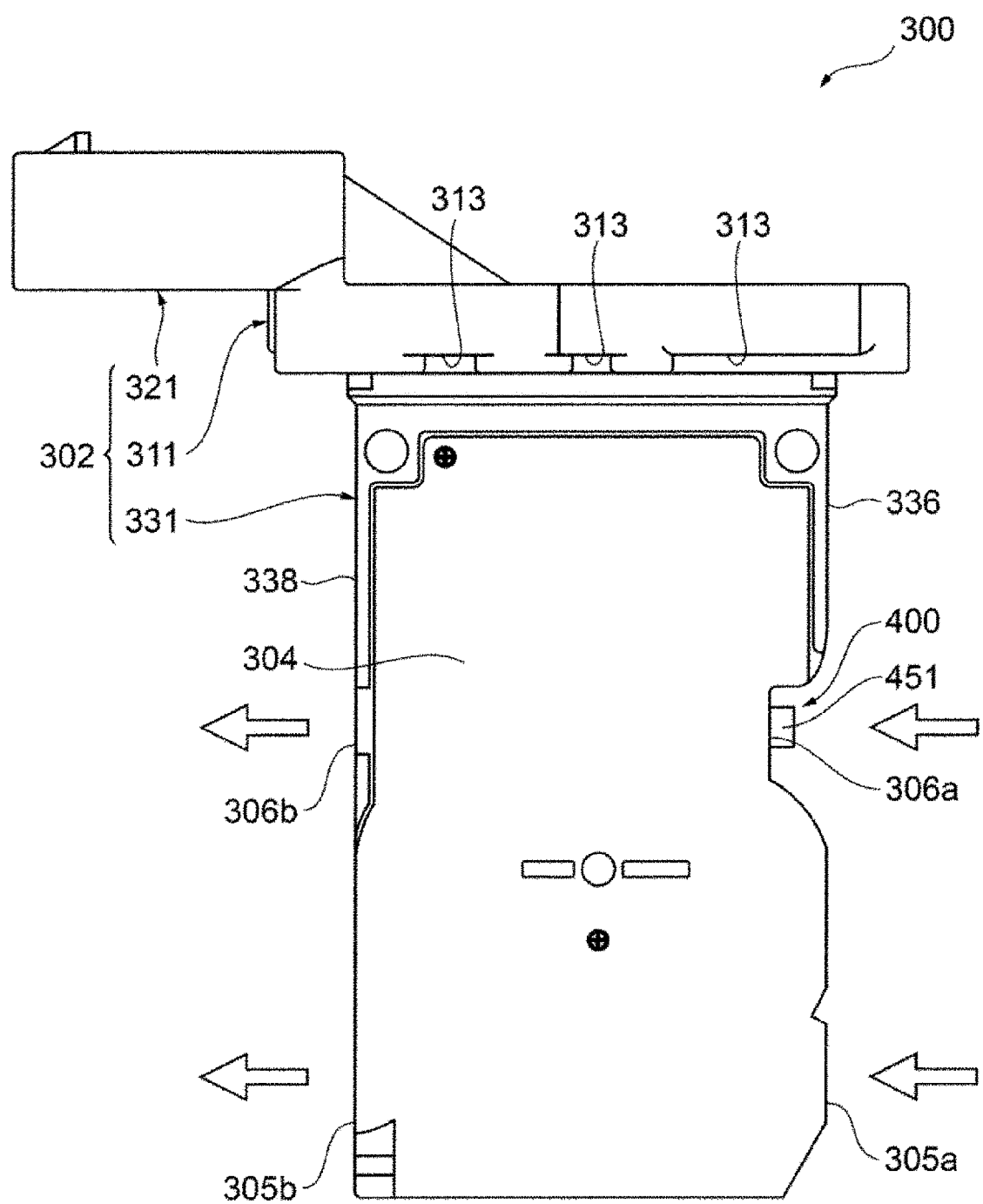
Figures 2, 3:
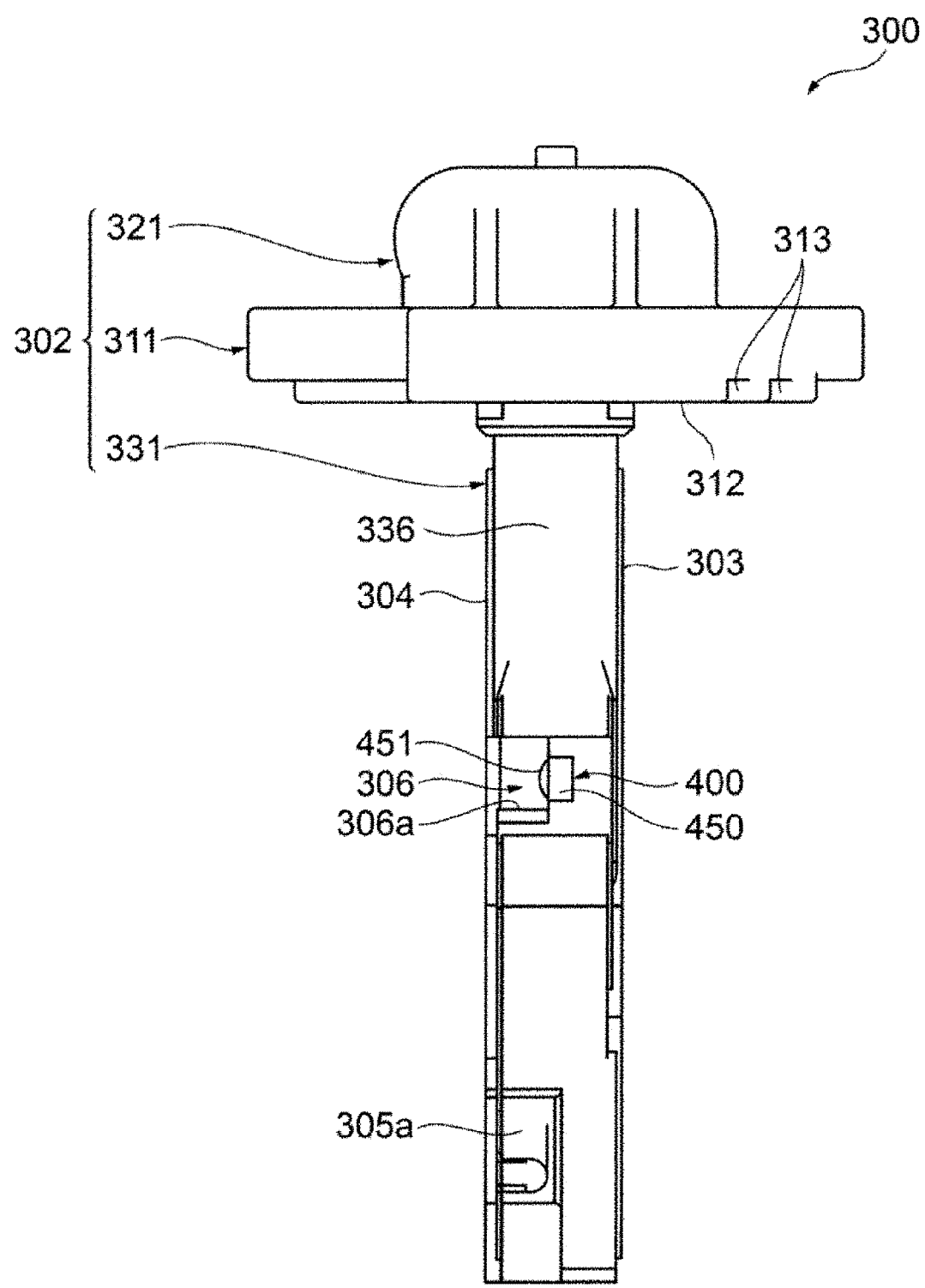
Figures 2, 3, 4:
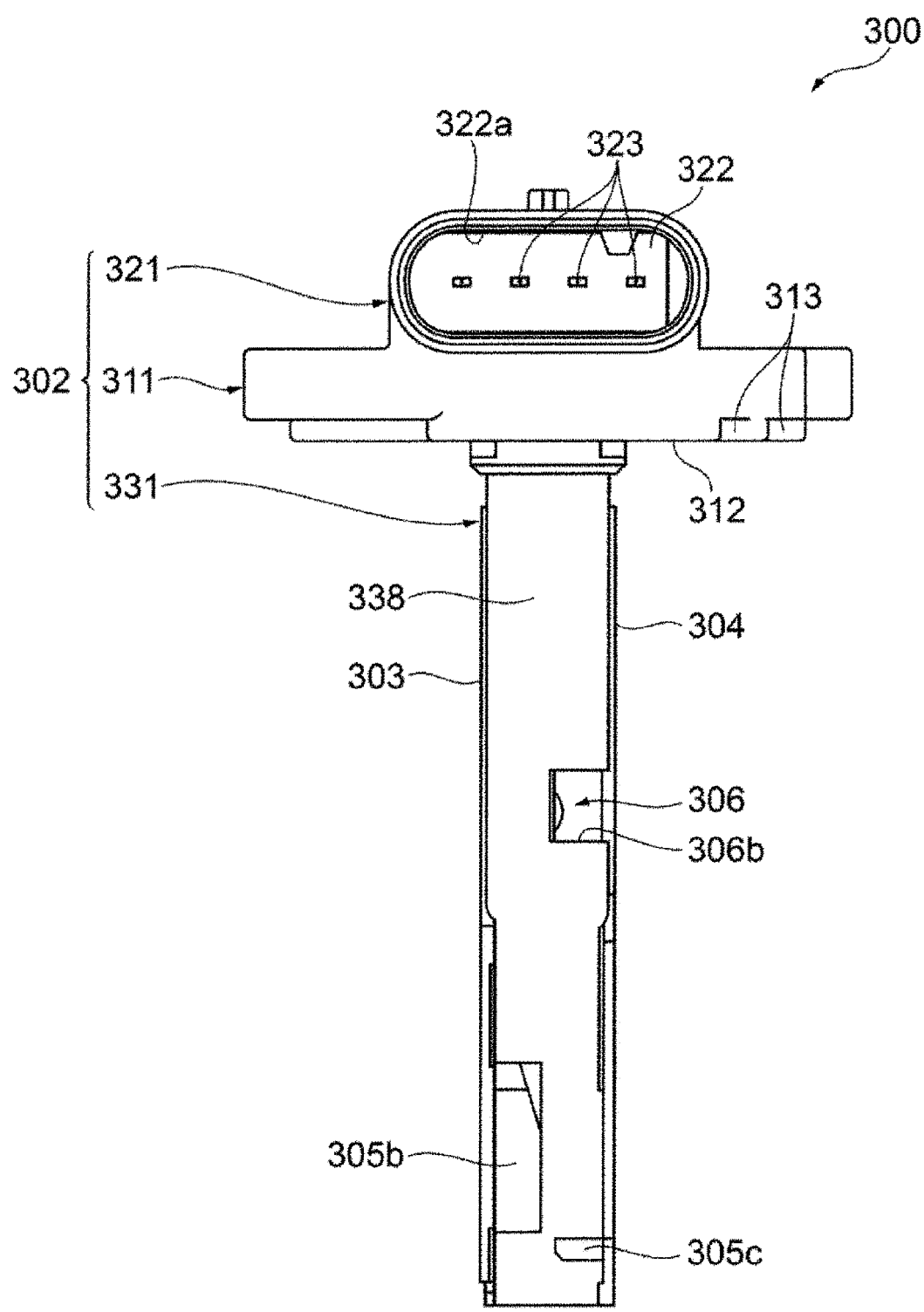

FIGS. 2-1 to 2-6 are views showing the appearance of the physical quantity detecting apparatus 300. FIG. 2-1 is a front view of the physical quantity detecting apparatus 300, FIG. 2-2 is a rear view of the physical quantity detecting apparatus 300, FIG. 2-3 is a left side view of the physical quantity detecting apparatus 300, FIG. 2-4 is a right side view of the physical quantity detecting apparatus 300, FIG. 2-5 is a plan view of the physical quantity detecting apparatus 300, and FIG. 2-6 is a bottom view of the physical quantity detecting apparatus 300.

The physical quantity detecting apparatus 300 includes a housing 302, a front cover 303, and a back cover 304. The housing 302 is formed by molding a synthetic resin material, and includes a flange 311 which fixes the physical quantity detecting apparatus 300 to an intake body which is the main passage 124, an external connecting portion 321 having a connector which protrudes from the flange 311 to electrically connect to external devices, and a measuring unit 331 which extends to protrude from the flange 311 toward a center of the main passage 124.

The measuring unit 331 is provided integrally with a circuit board 400 by being insert-molded when the housing 302 is molded (see FIGS. 3-1 and 3-2). The circuit board 400 is provided with at least one detecting unit which detects the physical quantity of the measured gas 30 flowing through the main passage 124 and a circuit unit which processes the signal detected by the detecting unit. The detecting unit is disposed at a position exposed to the measured gas 30, and the circuit unit is disposed in a circuit chamber hermetically sealed by a front cover 303.

A sub-passage groove is provided on a front surface and aback surface of the measuring unit 331, and a first sub-passage 305 is formed in cooperation with the front cover 303 and the back cover 304. A tip of the measuring unit 331 is provided with a first sub-passage inlet 305a which takes a part of the measured gas 30 such as the intake gas in the first sub-passage 305 and a first sub-passage outlet 305b which makes the measured gas 30 returns from the first sub-passage 305 to the main passage 124. A part of the circuit board 400 protrudes in the halfway of the passage of the first sub-passage 305, and the protruding part of the circuit board 400 is provided with a flow-volume detecting unit 602 (see FIG. 3-1) which is the detecting unit in order to detect the flow volume of the measured gas 30.

An intermediate part of the measuring unit 331 closer to the flange 311 than the first sub-passage 305 is provided with a second sub-passage 306 which takes a part of the measured gas 30 such as the intake air in a sensor chamber Rs. The second sub-passage 306 is formed in cooperation with the measuring unit 331 and the back cover 304. The second sub-passage 306 is provided with a second sub-passage inlet 306a which opens to an upstream side outer wall 336 in order to take in the measured gas 30 and a second sub-passage outlet 306b which opens to a downstream side outer wall 338 in order to make the measured gas 30 return from the second sub-passage 306 to the main passage 124. The second sub-passage 306 communicates with the sensor chamber Rs which is formed on a back surface of the measuring unit 331. The sensor chamber Rs is provided with a pressure sensor and a humidity sensor which are the detecting units provided on a back surface of the circuit board 400.

2.2 Effect Based on Appearance Structure of Physical Quantity Detecting Apparatus 300

In the physical quantity detecting apparatus 300, the intermediate part of the measuring unit 331 which extends from the flange 311 toward a central direction of the main passage 124 is provided with the second sub-passage inlet 306a, and the tip of the measuring unit 331 is provided with the first sub-passage inlet 305a. Therefore, it is possible to take a gas, which is not in the vicinity of an inner wall surface of the main passage 124 but in the vicinity of a central part spaced apart from the inner wall surface, in the first sub-passage 305 and the second sub-passage 306, respectively. Therefore, the physical quantity detecting apparatus 300 can measure the physical quantity of the gas at a part apart from the inner wall surface of the main passage 124, and reduce the measurement error of the physical quantity related to a decrease in heat or a flow velocity in the vicinity of the inner wall surface.

The measuring unit 331 has a shape extending long along an axis from an outer wall of the main passage 124 toward the center, but has a shape having a reduced thickness width as shown in FIGS. 2-3 and 2-4. That is, the measuring unit 331 of the physical quantity detecting apparatus 300 has a shape in which the width of the side surface is narrow and the front surface is substantially rectangular. By doing so, the physical quantity detecting apparatus 300 can be provided with the first sub-passage 305 having a sufficient length, and suppress a fluid resistance to be a small value for the measured gas 30. Therefore, the physical quantity detecting apparatus 300 can suppress the fluid resistance to be a small value and measure the flow volume of the measured gas 30 with high accuracy.

2.5 Structure and Effect of Flange 311

A lower surface 312 of the flange 311 opposite to the main passage 124 is provided with a plurality of recesses 313, the heat transfer surface between the measured gas 30 and the main passage 124 is reduced, and the physical quantity detecting apparatus 300 is hardly affected by heat. In the physical quantity detecting apparatus 300, the measuring unit 331 is inserted into amounting hole provided in the main passage 124, and the lower surface 312 of the flange 311 faces the main passage 124. The main passage 124 is, for example, the intake body, and the main passage 124 is often maintained at a high temperature. Conversely, it is conceivable that the main passage 124 is at an extremely low temperature at the time of starting up in a cold region. When such high temperature or low temperature state of the main passage 124 affects the measurement of various physical quantities, measurement accuracy deteriorates. The lower surface 312 of the flange 311 is provided a recess 313, and a space is formed between the lower surface 312 facing the main passage 124 and the main passage 124. Therefore, it is possible to reduce the heat transfer from the main passage 124 to the physical quantity detecting apparatus 300, and to prevent the measurement accuracy from deteriorating due to heat.

Since screw holes 314 of the flange 311 are for fixing the physical quantity detecting apparatus 300 to the main passage 124, a space is formed between the surface facing the main passage 124 around each screw hole 314 and the main passage 124 so that a surface facing the main passage 124 around these screw holes 314 is spaced apart from the main passage 124. By doing so, the flange has a structure which can reduce the heat transfer from the main passage 124 to the physical quantity detecting apparatus 300, and prevent the measurement accuracy from deteriorating due to heat.

2.6 Structure of External Connecting Portion 321

The external connecting portion 321 has a connector 322 which is provided on an upper surface of the flange 311 and protrudes from the flange 311 toward a downstream side in a flow direction of the measured gas 30. The connector 322 is provided with an insertion hole 322a into which a communication cable for connecting to the control device 200 is inserted. An inside of the insertion hole 322a is provided with four external terminals 323 as shown in FIG. 2-4. The external terminal 323 serves as a terminal for outputting information on the physical quantity which is the measurement result of the physical quantity detecting apparatus 300 and a power supply terminal for supplying direct current (DC) power for operating the physical quantity detecting apparatus 300.

The connector 322 has a shape which protrudes from the flange 311 toward the downstream side in the flow direction of the measured gas 30 and is inserted from the downstream side in the flow direction toward the upstream side, but the shape of the connector 322 is limited thereto. For example, the connector may have a shape which vertically protrudes from the upper surface of the flange 311 and is inserted along the extending direction of the measuring unit 331, and can be variously modified.

3. Whole Structure and Effect of Housing 302

Figures 2, 3, 4, 5:
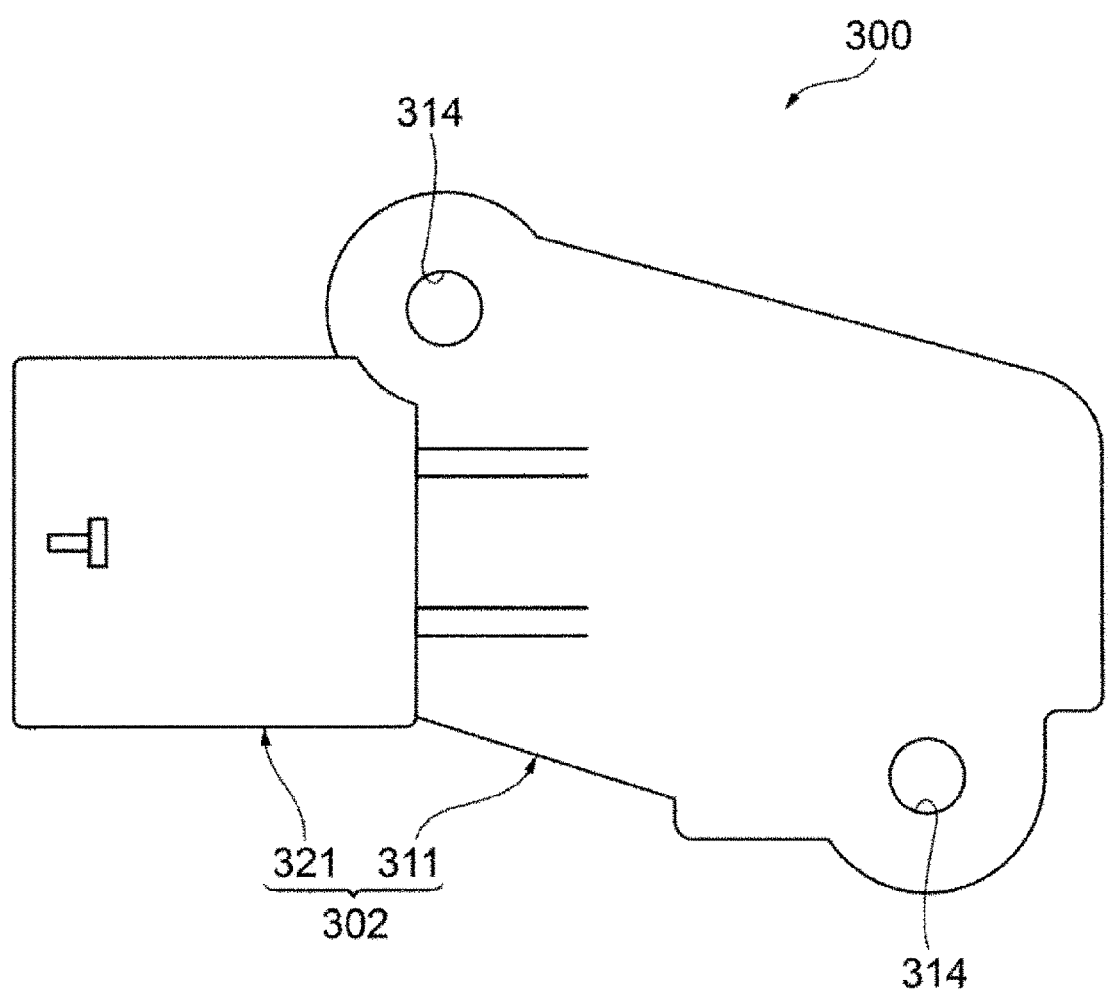

Next, the whole structure of the housing 302 will be described with reference to FIGS. 3-1 to 3-5. FIGS. 3-1 to 3-5 are views showing the state of the housing 302 in which the front cover 303 and the back cover 304 are removed from the physical quantity detecting apparatus 300. FIG. 3-1 is a front view of the housing 302, FIG. 3-2 is a rear view of the housing 302, FIG. 3-3 is a right side view of the housing 302, FIG. 3-4 is a left side view of the housing 302, and FIG. 3-5 is a cross-sectional view taken along line A-A in FIG. 3-1.

The housing 302 has a structure in which the measuring unit 331 extends from the flange 311 toward the center of the main passage 124. The circuit board 400 is insert-molded on a base end side of the measuring unit 331. The circuit board 400 is disposed at an intermediate position between the front surface and the back surface of the measuring unit 331 in parallel with the surface of the measuring unit 331, and integrally molded with the housing 302, and the base end side of the measuring unit 331 is partitioned into one side and the other side in a thickness direction.

The front side of the measuring unit 331 is provided with a circuit chamber Rc in which the circuit unit of the circuit board 400 is housed, and the back side thereof is provided with the sensor chamber Rs in which a pressure sensor 421 and a humidity sensor 422 are housed. The circuit chamber Rc is hermetically sealed by attaching the front cover 303 to the housing 302 and is completely isolated from the outside. Meanwhile, the sensor chamber Rs is formed between the second sub-passage 306 and the indoor space communicating with the outside of the measuring unit 331 via the second sub-passage 306 by attaching the back cover 304 to the housing 302. Apart of the circuit board 400 protrudes from a partition wall 335 partitioning between the circuit chamber Rc of the measuring unit 331 and the first sub-passage 305 into the first sub-passage 305, and a measurement flow passage surface 430 of the protruding part is provided with the flow-volume detecting unit 602.

3.2 Structure of Sub-Passage Groove

The tip of the measuring unit 331 in a longitudinal direction is provided with a sub-passage recess for molding the first sub-passage 305. A sub-passage groove for forming the first sub-passage 305 is provided with a front side sub-passage groove 332 shown in FIG. 3-1 and a back side sub-passage groove 334 shown in FIG. 3-2. As shown in FIG. 3-1, the front side sub-passage groove 332 moves from the first sub-passage outlet 305b opening to the downstream side outer wall 338 of the measuring unit 331 toward the upstream side outer wall 336 to be gradually bent toward the flange 311 which is the base end side of the measuring unit 331, and communicates with an opening portion 333 penetrating through the measuring unit 331 in the thickness direction at a position close to the upstream side outer wall 336. The opening portion 333 is formed along the flow direction of the measured gas 30 of the main passage 124 so as to extend between the upstream side outer wall 336 and the downstream side outer wall 338.

As shown in FIG. 3-2, the back side sub-passage groove 334 moves from the upstream side outer wall 336 toward the downstream side outer wall 338, and is branched into two portions at the intermediate position between the upstream side outer wall 336 and the downstream side outer wall 338.

Meanwhile, the back side sub-passage groove 334 linearly extends as a discharge passage to open to an outlet 305c of the downstream side outer wall 338, but the back side sub-passage groove 334 moves to the downstream side outer wall 338 to be gradually bent to the flange 311 which is the base end side of the measuring unit 331 and communicate with the opening portion 333 at a position in the vicinity of the downstream side outer wall 338.

The back side sub-passage groove 334 forms an inlet groove into which the measured gas 30 flows from the main passage 124 and the front side sub-passage groove 332 forms an outlet groove which makes the measured gas 30 taken in from the back side sub-passage groove 334 return to the main passage 124. Since the front side sub-passage groove 332 and the back side sub-passage groove 334 are provided at the tip of the housing 302, a gas at a portion spaced apart from the inner wall surface of the main passage 124, i.e., a gas flowing in a portion in the vicinity of the central part of the main passage 124 can be taken in as the measured gas 30. The gas flowing in the vicinity of the inner wall surface of the main passage 124 is affected by the temperature of the wall surface of the main passage 124, and often has a temperature different from the average temperature of the gas flowing in the main passage 124 such as the intake air 20. In addition, the gas flowing in the vicinity of the inner wall surface of the main passage 124 often shows a flow velocity lower than the average flow velocity of the gas flowing in the main passage 124. The physical quantity detecting apparatus 300 of the embodiment is hard to be subjected to the influence, such that it is possible to suppress the decrease in measurement accuracy.

As shown in FIG. 3-2, apart of the measured gas 30 flowing through the main passage 124 is taken into the back side sub-passage groove 334 from the first sub-passage inlet 305a and flows in the back side sub-passage groove 334. Foreign matters having a large mass contained in the measured gas 30 flow in the discharge passage linearly extending from the branch together with a part of the measured gas and are discharged from the outlet 305c of the downstream side outer wall 338 to the main passage 124.

The back side sub-passage groove 334 has a shape which becomes deeper as it goes forward, and the measured gas 30 gradually moves to the front side of the measuring unit 331 as it flows along the back side sub-passage groove 334. Particularly, the back side sub-passage groove 334 is provided with a steeply inclined portion 334a which is steeply deepened in front of the opening portion 333, and a part of air having a small mass moves along the steeply inclined portion 334a and flows in the opening portion 333 and flows in the measurement flow passage surface 430 of the circuit board 400. On the other hand, foreign matters having a large mass flow in a measurement flow passage back surface 431 because it is difficult to change a course suddenly.

As shown in FIG. 3-1, the measured gas 30 moved to the front side at the opening portion 333 flows along the measurement flow passage surface 430 of the circuit board, the heat is transferred between the measured gas 30 and the flow-volume detecting unit 602 provided on the measurement flow passage surface 430, and the flow volume is measured. The air flowing from the opening portion 333 to the front side sub-passage groove 332 flows along the front side sub-passage groove 332, and is discharged from the first sub-passage outlet 305b opening to the downstream side outer wall 338 to the main passage 124.

A material having a large mass such as dust mixed in the measured gas 30 has a large inertial force, so it is difficult to steeply change a course toward a deeper portion of the groove along the surface of the steeply inclined portion 334a where the depth of the groove is steeply deepened. For this reason, foreign matters having a large mass move toward the measurement flow passage back surface 431, and the foreign matters can be inhibited from passing through the vicinity of the flow-volume detecting unit 602. In this embodiment, since many foreign matters having a large mass other than the gas pass through the measurement flow passage back surface 431 which is the back surface of the measurement flow passage surface 430, it is possible to suppress the influence of contamination due to foreign matters such as oil, carbon, and dust and to reduce the deterioration in measurement accuracy. That is, since the sub-passage groove has a shape which suddenly changes the course of the measured gas 30 along an axis crossing a flow axis of the main passage 124, it is possible to reduce the influence of foreign matters mixed in the measured gas 30.

3.3 Structure and Effect of Second Sub-Passage and Sensor Chamber

The second sub-passage 306 is formed to linearly extend between the second sub-passage inlet 306a and the second sub-passage outlet 306b in parallel to the flange 311 so as to be along the flow direction of the measured gas 30. The second sub-passage inlet 306a is formed by cutting out a part of the upstream side outer wall 336, and the second sub-passage outlet 306b is formed by cutting out a part of the downstream side outer wall 338. Specifically, as shown in FIG. 3-3, a part of the upstream side outer wall 336 and a part of the downstream side outer wall 338 are cut out from the back side of the measuring unit 331 at a position continuously along on the upper surface of the partition wall 335. The second sub-passage inlet 306a and the second sub-passage outlet 306b are cut out to a depth position that is flush with the back surface of the circuit board 400. The second sub-passage 306 functions as a cooling channel which cools a substrate main body 401 because the measured gas 30 passes along the back surface of the substrate main body 401 of the circuit board 400. The circuit board 400 often has heat of LSI, microcomputer or the like, and these heats can be transferred to the back side of the substrate main body 401 and discharged by the measured gas 30 passing through the second sub-passage 306.

The sensor chamber Rs is disposed closer to the base end side of the measuring unit 331 than the second sub-passage 306. A part of the measured gas 30 flowing from the second sub-passage inlet 306a to the second sub-passage 306 flows in the sensor chamber Rs, and a pressure and a relative humidity are each detected by the pressure sensor 421 and the humidity sensor 422 in the sensor chamber Rs. Since the sensor chamber Rs is disposed closer to the base end side of the measuring unit 331 than the second sub-passage 306, it is possible to reduce the influence of the dynamic pressure of the measured gas 30 passing through the second sub-passage 306. Therefore, it is possible to improve the detection accuracy of the pressure sensor 421 in the sensor chamber Rs.

Since the sensor chamber Rs is disposed closer to the base end side of the measuring unit 331 than the second sub-passage 306, for example, when the tip of the measuring unit 331 is attached to the intake passage in a posture state where it faces downward, it is possible to inhibit contaminants and water droplets, which flow in the second sub-passage 306 together with the measured gas 30, from adhering to the pressure sensor 421 or the humidity sensor 422 disposed on a downstream side of the pressure sensor 421.

In particular, in the present embodiment, since the pressure sensor 421 having a relatively large appearance is disposed on an upstream side in the sensor chamber Rs and the humidity sensor 422 having a relatively small appearance is disposed on the downstream side of the pressure sensor 421, the contaminants or the water droplets flowing together with the measured gas 30 adhere to the pressure sensor 421 and are prevented from adhering to the humidity sensor 422. Therefore, it is possible to protect the humidity sensor 422 having low resistance against the contaminants and the water droplets.

The pressure sensor 421 and the humidity sensor 422 are hardly affected by the flow of the measured gas 30 as compared with the flow-volume detecting unit 602, and in particular, since the humidity sensor 422 is sufficient to ensure a diffusion level of moisture in the measured gas 30, the sensor chamber Rs can be provided adjacent to the linear second sub-passage 306. On the other hand, the flow-volume detecting unit 602 requires a predetermined flow-volume or more, and it is necessary to keep dust and contaminants away from each other, and consider the influence on pulsation. Therefore, the flow-volume detecting unit 602 is provided in the first sub-passage 305 having a loop shape.

FIGS. 4-1 and 4-2 are diagrams showing another form of the second sub-passage.

In this form, the second sub-passage inlet 306a and the second sub-passage outlet 306b are formed by providing a through-hole 337 on the upstream side outer wall 336 and the downstream side outer wall 338 instead of cutting out the upstream side outer wall 336 and the downstream side outer wall 338. Similar to the second sub-passage described above shown in FIGS. 3-2 to 3-5, if the second sub-passage inlet 306a and the second sub-passage outlet 306b are formed by cutting out the upstream side outer wall 336 and the downstream side outer wall 338, respectively, the width of the upstream side outer wall 336 and the width of the downstream side outer wall 338 are locally narrow at the position, so the measuring unit 331 can be distorted in a substantially L shape from the cutout as a starting point due to heat sink or the like during molding. According to this embodiment, since the through-hole is provided instead of the cutout, it is possible to prevent the measuring unit 331 from being bent in a substantially L shape. Therefore, it is possible to prevent the influence on the detection accuracy due to the change in position or direction of the detecting unit with respect to the measured gas 30 in the housing 302 due to the distortion and ensure the predetermined detection accuracy at all times without individual differences.

FIGS. 8-1, 8-2, and 8-3 are diagrams showing another form of the second sub-passage.

The back cover 304 may be provided on the partition wall which partitions between the second sub-passage 306 and the sensor chamber Rs. According to this configuration, the measured gas 30 can indirectly flow from the second sub-passage 306 to the sensor chamber Rs, and the influence of dynamic pressure on the pressure sensor can be reduced, and the contaminants or the water droplets can be inhibited from adhering to the humidity sensor.

Figures 1, 8:
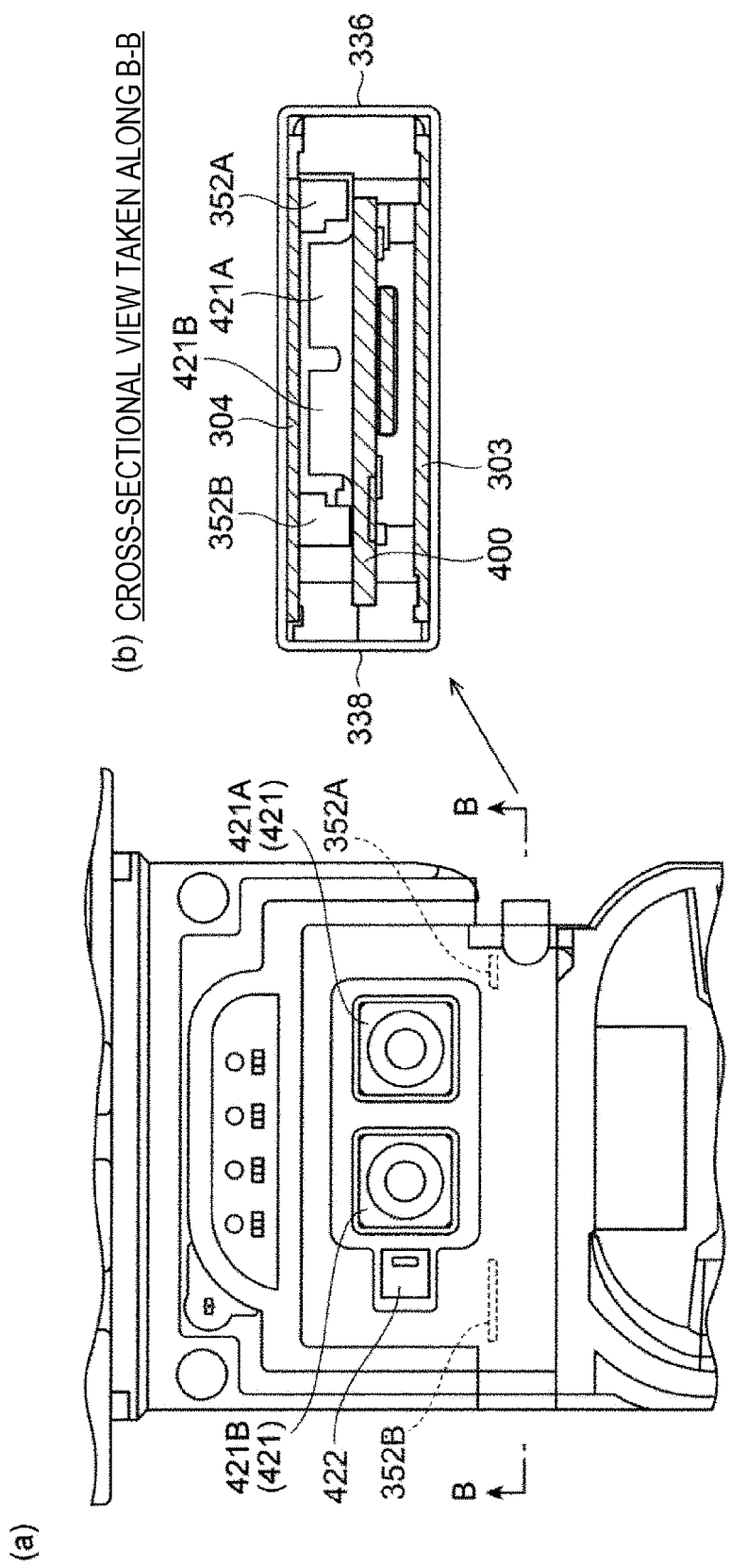
Figures 3, 8:
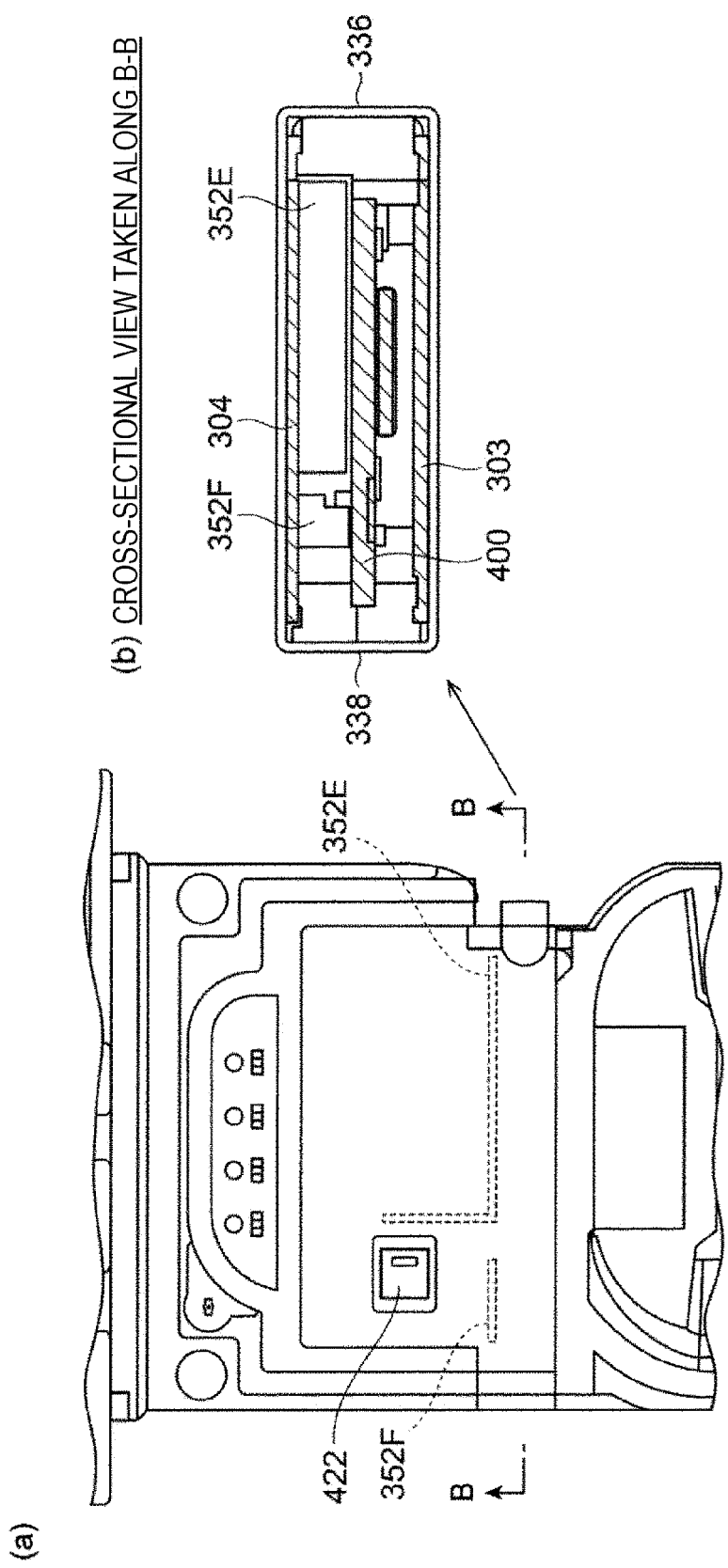

In the example shown in FIG. 8-1, two pressure sensors 421A and 421B are provided in a row along the second sub-passage 306 in the sensor chamber Rs, and one humidity sensor 422 is provided on a downstream side of the pressure chamber 421A and 421B. Partition walls 352A and 352B are provided on the back cover 304, and are disposed so as to extend between the second sub-passage 306 and the sensor chamber Rs by attaching the back cover 304 to the housing 302. Specifically, the partition wall 352A is disposed between the pressure sensor on the upstream side and the upstream wall of the sensor chamber Rs, and the partition wall 352B is disposed between the pressure sensor on the downstream side and the downstream wall of the sensor chamber Rs along the humidity sensor.

In the example shown in FIG. 8-2, only the pressure sensor 421B on the downstream side is shown, and the pressure sensor 421A on the upstream side is omitted, and therefore the partition wall 352C is longer accordingly. Similar to the partition wall 352B in FIG. 8-1, the partition wall 352D on the downstream side is disposed between the pressure sensor on the downstream side and the downstream wall of the sensor chamber Rs along the humidity sensor. Therefore, the partition walls 352A and 352C can prevent the measured gas 30 from directly abutting to the pressure sensor, thereby reducing the influence of the dynamic pressure. In addition, the partition walls 352B and 352D can inhibit the contaminants and the water droplets from adhering to the humidity sensor.

In the example shown in FIG. 8-3, both of the two pressure sensors 421A and 421B are omitted, and only one humidity sensor 422 is provided in the sensor chamber Rs. The partition wall 352E on the upstream side extends from the upstream wall of the sensor chamber Rs to the upstream position of the humidity sensor along the gap between the second sub-passage 306 and the sensor chamber Rs, and is bent at the downstream end and has a substantially L shape facing the upstream side of the humidity sensor. Similar to the partition walls 352B and 352D, the partition wall 352F is disposed between the pressure sensor on the downstream side and the downstream wall of the sensor chamber Rs along the humidity sensor. Therefore, the partition wall 352E can prevent the contaminants and the water droplets contained in the measured gas 30 passing through the second sub-passage 306 from moving toward the humidity sensor, and protect the humidity sensor from these contaminants or the like.

3.4 Shape and Effect of Front Cover 303 and Back Cover 304

Figures 2, 3, 4, 5, 6:
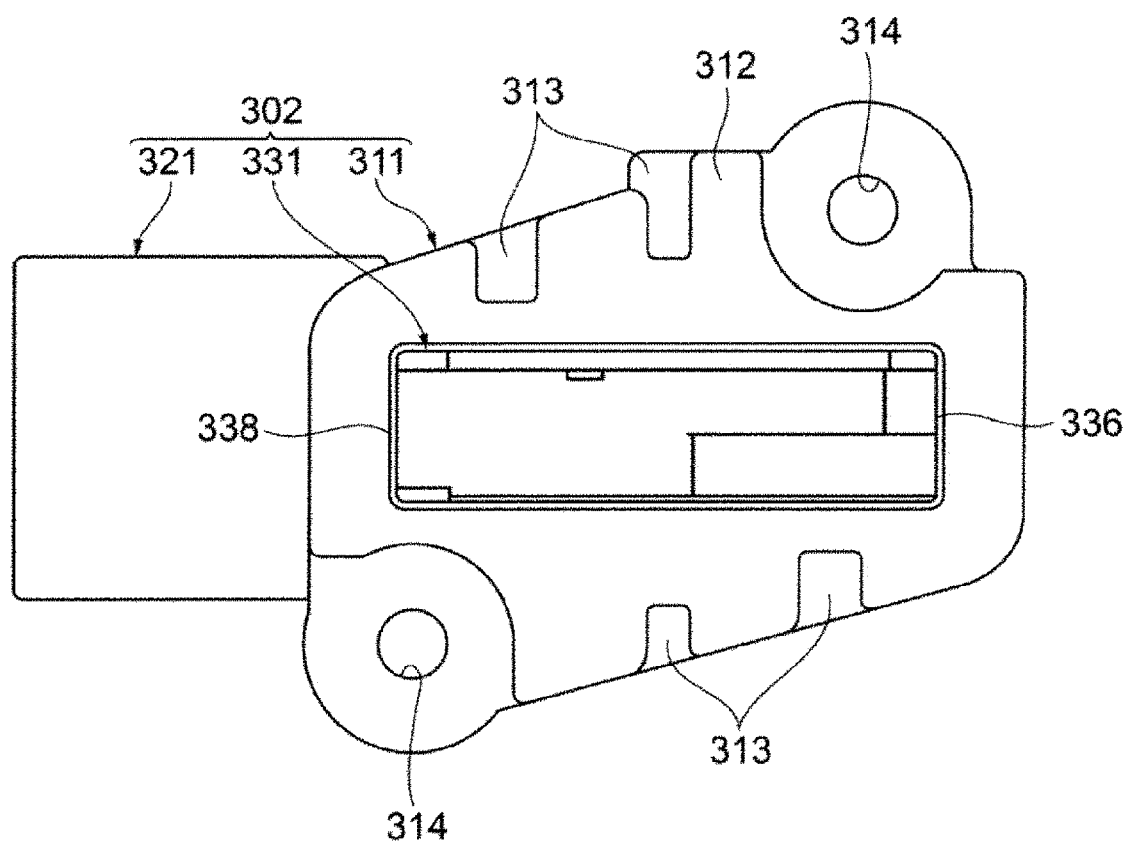
Figures 1, 3:
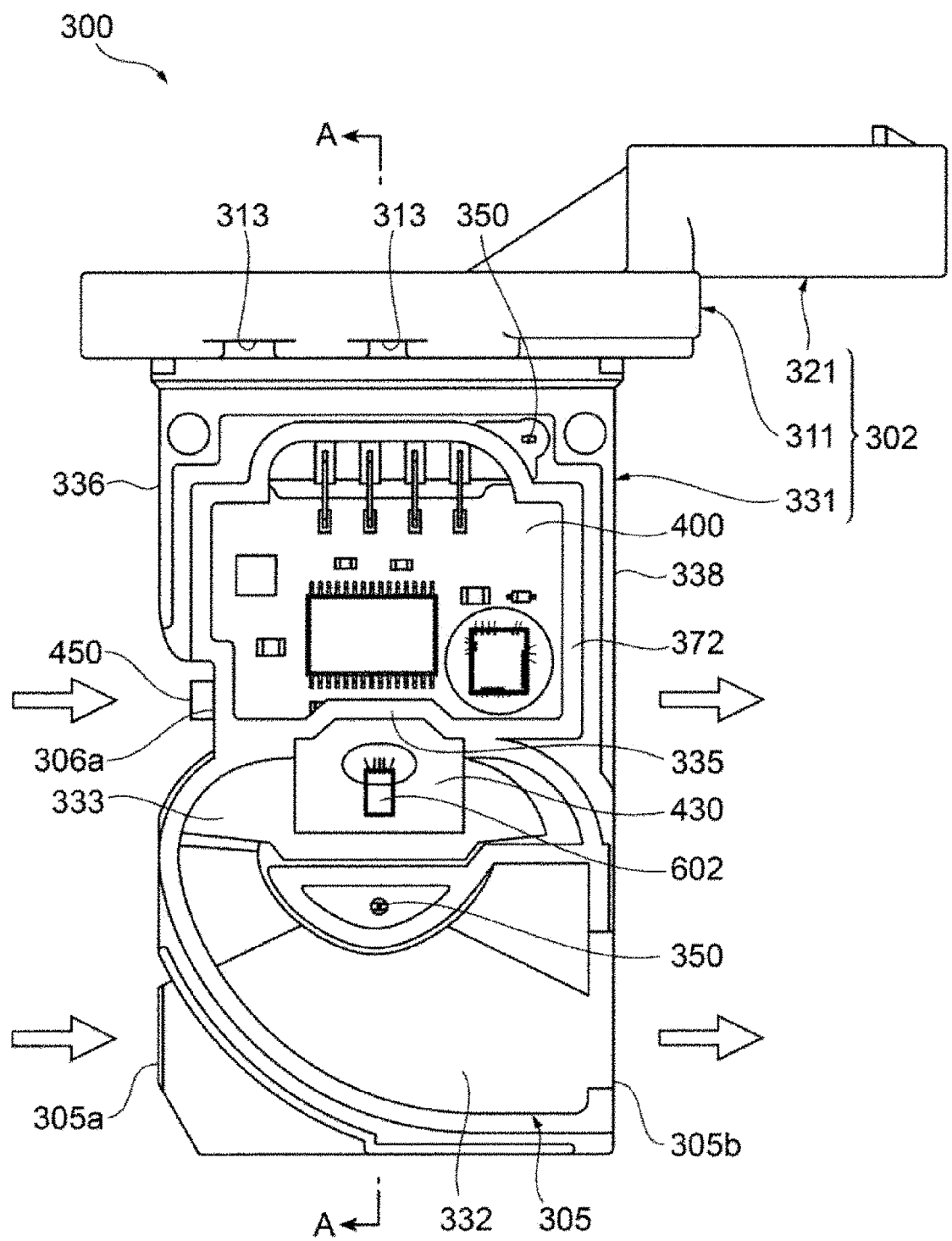
Figures 2, 3:
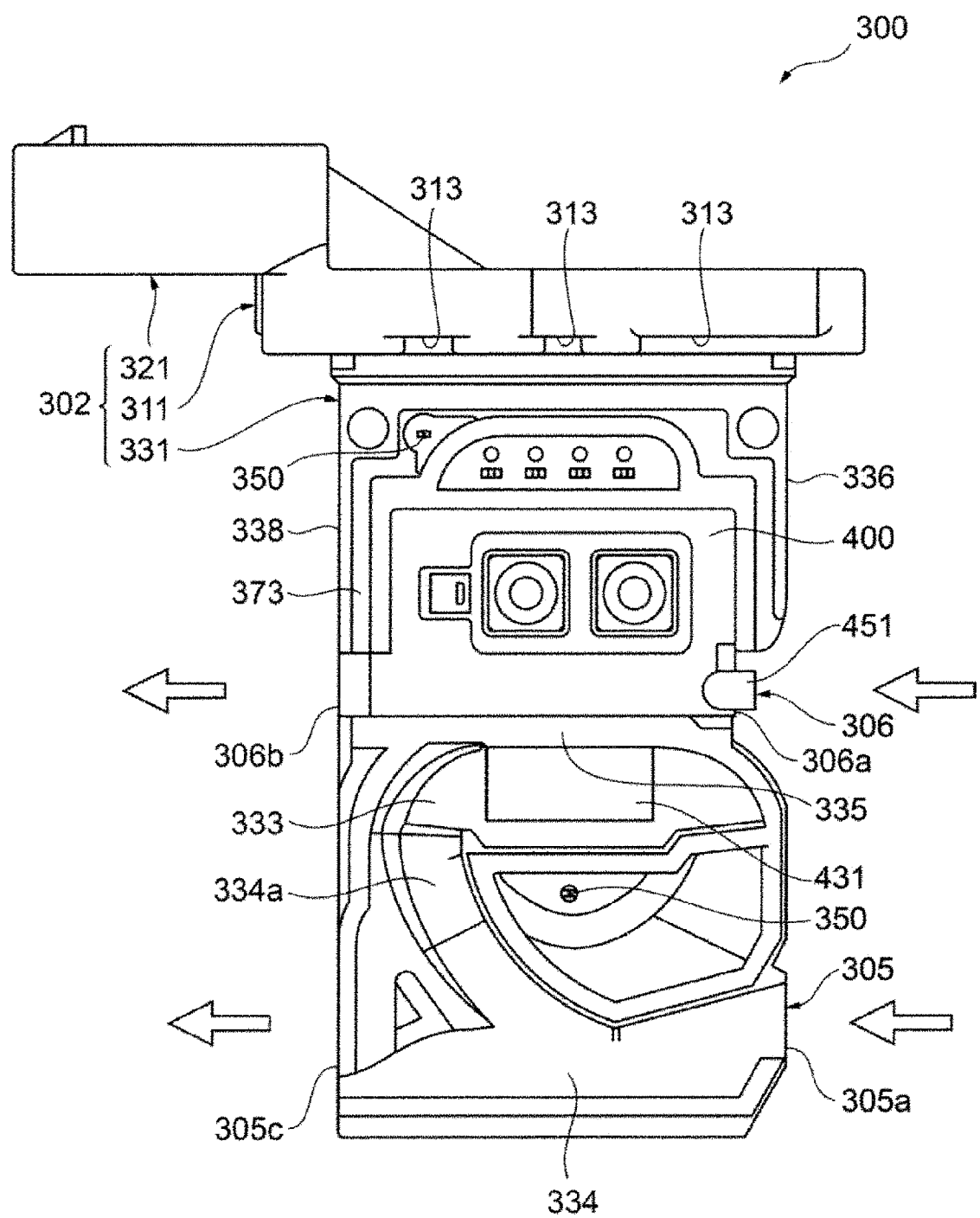
Figure 3:
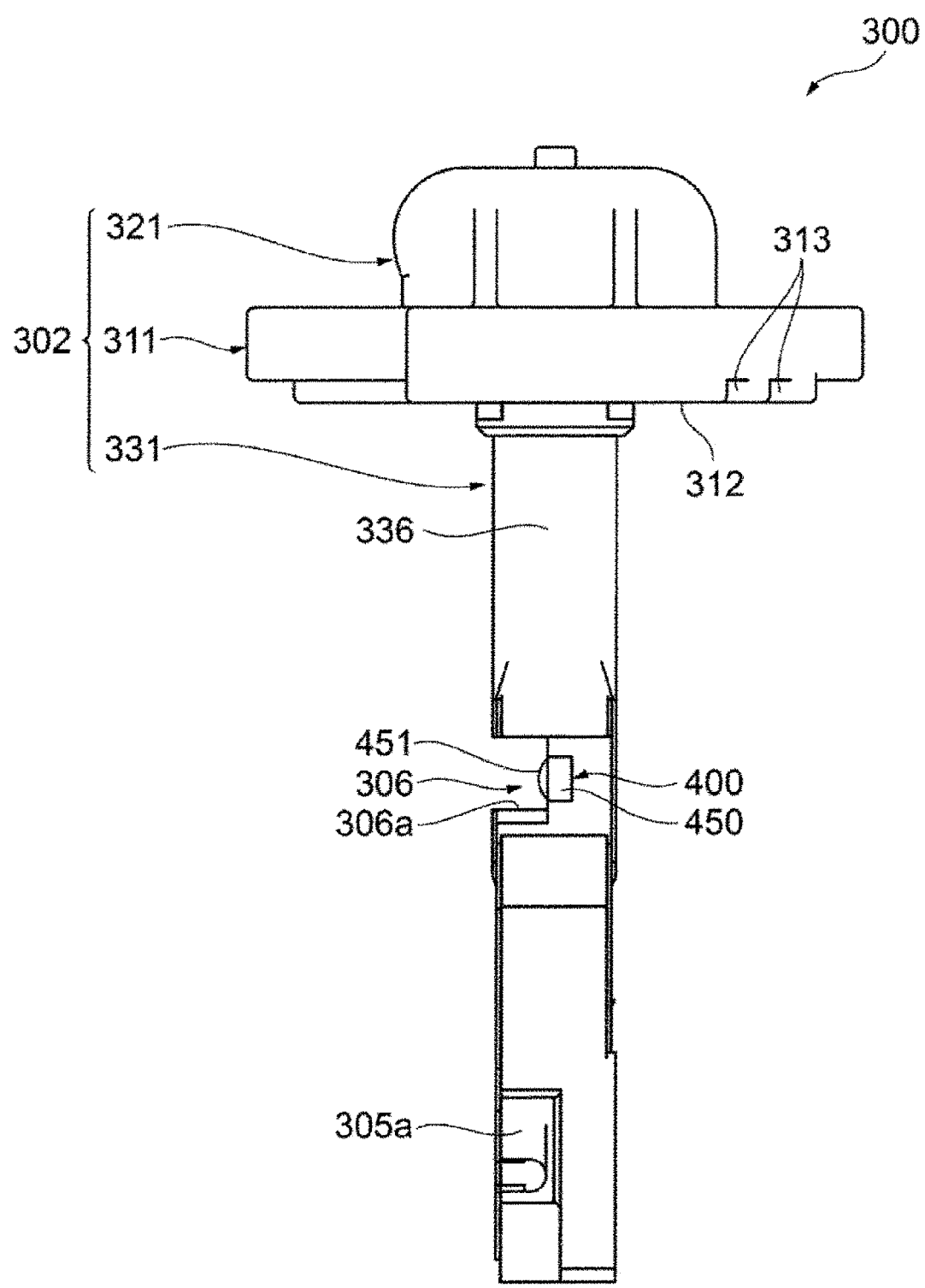
Figures 3, 4:
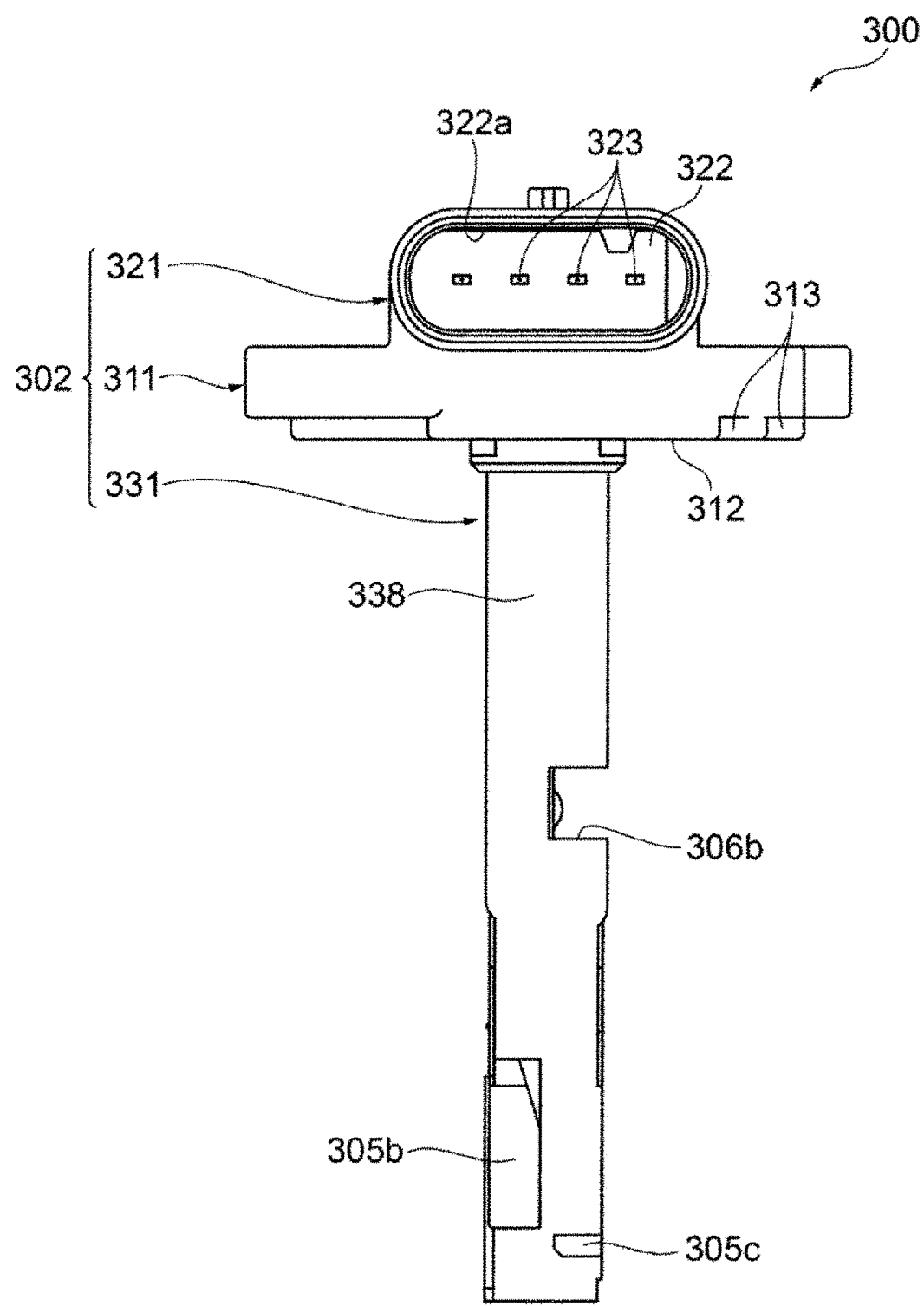
Figures 3, 4, 5:
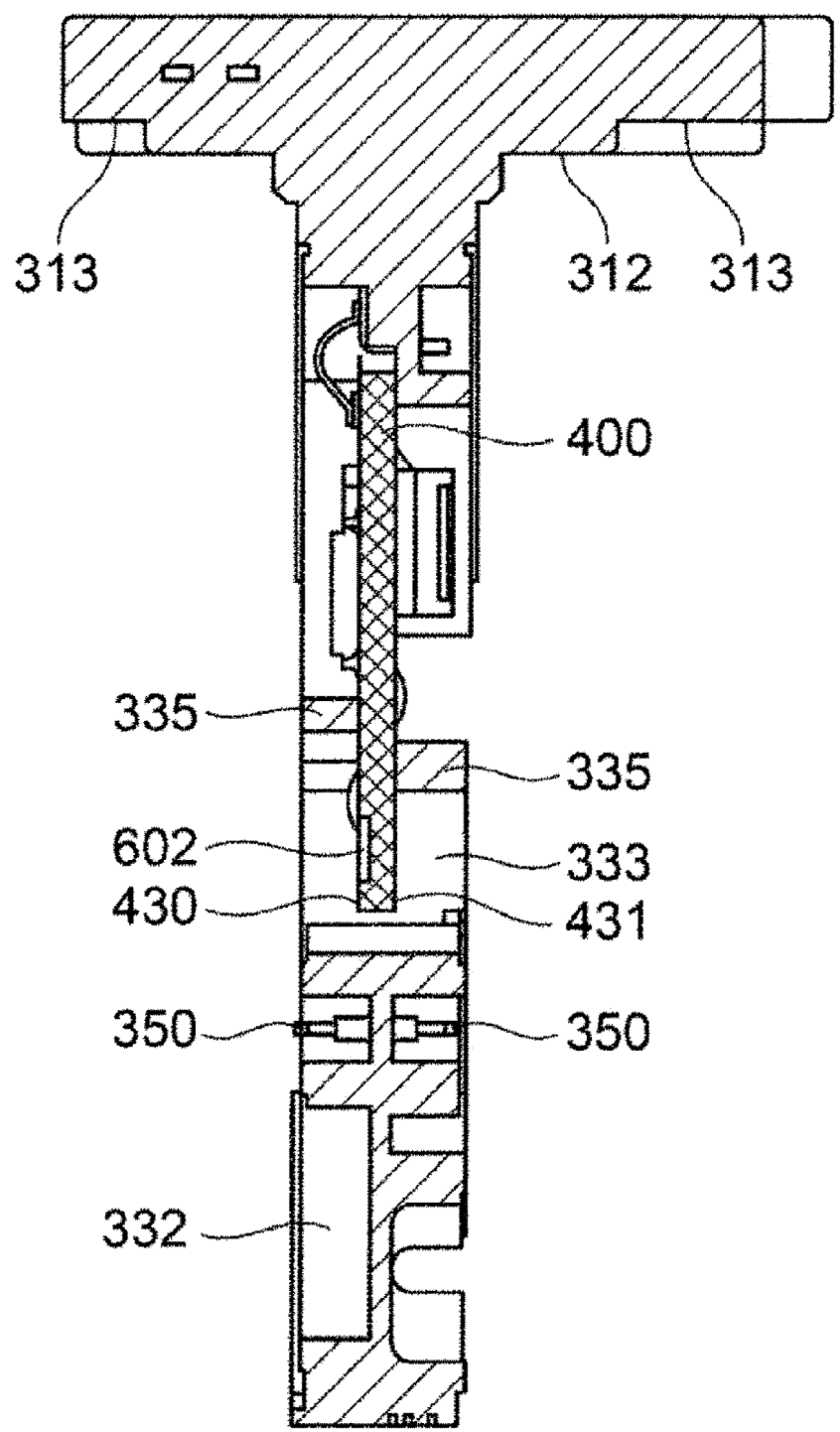
Figures 1, 4:
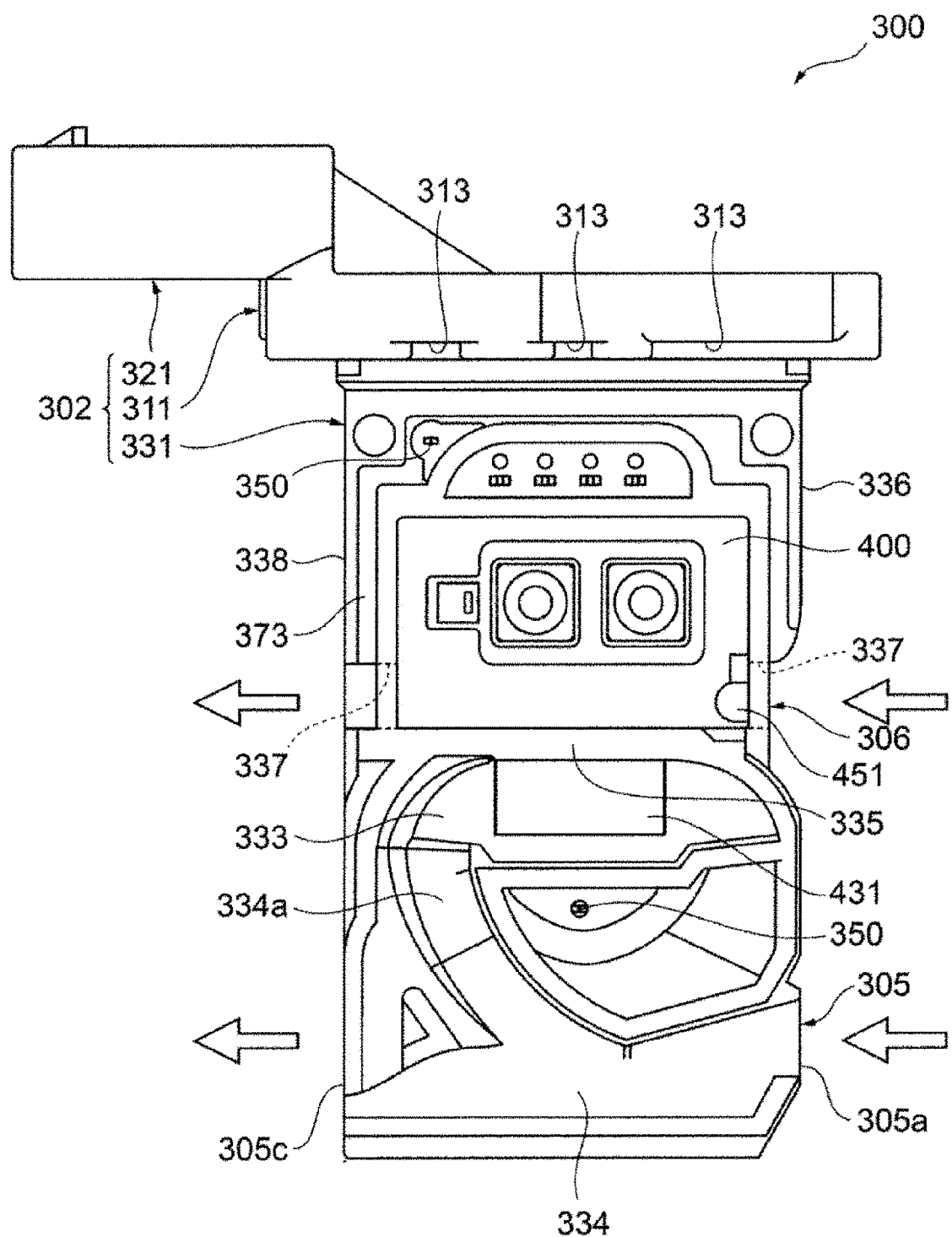
Figures 2, 4:
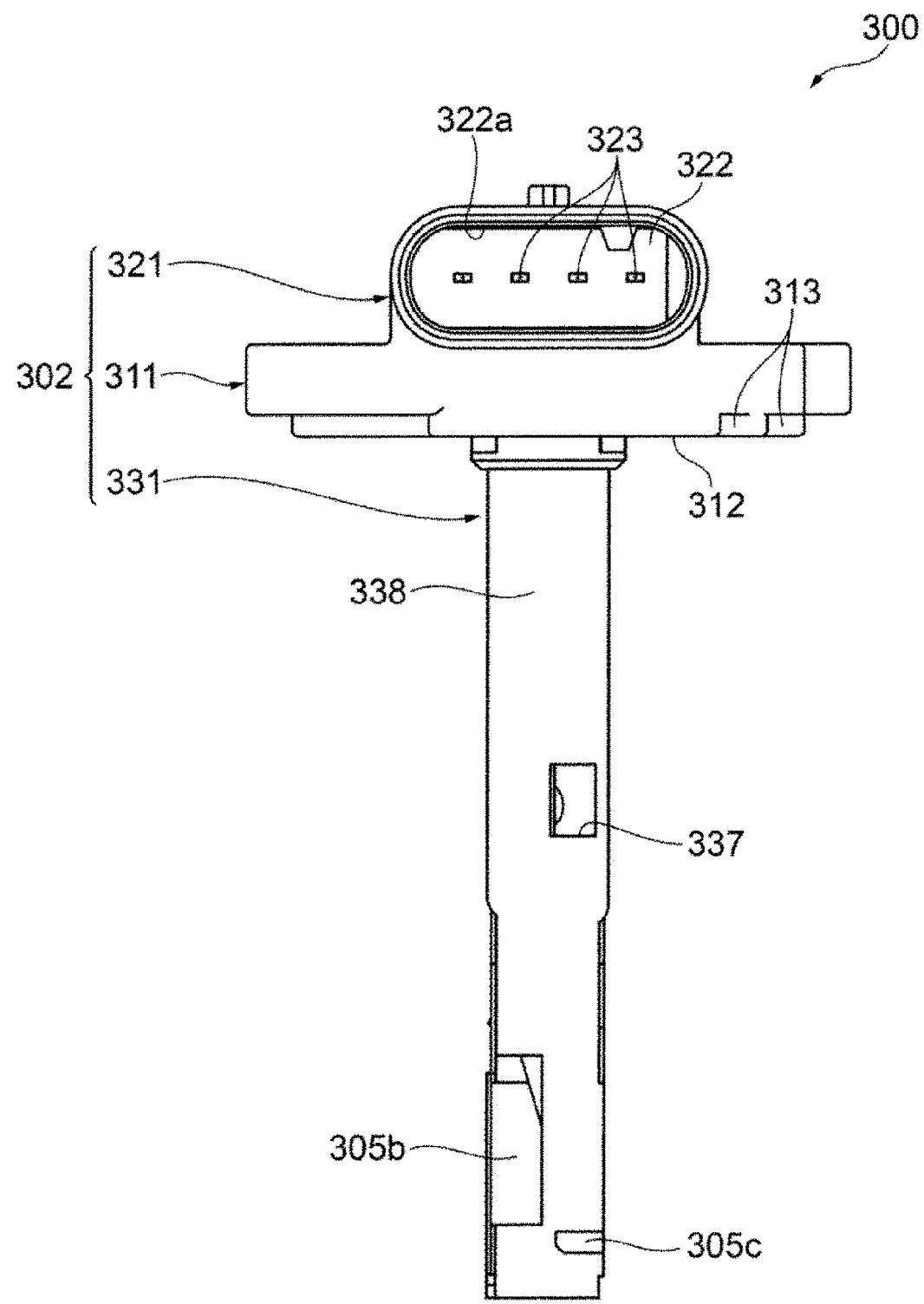
Figure 5:
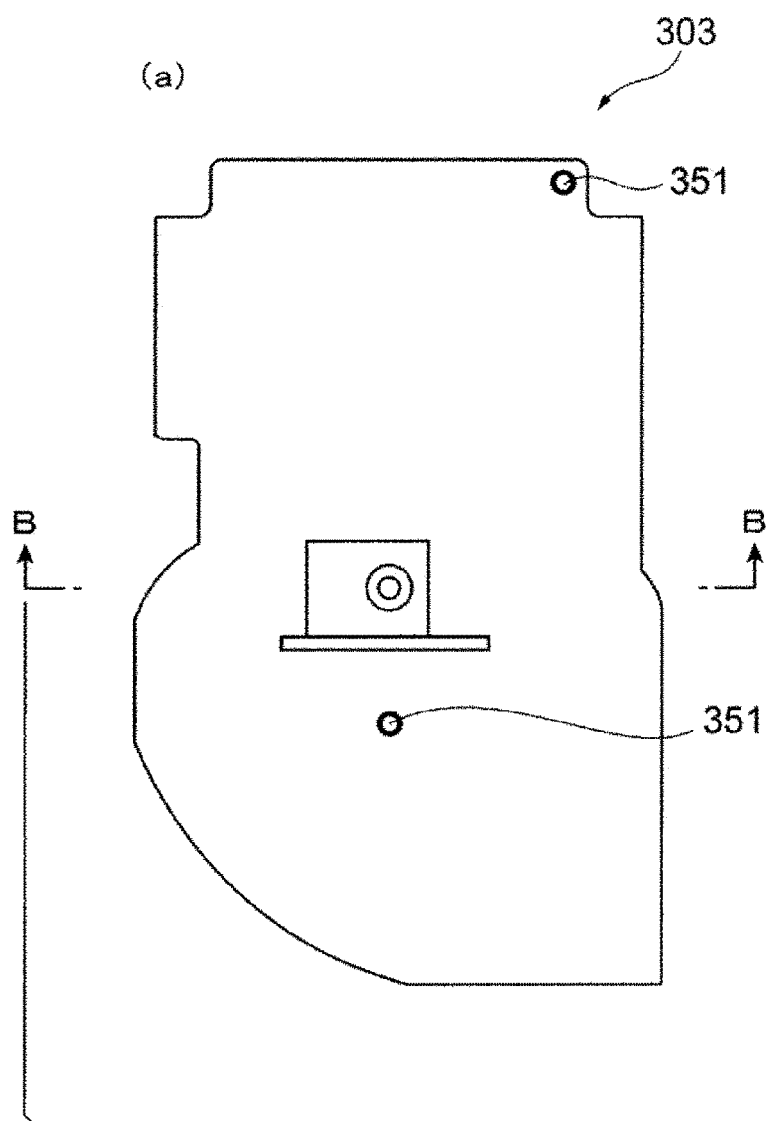
Figure 5:
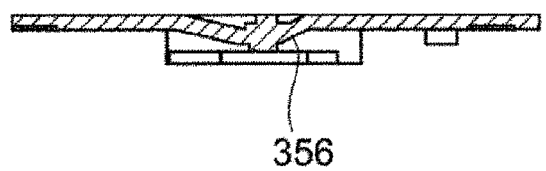
Figure 6:
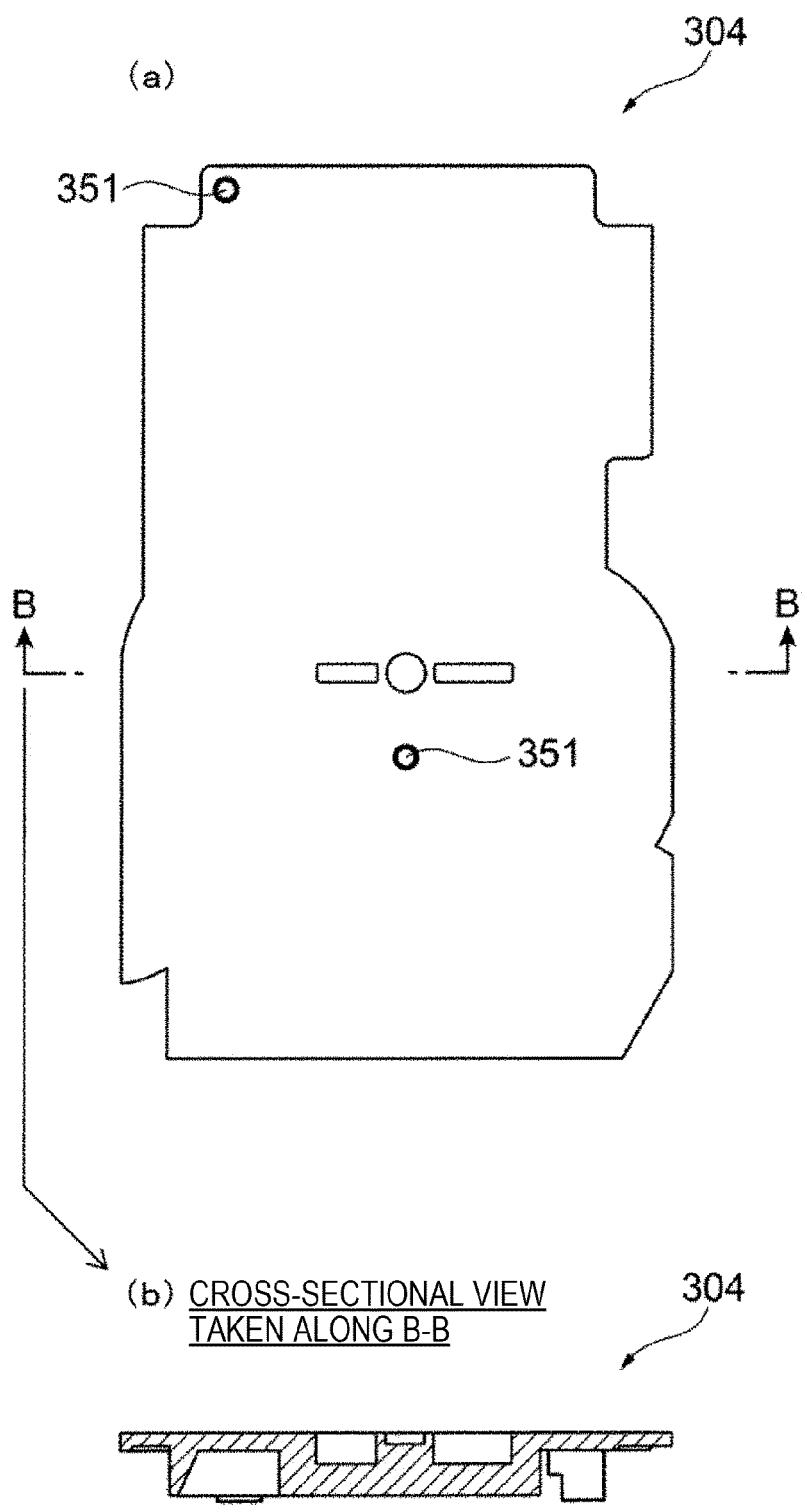

FIG. 5 is a diagram showing an appearance of the front cover 303, FIG. 5A is a front view of the front cover 303, and FIG. 5B is a cross-sectional view taken along line B-B in FIG. 5A. FIG. 6 is a diagram showing an appearance of the back cover 304, FIG. 6A is a front view of the back cover 304, and FIG. 6B is a cross-sectional view taken along line B-B in FIG. 6A.

In FIGS. 5 and 6, the front cover 303 or the back cover 304 close the front side sub-passage groove 332 and the back side sub-passage 334 of the housing 302, thereby forming the first sub-passage 305. In addition, the front cover 303 forms the hermetically sealed circuit chamber Rc, and the back cover 304 closes a recessed portion on the back surface side of the measuring unit 331 to form the second sub-passage 306 and the sensor chamber Rs communicating with the second sub-passage 306.

The front cover 303 has a protruding part 356 provided at a position facing the flow-volume detecting unit 602 and is used to form a diaphragm between the protruding part 356 and the measurement flow passage surface 430. Therefore, it is preferable to increase molding accuracy. The front cover 303 or the back cover 304 are manufactured by a resin molding process of injecting a thermoplastic resin into a mold, and as a result, can be made with high molding accuracy.

The front cover 303 and the back cover 304 are provided with a plurality of fixing holes 351 into which a plurality of fixing pins 350 protruding from the measuring unit 331 are each inserted. The front cover 303 and the back cover 304 are attached to the front surface and the back surface of the measuring unit 331, respectively, and at that time, the fixing pin 350 is inserted into the fixing hole 351 to be positioned. The front cover 303 and the back cover 304 are joined by laser welding or the like along edges of the front side sub-passage groove 332 and the back side sub-passage groove 334, and similarly joined by laser welding or the like along edges of the circuit chamber Rc and the sensor chamber Rs.

3.5 Fixing Structure and Effect by Housing 302 of Circuit Board 400

Next, the fixation of the circuit board 400 to the housing 302 by the resin molding process will be described. The circuit board 400 is integrally molded with the housing 302 so that the flow-volume detecting unit 602 of the circuit board 400 is disposed at a predetermined location of the sub-passage groove molding the sub-passage, for example, an opening portion 333 which is a connecting portion between the front side sub-passage groove 332 and the back side sub-passage groove 334 in the present embodiment.

A portion at which an outer edge part of the base portion 402 of the circuit board 400 is embedded in the housing 302 by the resin molding to be fixed is provided on the measuring unit 331 of the housing 302 as fixed portions 372 and 373. The fixed portions 372 and 373 fix an outer edge part of the base portion 402 of the circuit board 400 sandwiched between the front side and the back side thereof.

The housing 302 is manufactured by a resin molding process. In this resin molding process, the circuit board 400 is built in the resin of the housing 302 and fixed in the housing 302 by the resin molding. By doing so, the flow-volume detecting unit 602 performs the heat transfer between the flow-volume detecting unit 602 and the measured gas 30 to maintain a positional relationship, a directional relationship, or the like, which is a relationship with a shape of the sub-passage for measuring the flow volume, for example, the front side sub-passage groove 332 or the backside sub-passage groove 334, with extremely high accuracy, and suppress an error or a variation occurring in each circuit board 400 to an extremely small value. As a result, the measurement accuracy of the circuit board 400 can be greatly improved. For example, the measurement accuracy can be dramatically improved compared with a fixing method using a conventional adhesive.

The physical quantity detecting apparatus 300 is often produced by mass production, and a bonding method using an adhesive while strictly performing measurement has limitations in improving measurement accuracy. However, as in the present embodiment, by fixing the circuit board 400 simultaneously with molding the sub-passage in the resin molding process of molding the sub-passage through which the measured gas 30 flows, it is possible to greatly reduce the variation in the measurement accuracy and greatly improve the measurement accuracy of each physical quantity detecting apparatus 300.

For example, describing the embodiment shown in FIGS. 3-1 to 3-5, the circuit board 400 can be fixed to the housing 302 with high accuracy so that the relationship between the front side sub-passage groove 332, the back side sub-passage groove 334, and the flow-volume detecting unit 602 has a defined relationship. In each physical quantity detecting apparatus 300 mass-produced in this manner, it is possible to normally obtain the positional relationship between the flow-volume detecting unit 602 of each circuit board 400 and the first sub-passage 305, the relationship with the shape thereof or the like with very high accuracy.

The first sub-passage 305 in which the flow-volume detecting unit 602 of the circuit board 400 is fixedly disposed, for example, the front side sub-passage groove 332 and the back side sub-passage groove 334 can be molded with extremely high accuracy, such that the operation of molding the first sub-passage 305 from the sub-passage grooves 332 and 334 is an operation of covering both surfaces of the housing 302 with the front cover 303 or the back cover 304. This operation is an operation which is very simple and has few factors to lower the measurement accuracy. In addition, the front cover 303 or the back cover 304 is produced by the resin molding process with high molding accuracy. Accordingly, it is possible to complete the sub-passage provided in a prescribed relationship with the flow-volume detecting unit 602 of the circuit board 400 with high accuracy. By such a method, the measurement accuracy can not also be improved, but the high productivity can also be obtained.

In contrast to this, conventionally, a thermal type flowmeter has been produced by manufacturing the sub-passage and then attaching the measuring unit to the sub-passage with an adhesive. In the method of using the adhesive as described above, the thickness variation in the adhesive is large, and the bonding position and the bonding angle vary for each product. Therefore, there are limitations in increasing the measurement accuracy. In addition, it is extremely difficult to improve the measurement accuracy when these operations are performed in the mass production process.

In the embodiment according to the present invention, the circuit board 400 is fixed by resin molding, and at the same time, the sub-passage groove for molding the first sub-passage 305 is formed by the resin molding. By doing so, the flow-volume detecting unit 602 can be fixed to the shape of the sub-passage groove and the sub-passage groove with extremely high accuracy.

A portion related to the measurement of the flow volume, for example, the flow-volume detecting unit 602 or the measurement flow passage surface 430 to which the flow-volume detecting unit 602 is attached is provided on the surface of the circuit board 400. The flow-volume detecting unit 602 and the measurement flow passage surface 430 are exposed from the resin molding the housing 302. That is, the flow-volume detecting unit 602 and the measurement flow passage surface 430 are covered with the resin molding the housing 302. The flow-volume detecting unit 602 or the measurement flow passage surface 430 of the circuit board 400 is used as it is after the resin molding of the housing 302, and is used for the flow-volume measurement of the physical quantity detecting apparatus 300. By doing so, the measurement accuracy is improved.

In the embodiment according to the present invention, since the circuit board 400 is fixed to the housing 302 having the first sub-passage 305 by integrally molding the circuit board 400 with the housing 302, the circuit board 400 can be certainly fixed to the housing 302. In particular, since the protruding portion 403 of the circuit board 400 penetrates through the partition wall 335 and protrudes to the first sub-passage 305, the sealing property between the first sub-passage 305 and the circuit chamber Rc is high, and it is possible to prevent the measured gas 30 from leaking from the first sub-passage 305 to the circuit chamber Rc and prevent circuit components or wirings of the circuit board 400 from corroding due to contact with the measured gas 30.

3.6 Structure and Effect of Terminal Connecting Portion 320

Figures 1, 10:
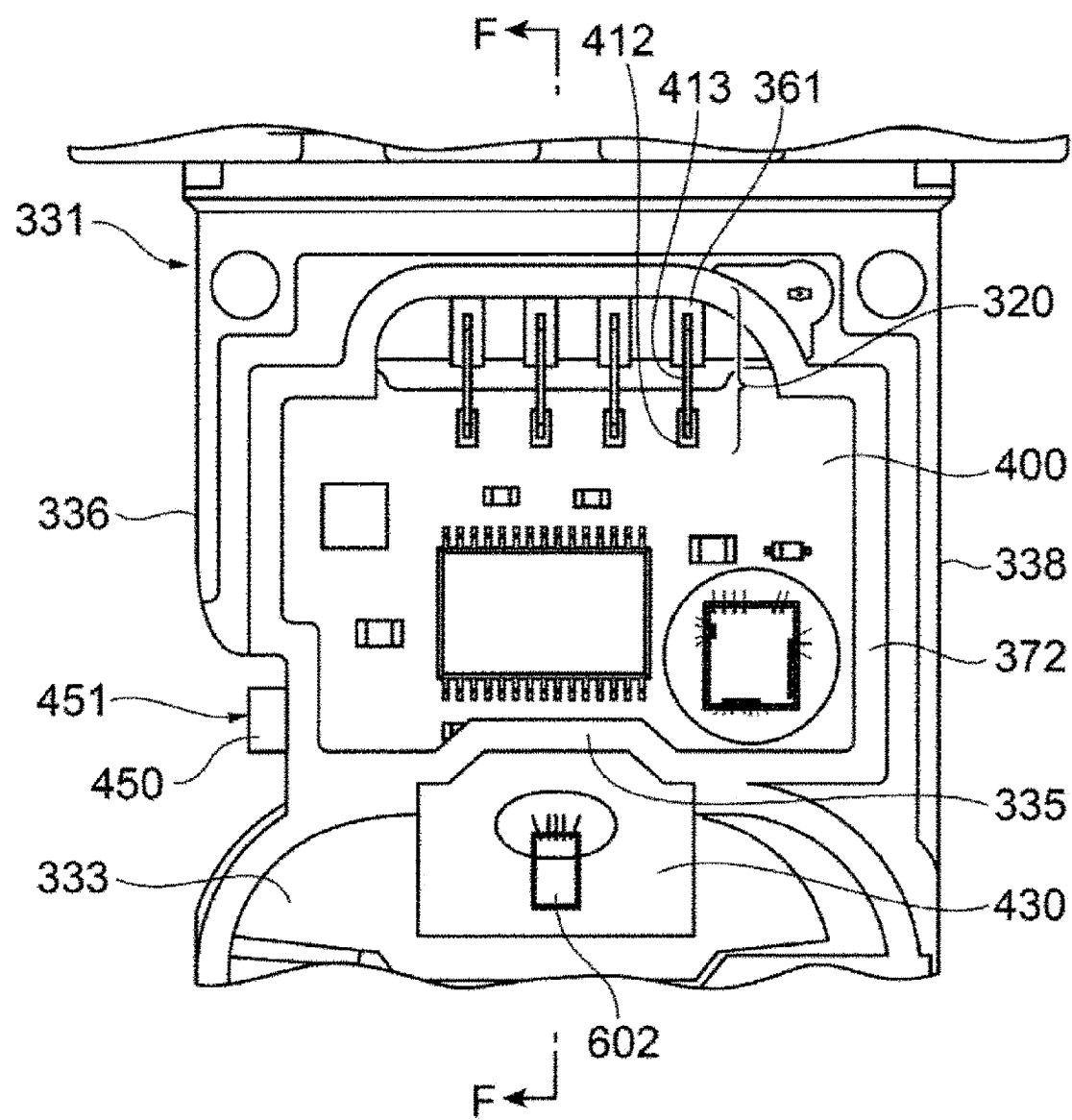
Figures 2, 10:
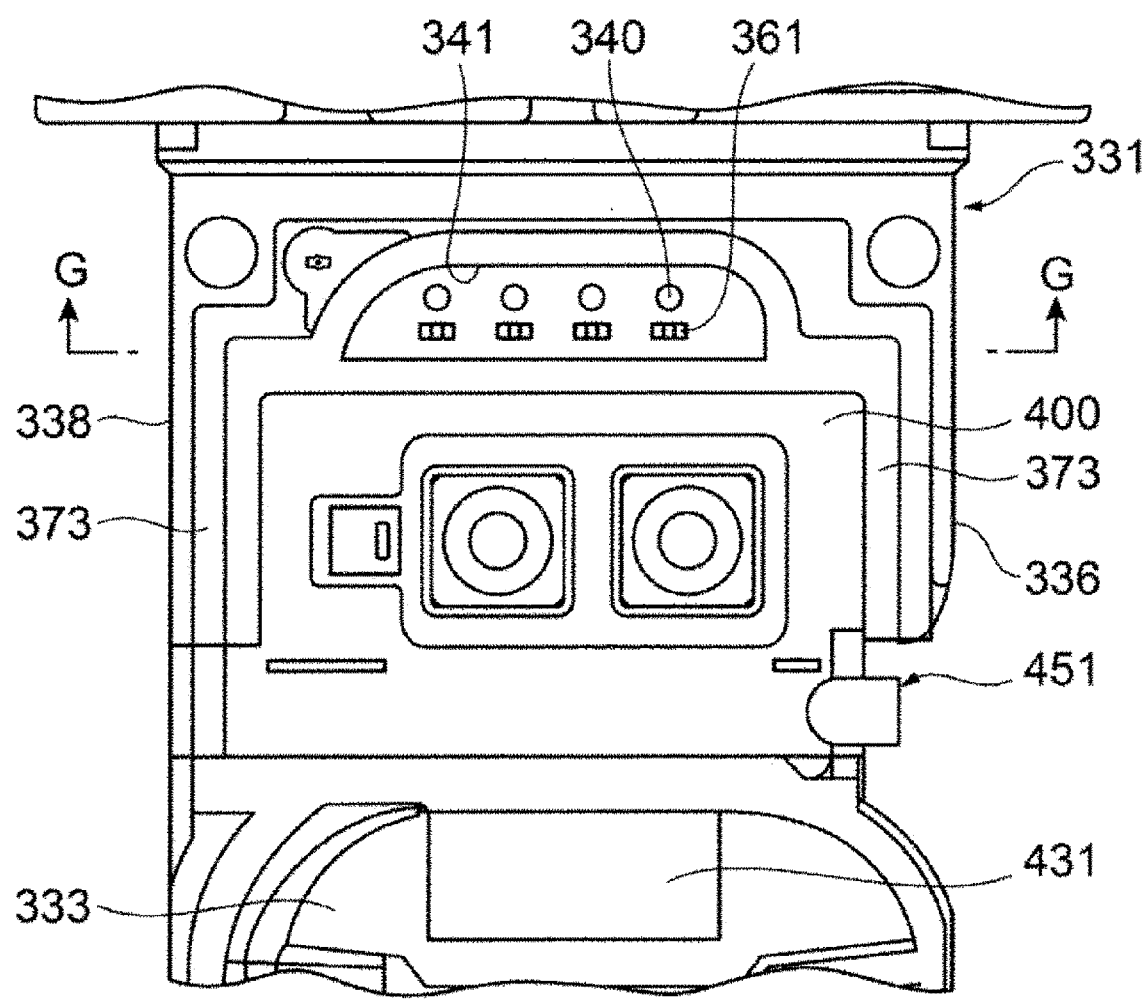
Figures 3, 10:
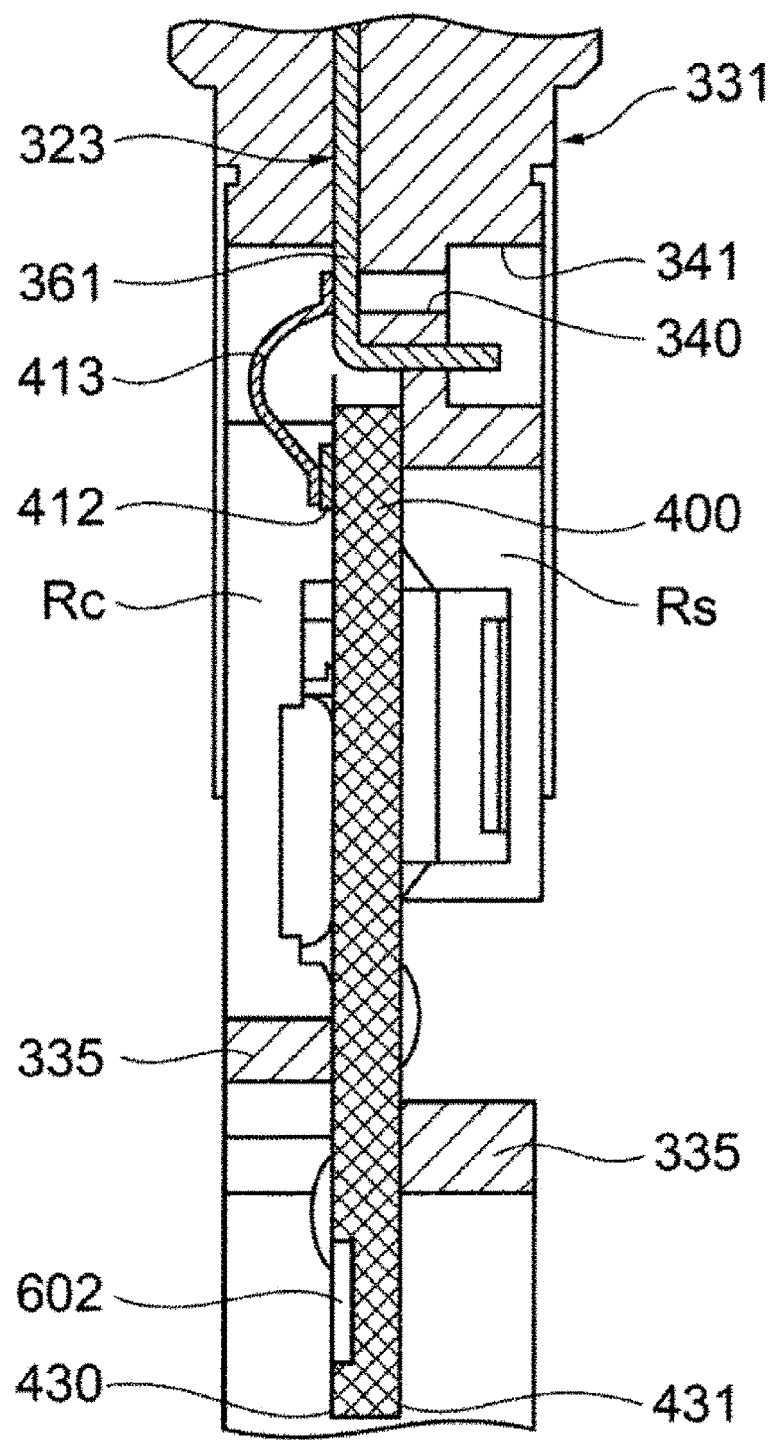
Figures 4, 10:
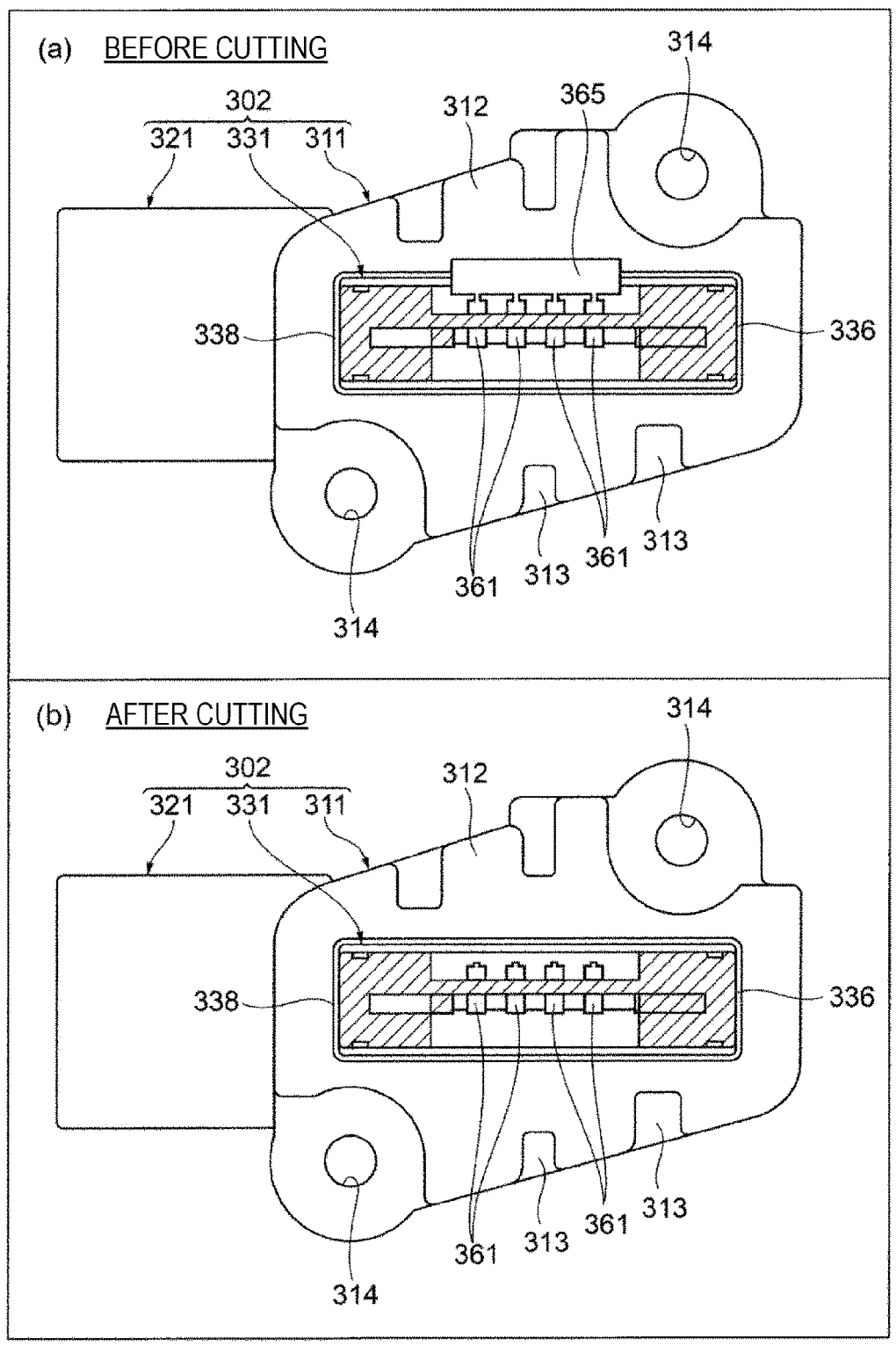

Next, the structure of the terminal connecting portion will be described below with reference to FIGS. 10-1 to 10-4. FIG. 10-1 is a diagram for describing the structure of the terminal connecting portion, FIG. 10-2 is a diagram for describing the structure of the terminal connecting portion, FIG. 10-3 is a cross-sectional view along line F-F in FIG. 10-1, and FIG. 10-4 is a cross-sectional view taken along line G-G in FIG. 10-2.

The terminal connecting portion 320 has a configuration in which an inner end portion 361 of the external terminal 323 and the connecting terminal 412 of the circuit board 400 are connected to each other by a gold wire 413. As shown in FIG. 10-1, the inner end portions 361 of each external terminal 323 protrude from the flange 311 side to the circuit chamber Rc, and is arranged side by side at a predetermined interval depending on the position of the connecting terminal 412 of the circuit board 400.

As shown in FIG. 10-3, the inner end portion 361 is disposed at a position substantially flush with the surface of the circuit board 400. The tip of the inner end portion 361 is bent in a substantially L shape from the surface of the measuring unit 331 toward the back surface side and protrudes to the back surface of the measuring unit 331. As shown in FIG. 10-4A, the tips of the inner end portions 361 are each connected to each other by a connecting portion 365, and as shown in FIG. 10-4B, the connecting portion 365 is cut off after the molding and separated individually.

In the molding process of allowing the inner end portion 361 and the circuit board 400 to be disposed on the same plane, each inner end portion 361 is fixed to the housing 302 by the resin molding. Each inner end portion 361 is fixed to the housing 302 by the resin molding process in the state in which the inner end portions 361 are connected to each other by the connecting portion 365 so as to be integrated with each other in order to prevent deformation and disposition. Then, after the inner end portion 361 is fixed to the housing 302, the connecting portion 365 is cut off.

The inner end portion 361 is resin-molded while being sandwiched between the front surface side and the back surface side of the measuring unit 331, and at that time, the mold abuts over the whole surface of the inner end portion 361 and the fixing pin abuts on the rear surface of the inner end portion 361. Therefore, the surface of the inner end portion 361 to which the gold wire is welded can be completely exposed without being covered with the mold resin due to resin leakage and the gold wire can be easily welded. A pin hole 340 with a trace of pressing down the inner end portion 361 with a fixed pin is formed in the measuring unit 331.

The tip of the inner end portion 361 protrudes into a recessed portion 341 formed on the back surface of the measuring unit 331. The recessed portion 341 is covered with the back cover 304, and the circumference of the recessed portion 341 is continuously joined to the back cover 304 by laser welding or the like to form a hermetically sealed interior space. Therefore, it is possible to prevent the inner end portion 361 from corroding due to the contact with the measured gas 30.

4. Appearance of Circuit Board 400

4.1 Formation of Measurement Flow Passage Surface 430 Provided with Flow-Volume Detecting Unit 602

Figures 1, 7:
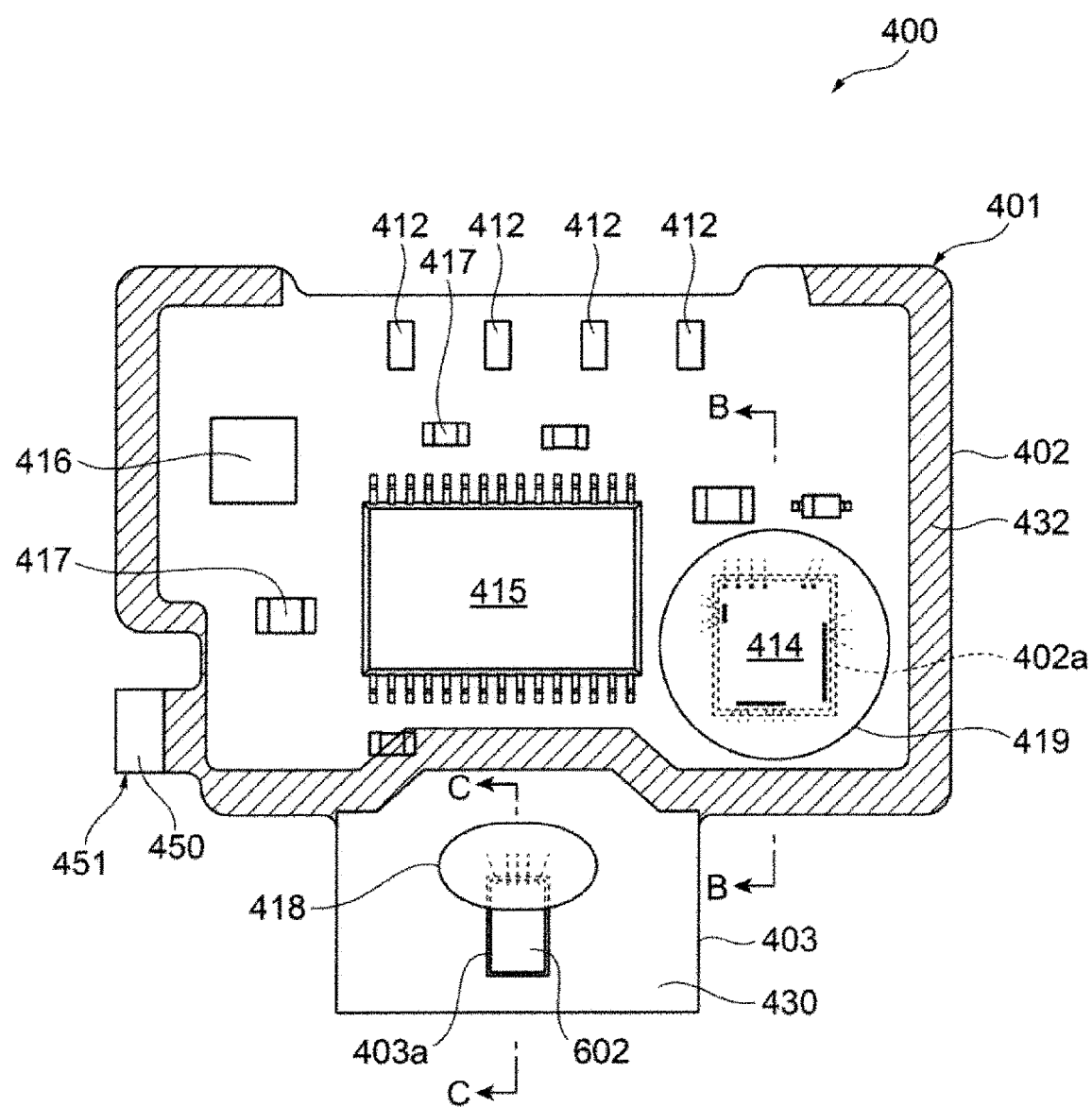
Figures 2, 7:
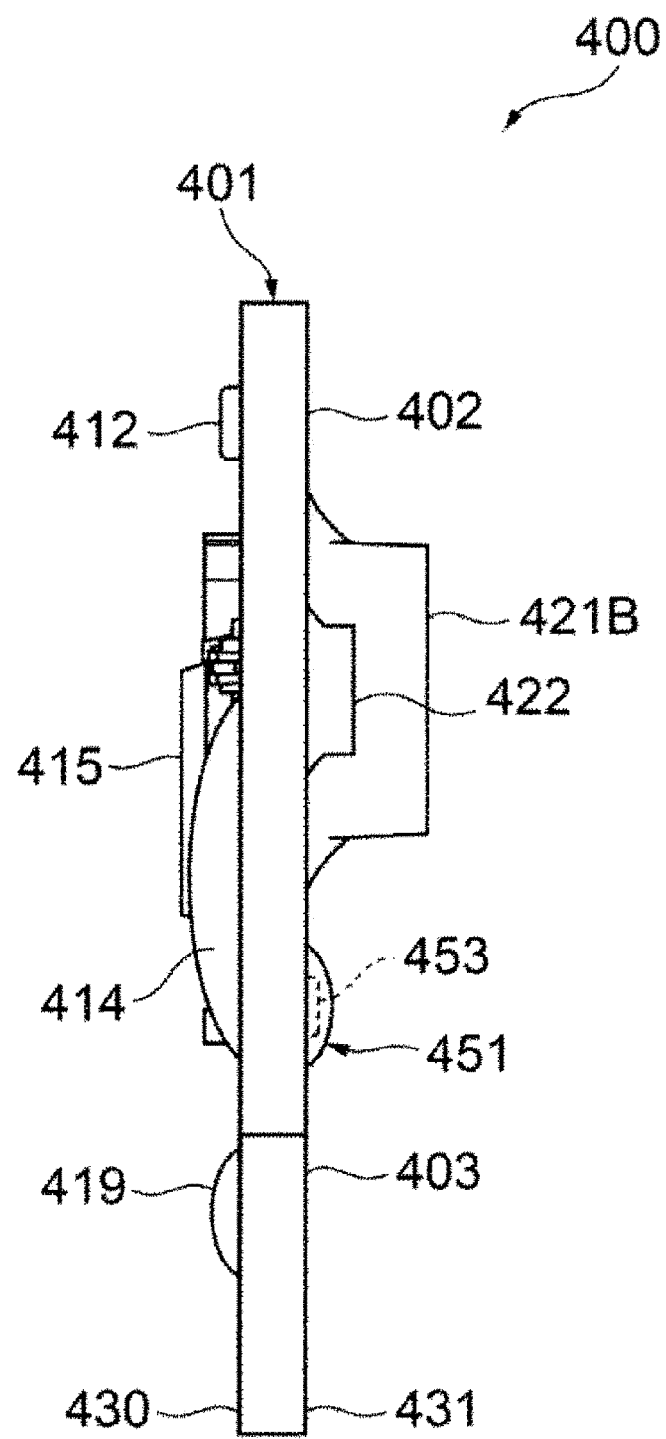
Figures 3, 7:
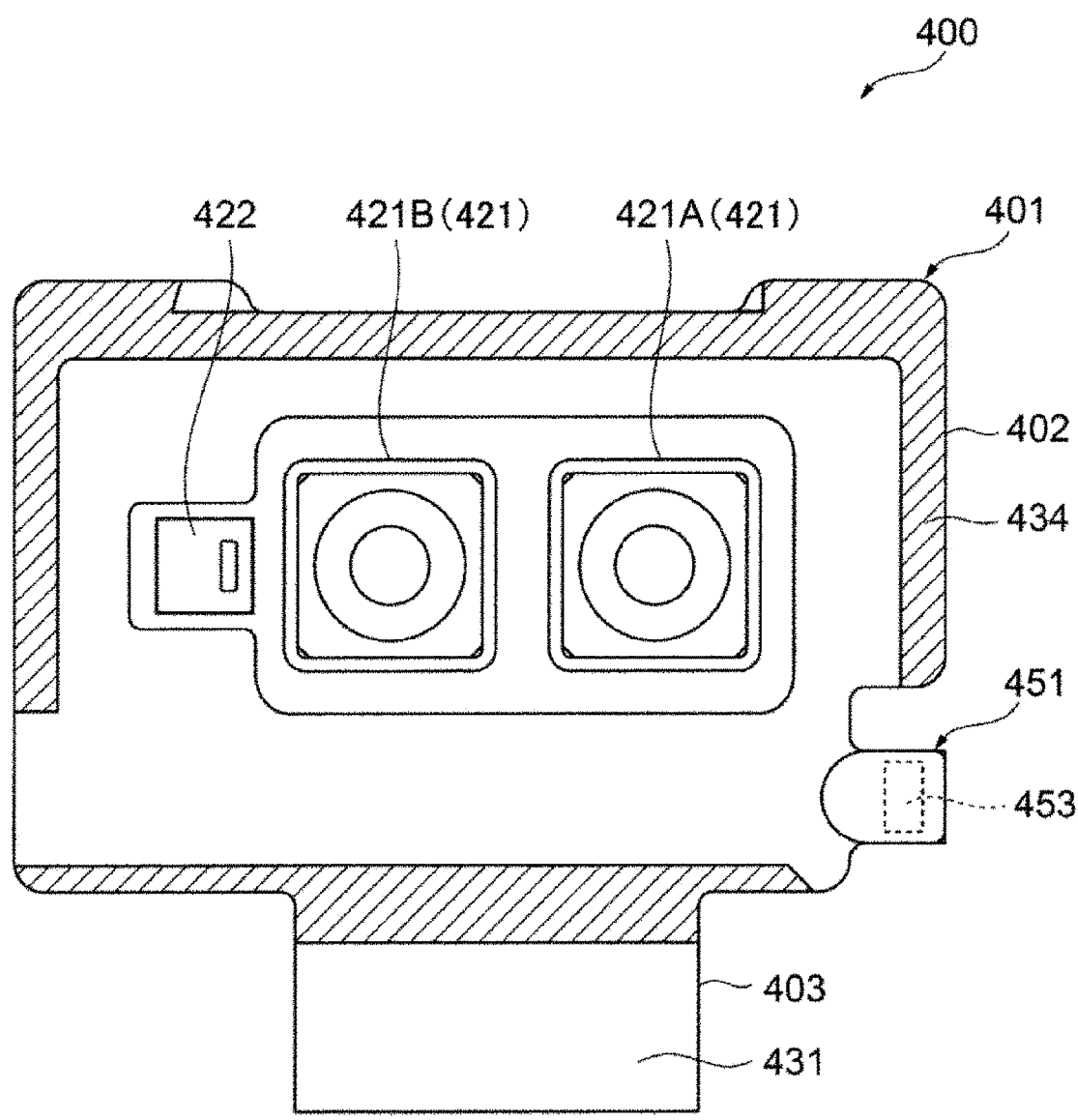
Figures 4, 7:
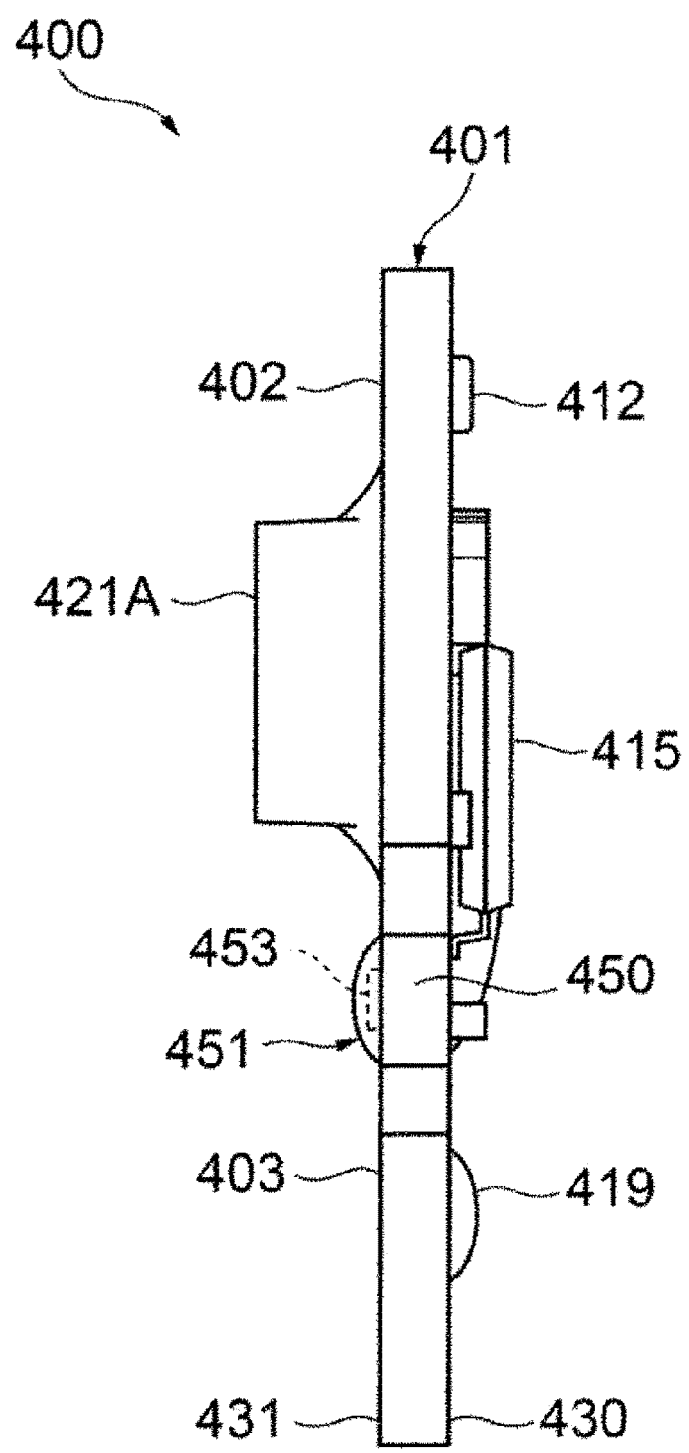
Figures 5, 7:
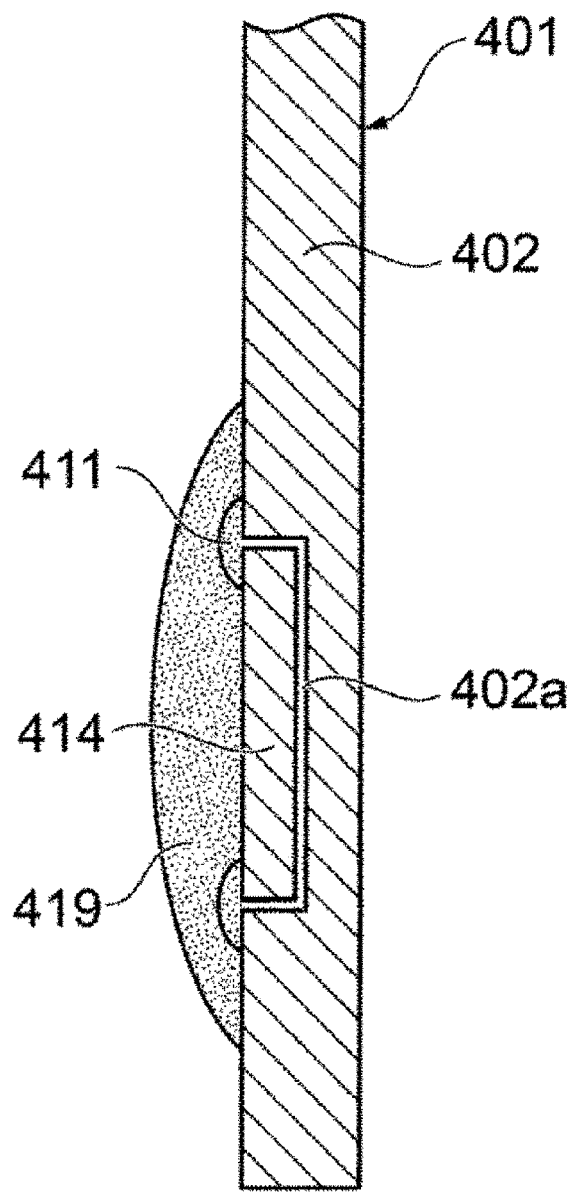
Figures 6, 7:
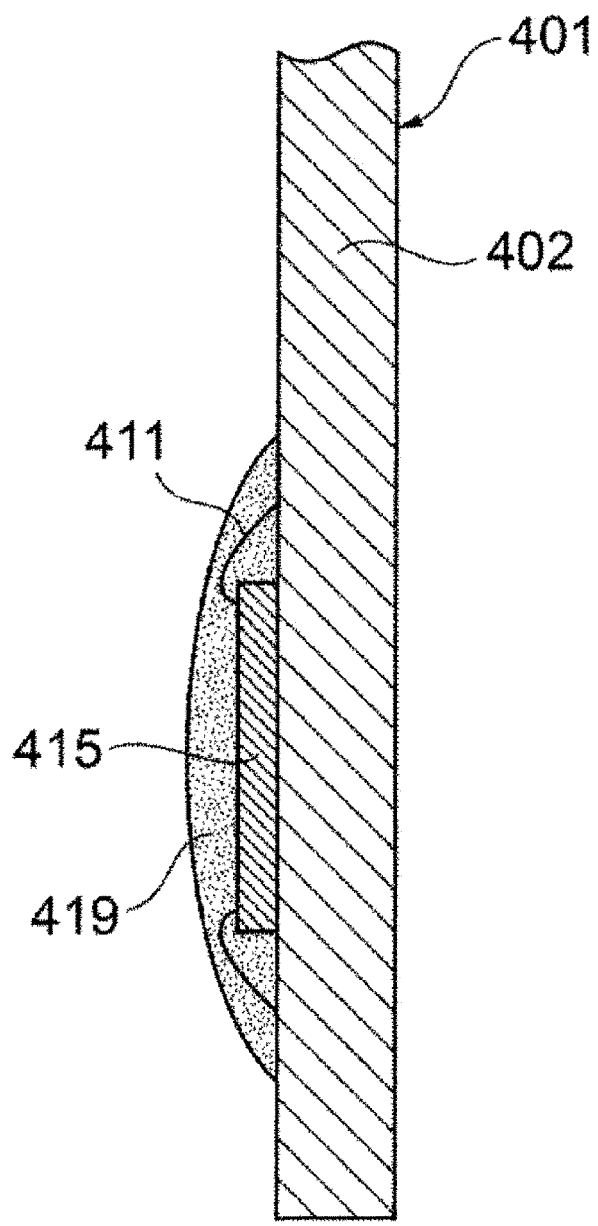
Figure 7:
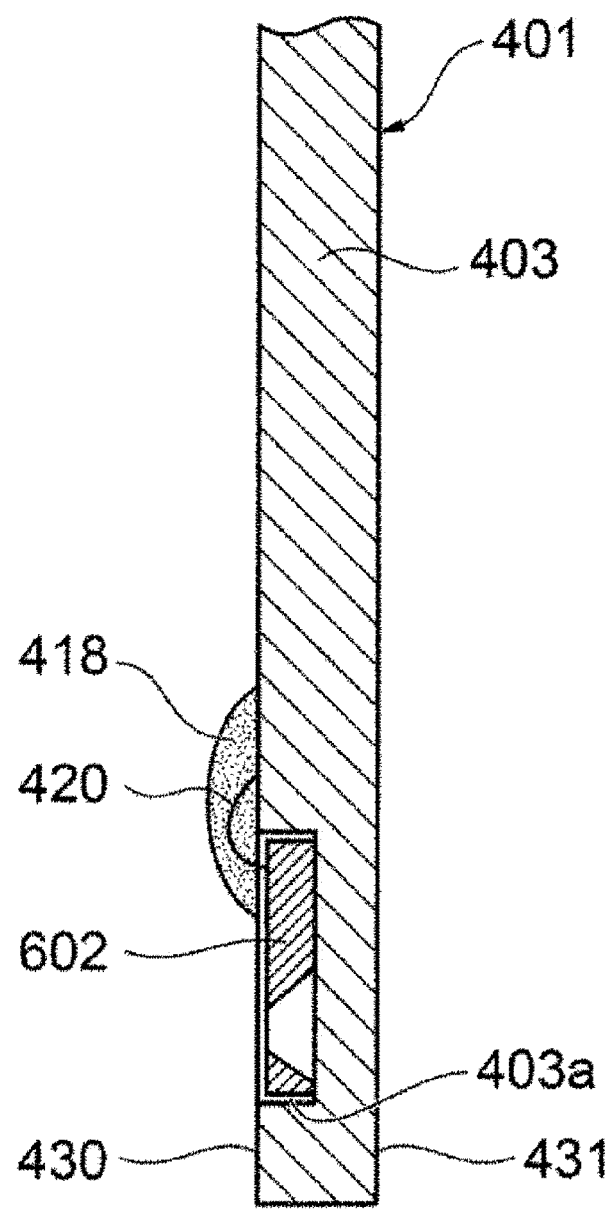

FIGS. 7-1 to 7-6 show the appearance of the circuit board 400. A hatched portion showing the appearance of the circuit board 400 shows a fixed surface 432 and a fixed surface 434 to which the circuit board 400 is covered and fixed by a resin at the time of molding the housing 302 in the resin molding process.

FIG. 7-1 is a front view of the circuit board, FIG. 7-2 is a right side view of the circuit board, FIG. 7-3 is a rear view of the circuit board, FIG. 7-4 is a left side view of the circuit board, FIG. 7-5 is a cross-sectional view taken along line B-B showing a cross section of an LSI portion in FIG. 7-1, FIG. 7-6 is a view showing another embodiment corresponding to the cross section taken along line B-B in FIG. 7-1, and FIG. 7-7 is a cross-sectional view taken along line C-C of the detecting unit in FIG. 7-1.

The circuit board 400 has a substrate main body 401, the circuit unit and the flow-volume detecting unit 602 which is a sensing element are provided on the surface of the substrate main body 401, and the pressure sensor 421 and the humidity sensor 422 as the sensing element are provided on the back surface of the substrate main body 401. The substrate main body 401 is made of materials such as a glass epoxy resin and has a value which is equal or approximate to a thermal expansion coefficient of a thermoplastic resin molding the housing 302. Therefore, it is possible to reduce a stress caused by a difference in the thermal expansion coefficient when the insert molding is performed on the housing 302 and reduce the distortion of the circuit board 400.

The substrate main body 401 has a flat plate shape having a predetermined thickness, and has a substantially rectangular base portion 402 and a substantially rectangular protruding portion 403 protruding from one side of the base portion 402 and having a size smaller than the base portion 402 and has a substantially T shape as viewed from a plane. The circuit unit is provided on the surface of the base portion 402. The circuit unit is configured by mounting, on a circuit wiring (not shown), electronic components such as an LSI 414, a microcomputer 415, a power supply regulator 416, and chip components 417 of a resistor, a capacitor or the like. The power supply regulator 416 has a larger heating value than other electronic components such as the microcomputer 415 and the LSI 414, and therefore is disposed on a relatively upstream side in the circuit chamber Rc. The whole of the LSI 414 is sealed with a synthetic resin material 419 so as to include a gold wire 411 and improves the handling property of the circuit board 400 when performing the insert molding.

As shown in FIG. 7-5, a recessed portion 402a into which the LSI 414 is fitted is concavely disposed on the surface of the substrate main body 401. The recessed portion 402a can be formed by performing the laser processing on the substrate main body 401. The substrate main body 401 made of a glass epoxy resin is more easily processed than the substrate main body 401 made of ceramic, and can easily be provided with the recessed portion 402. The recessed portion 402 has a depth at which the surface of the LSI 414 is flush with the surface of the substrate main body 401. By matching the height of the surface of the LSI 414 with the height of the surface of the substrate main body 401 as described above, it is possible to facilitate the wire bonding for connecting the LSI 414 and the substrate main body 401 with the gold wire 411, and easily manufacture the circuit board 400. For example, as shown in FIG. 7-6, the LSI 414 can directly be provided on the surface of the substrate main body 401. In the case of such a structure, the synthetic resin material 419 covering the LSI 414 protrudes more largely, but the processing for forming the recessed portion 402 in the substrate main body 401 becomes unnecessary, and the manufacturing can be simplified.

The protruding portion 403 is disposed in the first sub-passage 305 when the circuit board 400 is insert-molded in the housing 302, and the measurement flow passage surface 430 which is the surface of the protruding portion 403 extends in the flow direction of the measured gas 30. The flow-volume detecting unit 602 is provided on the measurement flow passage surface 430 of the protruding portion 403.

The flow-volume detecting unit 602 performs heat transfer with the measured gas 30, measures the state of the measured gas 30, for example, the flow velocity of the measured gas 30, and outputs the electric signal indicating the flow volume flowing in the main passage 124. In order for the flow-volume detecting unit 602 to measure the state of the measured gas 30 with high accuracy, it is preferable that the gas flowing in the vicinity of the measurement flow passage surface 430 is a laminar flow and has little disturbance. Therefore, it is desirable that the surface of the flow-volume detecting unit 602 and the surface of the measurement flow passage surface 430 are flush with each other, or the difference between the surface of the flow-volume detecting unit 602 and the surface of the measurement flow passage surface 430 is equal to or less than a predetermined value.

The recessed portion 403a is concavely disposed on the surface of the measurement flow passage surface 430, and the flow-volume detecting unit 602 is fitted therein. The recessed portion 403a can be formed by subjecting to the laser process. The recessed portion 403a has a depth at which the surface of the flow-volume detecting unit 602 is flush with the surface of the measurement flow passage surface 430. The flow-volume detecting unit 602 and the wiring portion thereof are covered with a synthetic resin material 418 to prevent electrolytic corrosion from occurring due to adhesion of salt water.

Two pressure sensors 421A and 421B and one humidity sensor 422 are provided on the back surface of the substrate main body 401. The two pressure sensors 421A and 421B are arranged in a row while being divided into the upstream side and the downstream side. The humidity sensor 422 is disposed on the downstream side of the pressure sensor 421B. These two pressure sensors 421A and 421B and one humidity sensor 422 are disposed in the sensor chamber Rs. In the example shown in FIG. 7-3, the case where two pressure sensors 421A and 421B and one humidity sensor 422 are provided has been described, but as shown in FIG. 8-2A, the pressure sensor 421B and the humidity sensor 422 may be merely provided, and furthermore, as shown in FIG. 8-3A, only the humidity sensor 422 may be provided.

In the circuit board 400, the second sub-passage 306 is disposed on the back surface side of the substrate main body 401. Therefore, it is possible to cool the whole substrate main body 401 with the measured gas 30 passing through the second sub-passage 306.

4.2 Structure of Temperature Detecting Unit 451

A temperature detecting unit 451 is provided at an edge on the upstream side of the base portion 402 and on a corner part of the protruding portion 403. The temperature detecting unit 451 constitutes one of detecting units for detecting the physical quantity of the measured gas 30 flowing in the main passage 124, and is provided on the circuit board 400. The circuit board 400 has a protruding portion 450 which protrudes from the second sub-passage inlet 306a of the second sub-passage 306 toward the upstream of the measured gas 30, and the temperature detecting unit 451 has a chip type temperature sensor 453 provided on the protruding portion 450 and the back surface of the circuit board 400. The temperature sensor 453 and the wiring portion thereof are covered with a synthetic resin material to prevent electrolytic corrosion from occurring due to adhesion of salt water.

For example, as shown in FIG. 3-2, in the central portion of the measuring unit 331 provided with the second sub-passage inlet 306a, the upstream side outer wall 336 in the measuring unit 331 constituting the housing 302 is recessed toward the downstream side, and the protruding portion 450 of the circuit board 400 protrudes from the upstream side outer wall 336 having the recess shape toward the upstream side. The tip of the protruding portion 450 is disposed at a position recessed from the most upstream side surface of the upstream side outer wall 336. The temperature detecting unit 451 is provided on the protruding portion 450 so as to face the back surface of the circuit board 400, that is, the second sub-passage 306 side.

Since the second sub-passage inlet 306*a* is formed on the downstream side of the temperature detecting unit 451, the measured gas 30 flowing from the second sub-passage inlet 306*a* to the second sub-passage 306 comes into contact with the temperature detecting unit 451 and then flows in the second sub-passage inlet 306*a* and the temperature of the measured gas 30 is detected when the measured gas 30 comes into contact with the temperature detecting unit 451. The measured gas 30 which comes into contact with the temperature detecting unit 451 flows from the second sub-passage inlet 306*a* into the second sub-passage 306 and passes through the second sub-passage 306 to be discharged from the second sub-passage outlet 306*b* to the main passage 123.

4.4 Fixing of Circuit Board 400 by Resin Molding Process and Effect Thereof

Figures 1, 9:
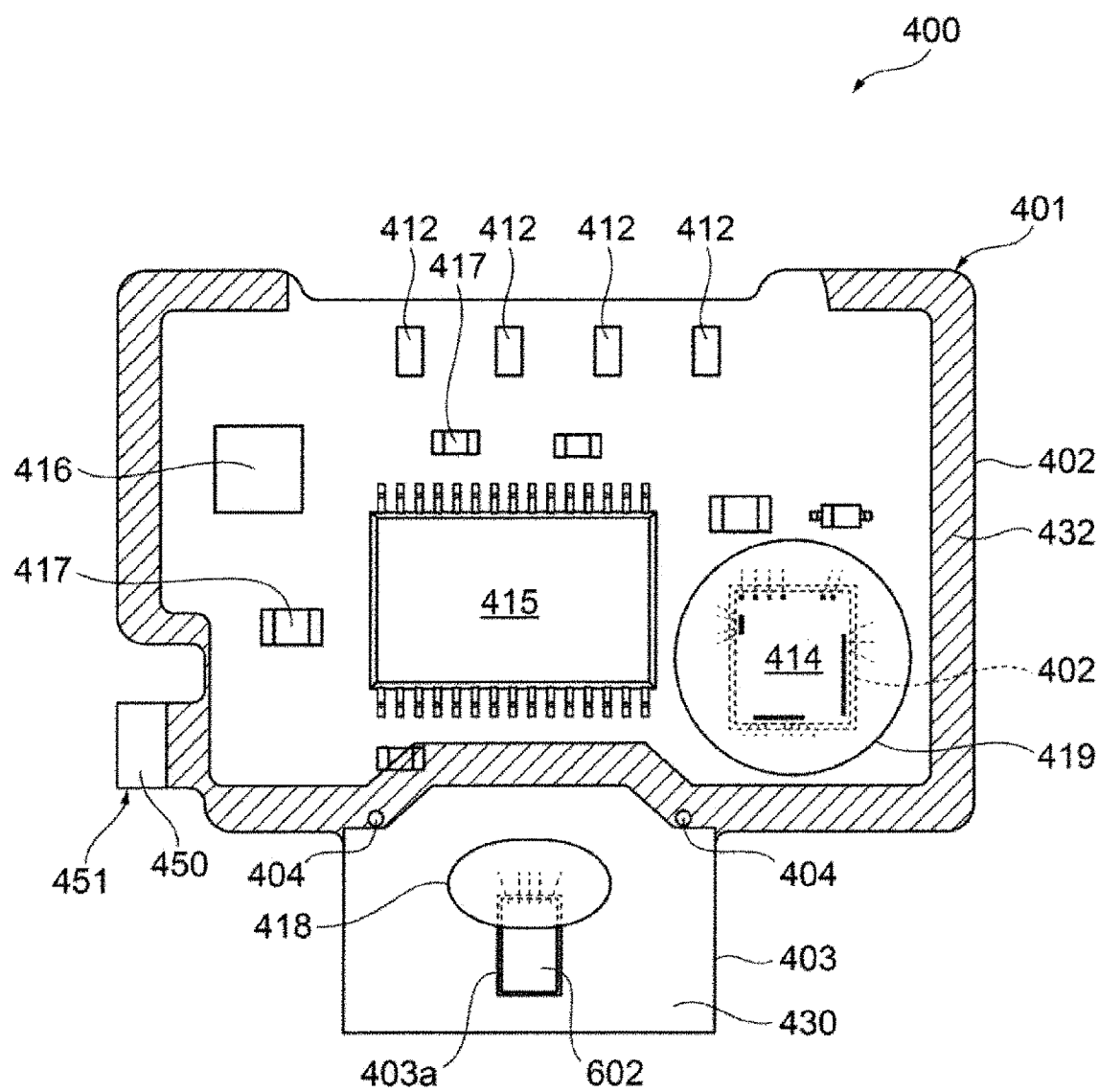
Figures 2, 9:
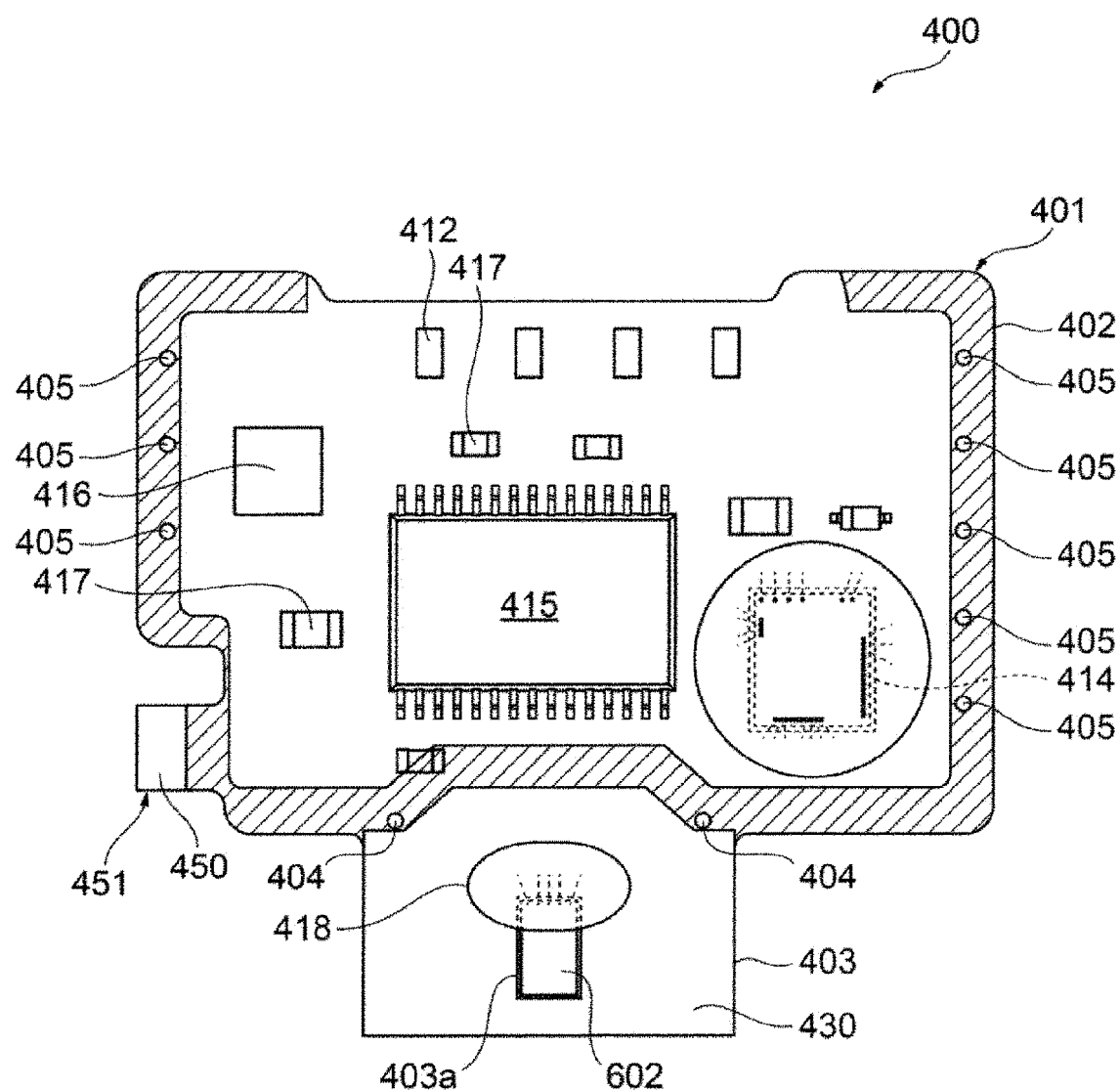
Figures 3, 9:
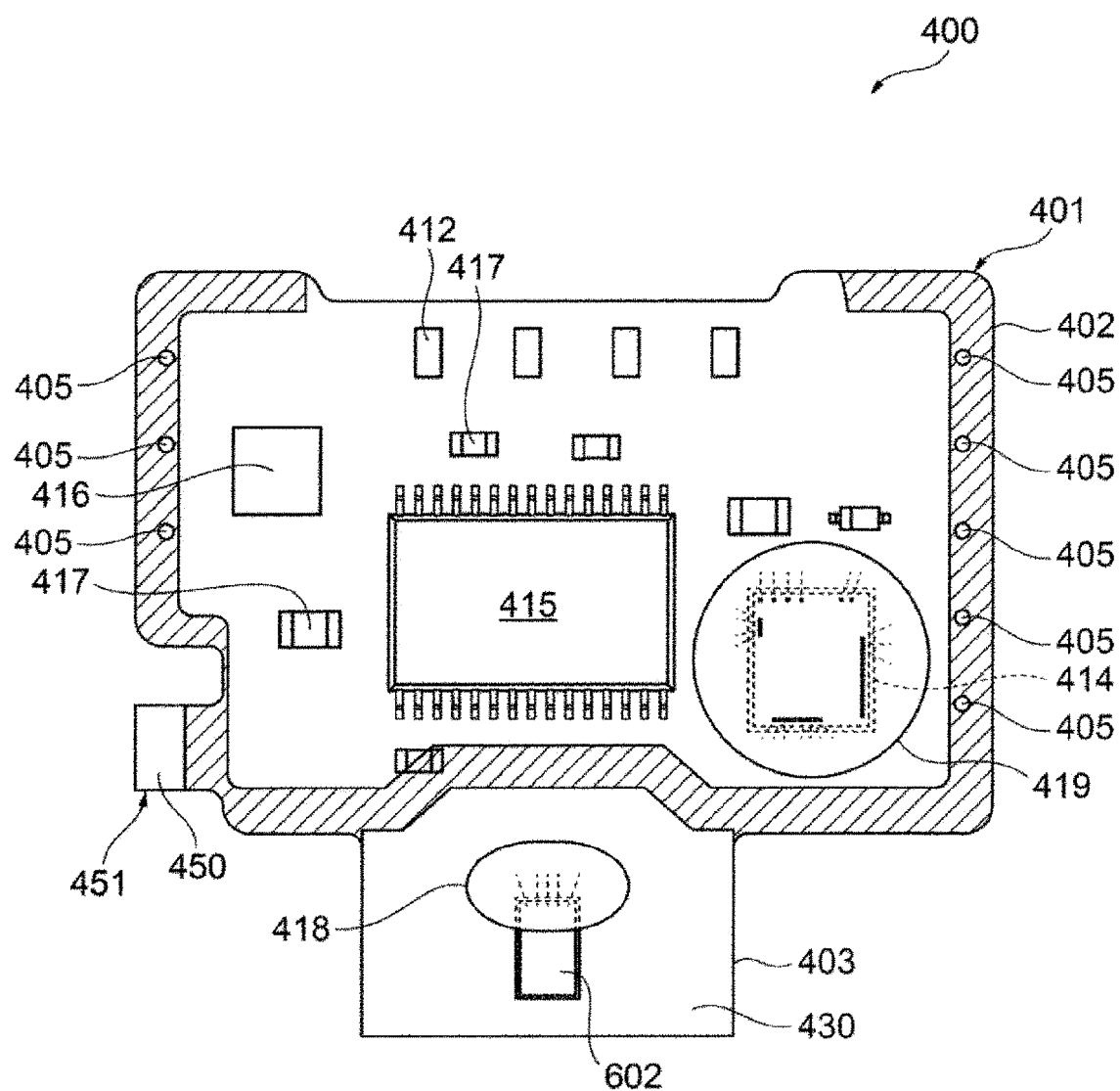
Figures 4, 9:
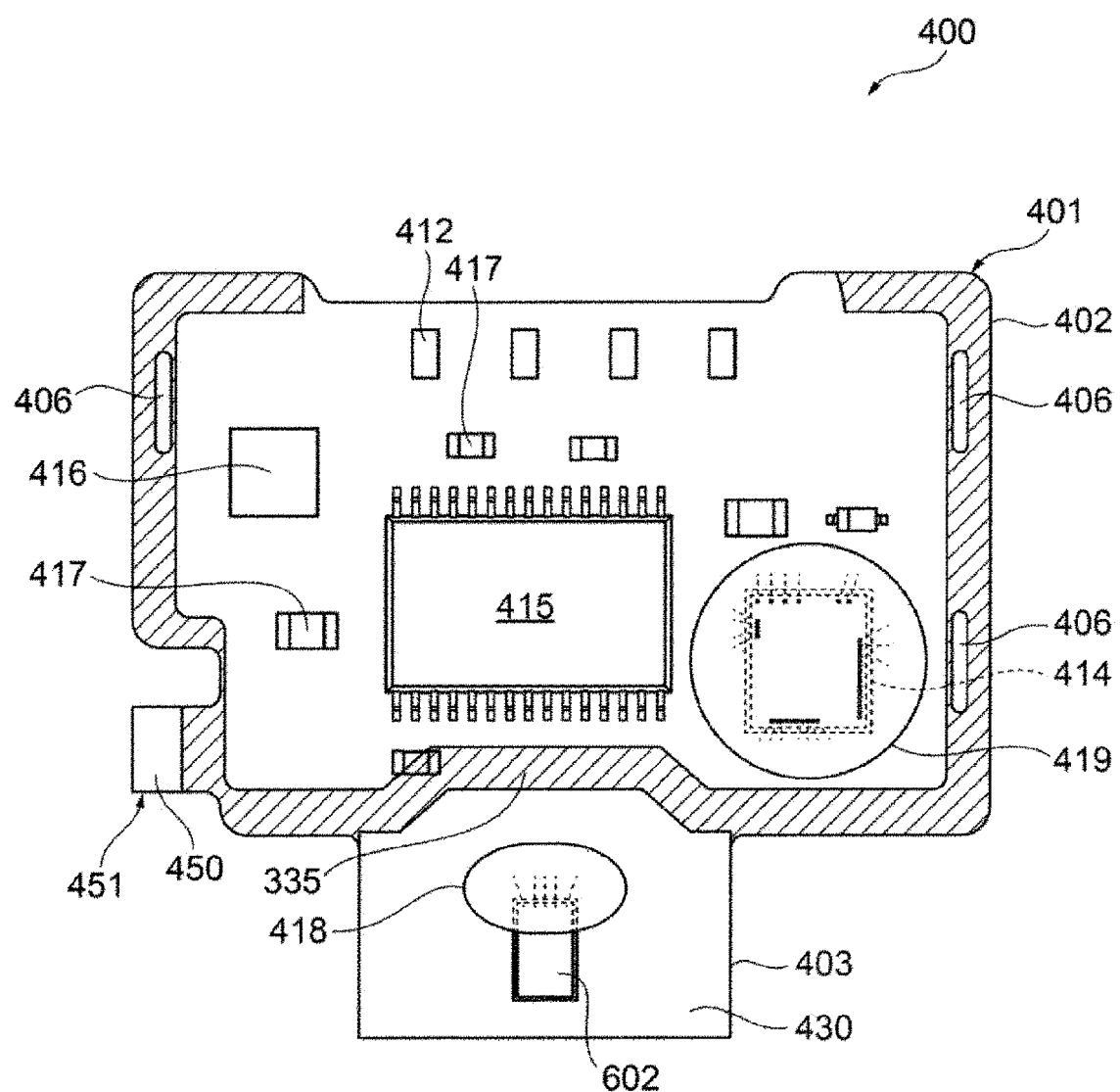
Figures 5, 9:
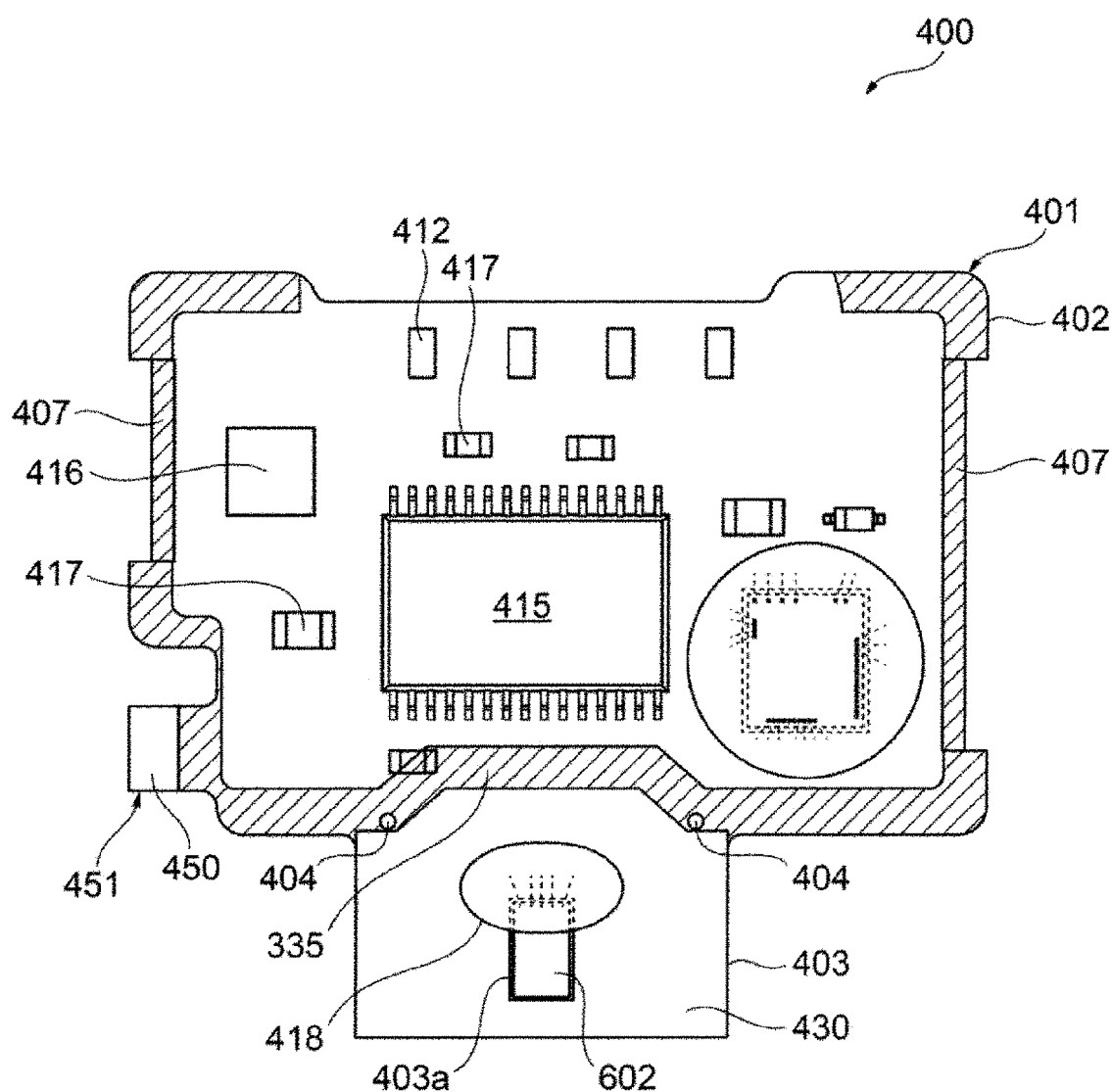
Figures 6, 9:
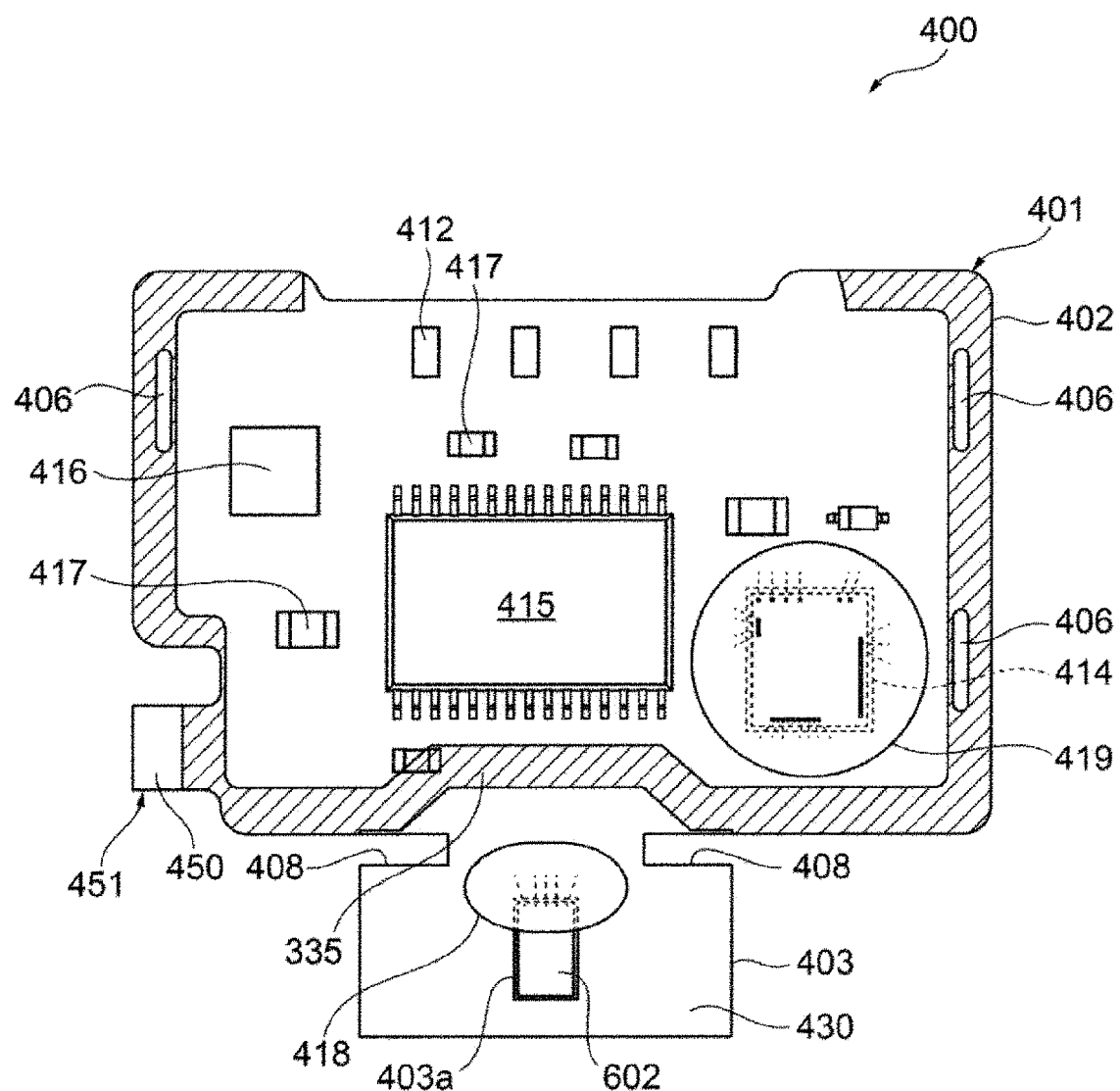
Figures 7, 9:
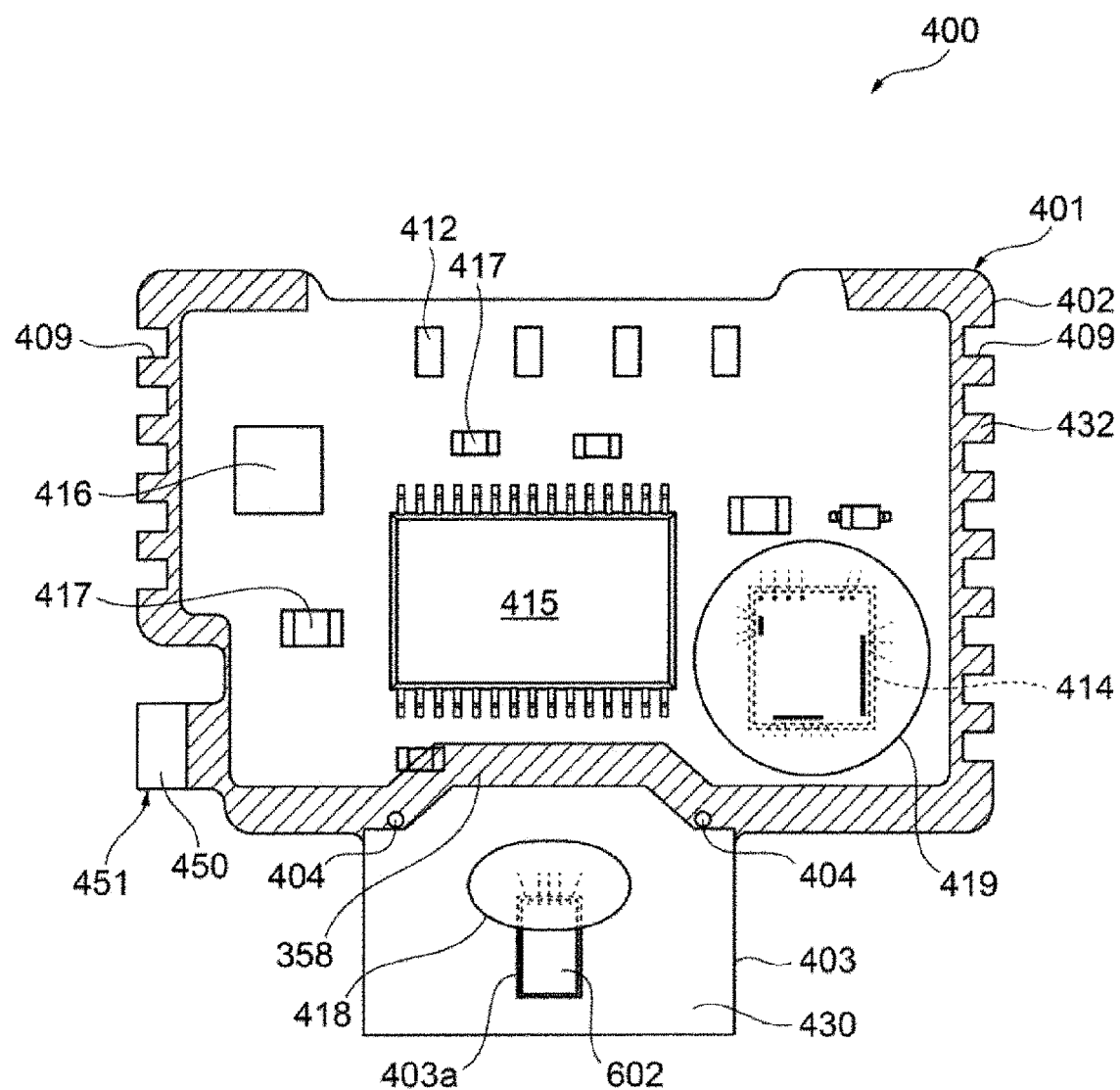
Figures 8, 9:
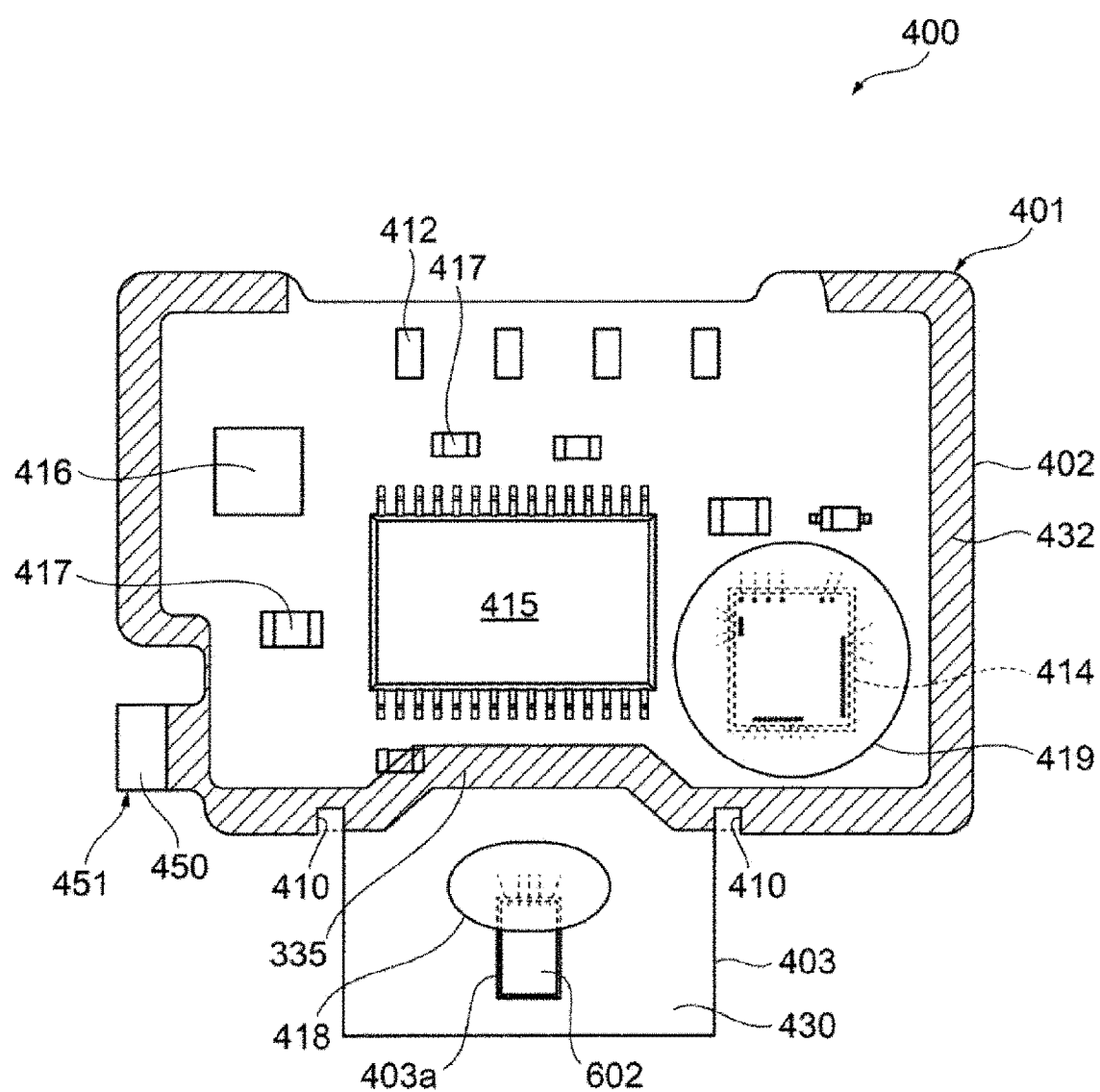

The hatched portion in FIG. 9-1 shows the fixed surface 432 and the fixed surface 434 for covering the circuit board 400 with the thermoplastic resin used in the resin molding process in order to fix the circuit board 400 to the housing 302 in the resin molding process. It is important to maintain, with high accuracy, the relationship of the shape between the measurement flow passage surface 430 and the flow-volume detecting unit 602 provided on the measurement flow passage surface 430 and the sub-passage so as to be the specified relationship.

In the resin molding process, the circuit board 400 is fixed to the housing 302 which molds the sub-passage and at the same time molds the sub-passage, such that the relationship between the sub-passage and the measurement flow passage surface 430 and the flow-volume detecting unit 602 can be maintained with extremely high accuracy. That is, since the circuit board 400 is fixed to the housing 302 in the resin molding process, it is possible to position and fix the circuit board 400 in the mold for molding the housing 302 having the sub-passage with high accuracy. By injecting the high-temperature thermoplastic resin into this mold, the sub-passage is molded with high accuracy and at the same time, the circuit board 400 is fixed with high accuracy. Therefore, errors and variations occurring in each circuit board 400 can be suppressed to extremely small values. As a result, the measurement accuracy of the circuit board 400 can be greatly improved.

In this embodiment, the outer periphery of the base portion 402 of the substrate main body 401 is covered with the fixed portions 372 and, 373 of the mold resin for molding the housing 302 to form the fixed surfaces 432 and 434. In the embodiment shown in FIG. 9-1, a through-hole 404 is provided on the substrate main body 401 of the circuit board 400 as a fixing means for more firmly fixing, and the through-hole 404 is filled with a mold resin so as to increase the fixing power of the substrate main body 401. The through-hole 404 is provided at a location to be fixed by the partition wall 335, and the partition wall 335 is connected to the front side and the back side via the through-hole 404.

The through-hole 404 is preferably provided at a location corresponding to the partition wall 335. Since the mold resin is a thermoplastic resin and the substrate main body 401 is made of glass epoxy, a chemical bonding action between the mold resin and the substrate main body 401 is low and the mold resin and the substrate main body 401 is difficult to adhere to each other tightly. The partition wall 335 has a length that is longer than the width, and has a structure that is easy to expand in a direction away from the substrate main body 401. Therefore, by providing the through-hole 404 at the location corresponding to the partition wall 335, the partition walls 335 sandwiching the substrate main body 401 therebetween can be physically coupled to each other through the through-hole 404. Therefore, it is possible to more firmly fix the circuit board 400 to the housing 302, and to prevent formation of a gap between the partition wall 335 and the protruding portions 403. Therefore, it is possible to prevent the measured gas 30 from passing through the gap between the partition wall 335 and the protruding portion 403 and penetrating into the circuit chamber Rc, and completely seal the inside of the circuit chamber Rc.

In the embodiment shown in FIG. 9-2, in addition to the through-hole 404, through-holes 405 having a round hole shape are provided on an edge side of the upstream side and an edge side of the downstream side of the base portion 402, respectively, and the through-hole 405 is filled with the mold resin to further increase the fixing power of the substrate main body 401. The edge side of the upstream side and the edge side of the downstream side of the base portion 402 are sandwiched from both sides in the thickness direction by the fixed portions 372 and 373, and furthermore, the front side and the back side are connected through the through-hole 405. Therefore, the circuit board 400 can be more firmly fixed to the housing 302.

It is preferable to provide the through-hole 404 on the partition wall 335. However, in the case where the partition wall 335 is fixed to the substrate main body 401 with a predetermined fixing power, the through-hole 404 can be omitted. In the embodiment shown in FIG. 9-3, the through-hole 404 is omitted, and the through-hole 405 is provided on the edge side of the upstream side and the edge side of the downstream side edge of the base portion 402. With such a configuration, the substrate main body 401 of the circuit board 400 can be firmly fixed to the housing 302.

It should be noted that the through-hole is not limited to the round hole shape, and may be, for example, a long hole shaped through-hole 406 as shown in FIG. 9-4. In this embodiment, the long hole shaped through-hole 406 is provided so as to extend along the edge side of the upstream side edge and the edge side of the downstream side of the base portion 402. Compared to the through-hole 406 having the round hole shape, in the case of the through-hole 406 having the long hole shape, the amount of resin connecting between the front side and the back side of the measuring unit 331 can be increased and the higher fixing power can be obtained.

In addition, in each of the above-described embodiments, the case of the through-holes 404, 405, and 406 as an example of the fixing means is described, but the present invention is not limited to the through-hole. For example, in the embodiment shown in FIG. 9-5, a large cutout portion 407 extending in a longitudinal direction are provided on the edge side of the upstream side and the edge side of the downstream side of the base portion 402. In the embodiment shown in FIG. 9-6, a cutout portion 408 is provided between the base portion 402 and the protruding portion 403. In addition, in the embodiment shown in FIG. 9-7, a plurality of cutout portions 409 are provided on the edge side of the upstream side and the edge side of the downstream side of the base portion 402 at a predetermined interval. In the embodiment shown in FIG. 9-8, a pair of cutout portions 410 which is cut out from both sides of the protruding portion 403 toward the base portion 402 is provided. With such a configuration, the substrate main body 401 of the circuit board 400 can be firmly fixed to the housing 302.

7. Circuit Configuration of Physical Quantity Detecting apparatus 300

7.1 Whole Circuit Configuration of Physical Quantity Detecting Apparatus 300

Figures 1, 11:
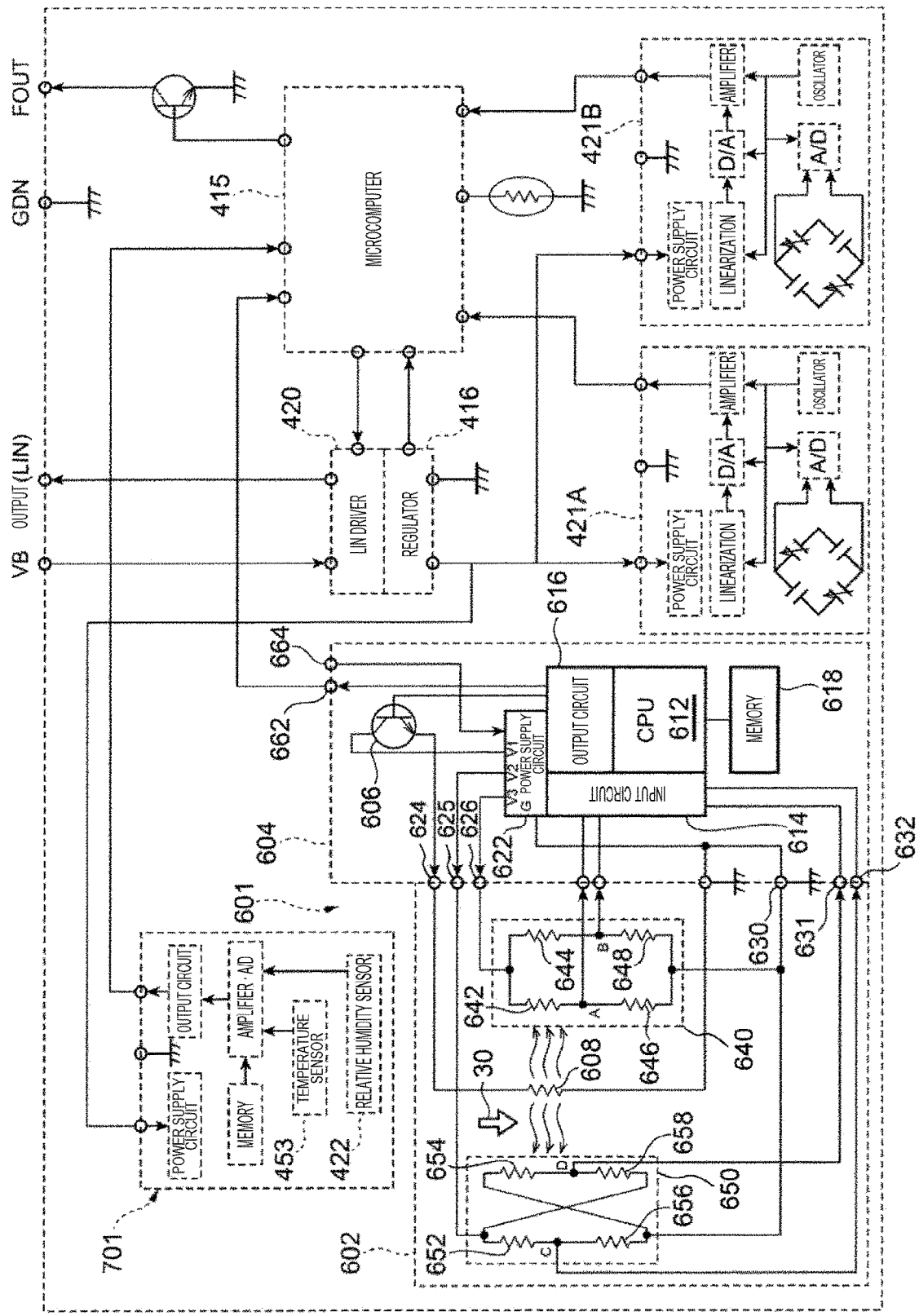
Figures 2, 11:
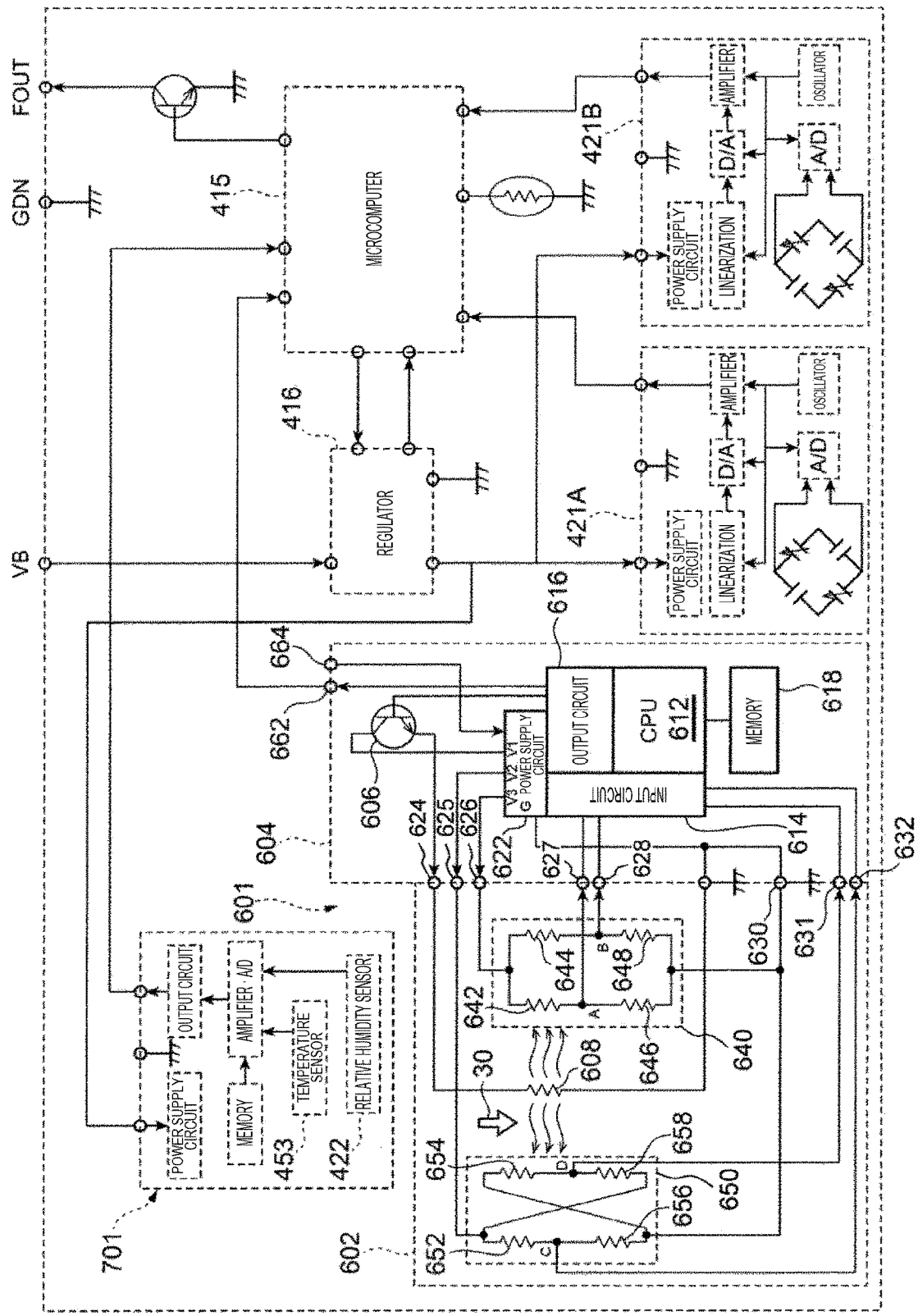

FIG. 11-1 is a circuit diagram of the physical quantity detecting apparatus 300. The physical quantity detecting apparatus 300 has a flow-volume detecting circuit 601 and a temperature and humidity detecting circuit 701.

The flow-volume detecting circuit 601 includes the flow-volume detecting unit 602 having a heating element 608 and a processing unit 604. The processing unit 604 controls the heating value of the heating element 608 of the flow-volume detecting unit 602, and at the same time, outputs a signal indicating the flow volume to the microcomputer 415 via the terminal 662 based on the output of the flow-volume detecting unit 602. In order to perform the processing, the processing unit 604 includes a central processing unit (hereinafter, referred to as CPU) 612, an input circuit 614, an output circuit 616, a memory 618 which holds data indicating a relationship between a correction value and a measured value and the flow volume, and a power supply circuit 622 which supplies a constant voltage to each necessary circuit. DC power is supplied to the power supply circuit 622 from an external power source such as an in-vehicle battery via a terminal 664 and a ground terminal (not shown).

The flow-volume detecting unit 602 is provided with the heating element 608 for heating the measured gas 30. A voltage V1 is supplied from the power supply circuit 622 to a collector of a transistor 606 constituting the current supply circuit of the heating element 608, a control signal is applied from the CPU 612 to a base of the transistor 606 via the output circuit 616, and a current is supplied from the transistor 606 to the heating element 608 via a terminal 624 based on the control signal. The amount of current supplied to the heating element 608 is controlled by the control signal applied from the CPU 612 to the transistor 606 constituting the current supply circuit of the heating element 608 via the output circuit 616. The processing unit 604 controls the heating value of the heating element 608 so that the temperature of the measured gas 30 is increased by a predetermined temperature, for example, 100° C. higher than the initial temperature by allowing the heating element 608 to heat the measured gas 30.

The flow-volume detecting unit 602 has a heat generation control bridge 640 for controlling the heating value of the heating element 608 and a flow-volume detecting bridge 650 for measuring a flow volume. A constant voltage V3 is supplied from the power supply circuit 622 to one end of the heat generation control bridge 640 via the terminal 626 and the other end of the heat generation control bridge 640 is connected to the ground terminal 630. In addition, a constant voltage V2 is supplied from the power supply circuit 622 to one end of the flow-volume detecting bridge 650 via the terminal 625, and the other end of the flow-volume detection bridge 650 is connected to the ground terminal 630.

The heat generation control bridge 640 has a resistor 642 which is a temperature measuring resistor whose resistance value varies based on the temperature of the heated measured gas 30, and the resistor 642, a resistor 644, a resistor 646, and a resistor 648 constitute a bridge circuit. The potential difference between the intersection A between the resistor 642 and the resistor 646 and the intersection B between the resistor 644 and the resistor 648 is input to the input circuit 614 via the terminal 627 and the terminal 628, and the CPU 612 controls the current supplied from the transistor 606 so that the potential difference between the intersection A and the intersection B becomes a zero volt in this embodiment, thereby controlling the heating value of the heating element 608. The flow-volume detecting circuit 601 shown in FIG. 11-1 heats the measured gas 30 by the heating element 608 so that the temperature of the measured gas 30 becomes a constant temperature, for example, 100° C. at all times. When the temperature of the measured gas 30 warmed by the heating element 608 increases to a constant temperature, for example 100° C., constantly with respect to the initial temperature so that this heating control can be performed with high accuracy, the resistance values of each resistance constituting the heat generation control bridge 640 are set so that the potential difference between the intersection A and the intersection B becomes zero volt. Therefore, in the flow-volume detecting circuit 601, the CPU 612 controls the supply current to the heating element 608 so that the potential difference between the intersection A and the intersection B becomes zero volt.

The flow-volume detecting bridge 650 is constituted by four temperature measuring resistors of a resistor 652, a resistor 654, a resistor 656, and a resistor 658. These four temperature measuring resistors are arranged along the flow of the measured gas 30, and the resistor 652 and the resistor 654 are disposed on the upstream side of the heating element 608 in the flow passage of the measured gas 30, and the resistor 656 and the resistor 658 are disposed on the downstream side of the flow passage of the measured gas 30 with respect to the heating element 608. In addition, in order to increase the measurement accuracy, the resistor 652 and the resistor 654 are disposed so that the distances up to the heating elements 608 are substantially the same, and the resistor 656 and the resistor 658 are arranged so that the distances up to the heating elements 608 are substantially the same.

The potential difference between the intersection C between the resistor 652 and the resistor 656 and the intersection D between the resistor 654 and the resistor 658 is input to the input circuit 614 via the terminal 631 and the terminal 632. In order to increase the measurement accuracy, each resistance of the flow-volume detecting bridge 650 is set so that the potential difference between the intersection C and the intersection D becomes zero, for example, in the state in which the flow of the measured gas 30 is zero. Therefore, in the state in which the potential difference between the intersection C and the intersection D is, for example, zero volt, the CPU 612 outputs from the terminal 662 the electric signal indicating that the flow volume of the main passage 124 is zero based on the measurement result that the flow volume of the measured gas 30 is zero.

When the measured gas 30 flows in the arrow direction in FIG. 11-1, the resistor 652 and the resistor 654 disposed on the upstream side are cooled by the measured gas 30, the resistor 656 and the resistor 658 disposed on the downstream side of the measured gas 30 are heated by the measured gas 30 warmed by the heating element 608 and the temperature of the resistor 656 and the resistor 658 rises. Therefore, the potential difference between the intersection C and the intersection D of the flow-volume detecting bridge 650 is generated, and is input to the input circuit 614 via the terminal 631 and the terminal 632. The CPU 612 searches for data indicating the relationship between the potential difference stored in the memory 618 and the flow volume in the main passage 124 based on the potential difference between the intersection C and the intersection D of the flow-volume detecting bridge 650, and obtains the flow volume of the main passage 124. The electric signal indicating the flow volume of the main passage 124 obtained in this way is output via the terminal 662. It should be noted that the terminal 664 and the terminal 662 shown in FIG. 11-1 are newly indicated with reference numerals, but are included in the connecting terminal 412 shown in FIG. 9-1 described above.

Data indicating the relationship between the potential difference between the intersection C and the intersection D and the flow volume of the main passage 124 is stored in the memory 618, and furthermore, after the production of the circuit board 400, correction data for reducing the measurement error such as variation, which is obtained based on the actually measured value of the gas, is stored.

The temperature and humidity detecting circuit 701 has an input circuit such as an amplifier, an A/D or the like for inputting a detection signal from the temperature sensor 453 and the humidity sensor 422, an output circuit, a memory holding data indicating the relationship between the correction value and the temperature or the absolute humidity, and a power supply circuit 622 for supplying a constant voltage to necessary circuits, respectively. The signals output from the flow-volume detecting circuit 601 and the temperature and humidity detecting circuit 701 are input to the microcomputer 415. The microcomputer 415 has a flow volume calculating unit, a temperature calculating unit, and an absolute humidity calculating unit, calculates a flow volume, a temperature, and an absolute humidity, which are physical quantities of the measured gas 30, based on the signal, and outputs the calculated data to an ECU 200.

In the internal combustion engine 110 as shown in FIG. 1, only a very small amount of measured gas 30 flows in the state in which the throttle valve 132 is fully closed, but a large amount of measured gas 30 flows in the state in which the throttle valve 132 is fully opened. For this reason, the flow-volume detecting apparatus 300 is required to have a wide measurement range with respect to the flow volume. Furthermore, it is required to deal with various flow volume states such as the state in which the measured gas 30 itself flows while pulsating due to the opening and closing operation of the intake valve 116, the state in which the flow volume suddenly changes, or the like.

Here, since the noise component due to factors other than the intake pulsation becomes relatively large in the low flow volume state in which the flow volume is small or in the steady state in which the flow volume does not change, it is required to stabilize the flow volume output. On the other hand, the error due to the response characteristic of the flow-volume detecting circuit 601 in the state in which the measured gas 30 is pulsated becomes large, such that the response correction of the flow-volume output is required. For this reason, in the former and the latter, the conflicting countermeasures are required in correcting the noise component of the flow-volume output. Furthermore, a suitable calculation method of the flow volume is different from the flow state (hereinafter, referred to as a flow-volume state) described above. For this reason, in the present embodiment, the flow-volume state is determined in the flow-volume detecting apparatus 300, and a flow-volume calculation method corresponding to each flow-volume state is adopted, thereby realizing the highly accurate flow-volume detecting apparatus 300 in a wide measurement flow-volume range. Since the determination of the flow-volume state is performed by the microcomputer 415, the microcomputer 415 constitutes a flow-volume state determining unit.

In the following description, noise means wider noise and the distortion of the signal in the noise components caused by the intake pulsation and the noise components caused by factors other than the intake pulsation.

Hereinafter, the flow-volume calculation method of the flow-volume detecting apparatus which is an example of the physical quantity detecting apparatus of this embodiment will be described.

[First Method (First Configuration)]

A first method of detecting the flow volume accurately by switching the flow-volume calculation method according to each flow-volume state will be described.

Figures 1, 12:
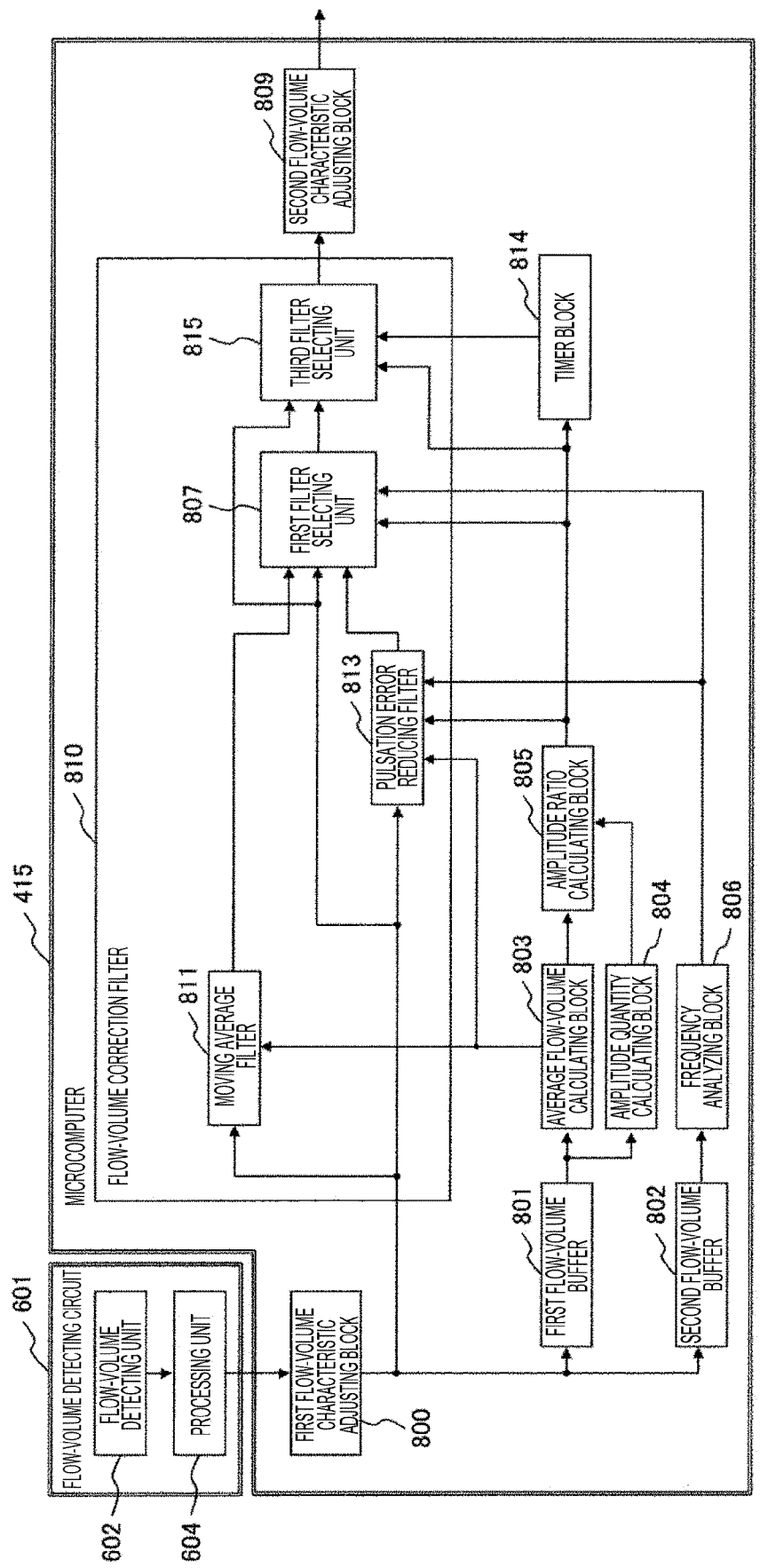
Figures 2, 12:
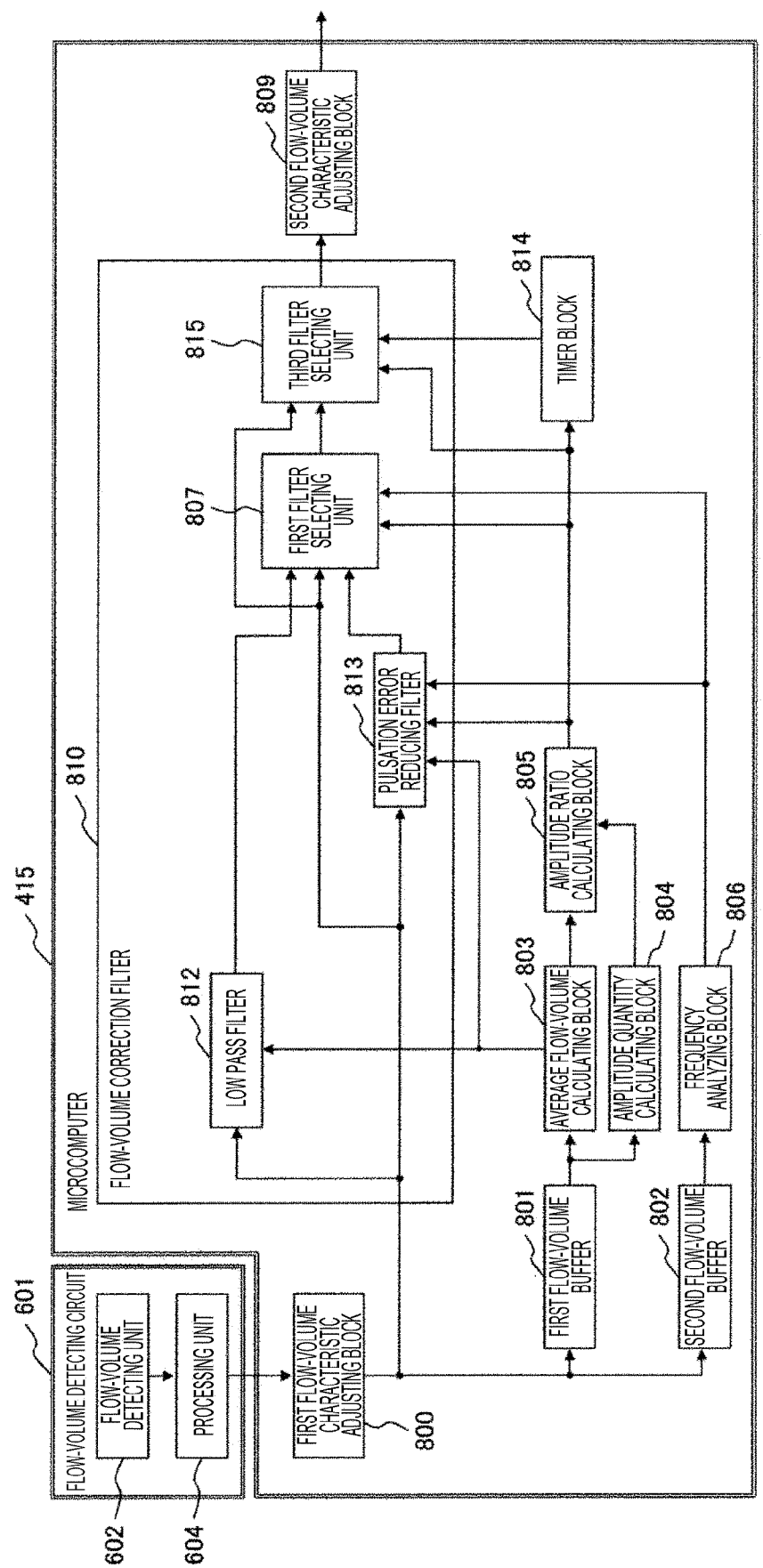
Figures 3, 12:
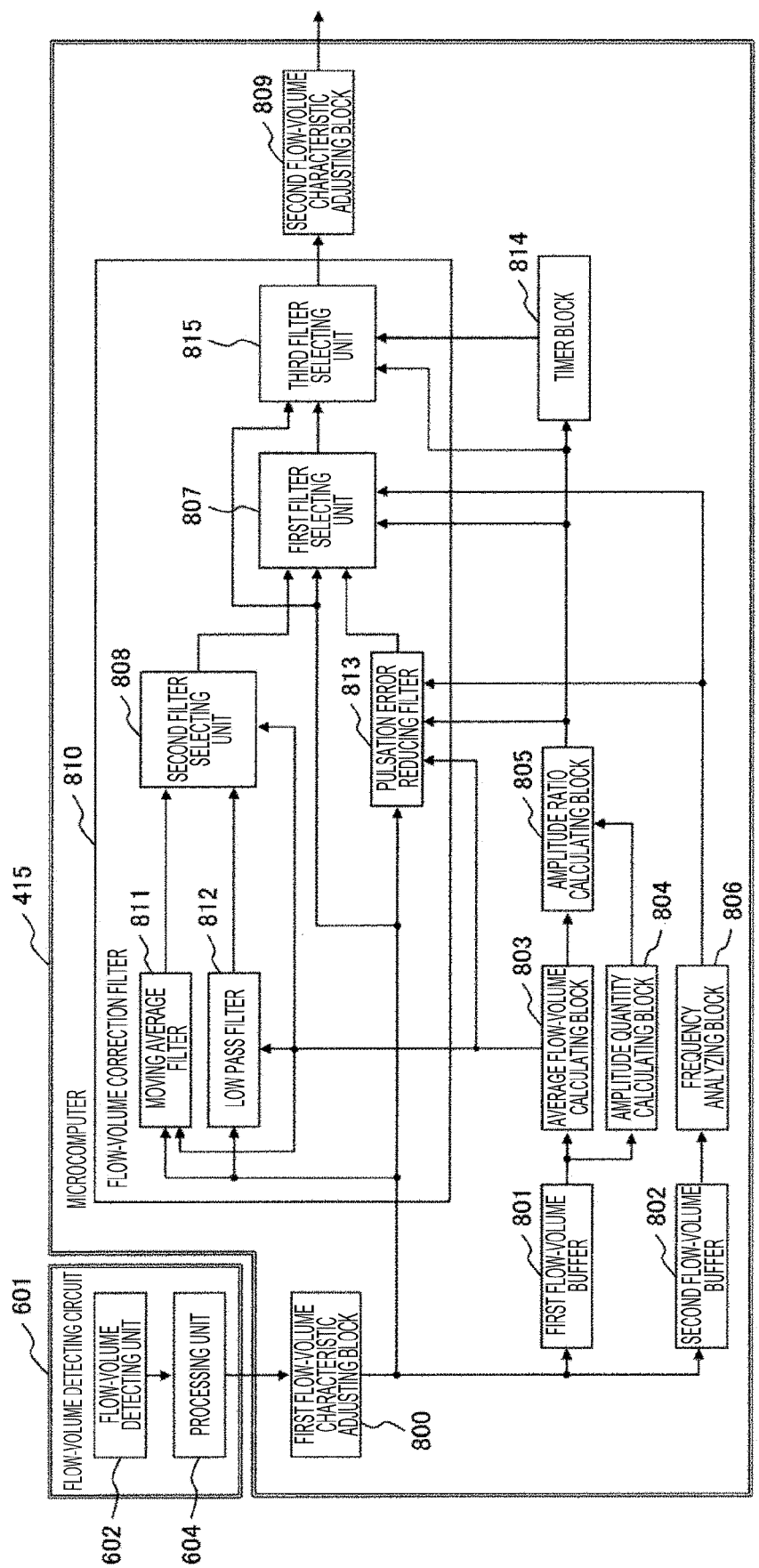

FIG. 12-1 is a block diagram showing a configuration of a physical quantity detecting apparatus according to an embodiment of the present invention.

First, as shown in FIG. 12-1, a flow-volume detecting apparatus according to the first method includes a flow-volume detecting circuit 601 and a microcomputer 415 which processes an output value of the flow-volume detecting circuit 601.

The flow-volume detecting circuit 601 includes a flow-volume detecting unit 602 which detects a physical quantity based on a flow volume, and a processing unit 604 which performs processing based on the physical quantity detected by the flow-volume detecting unit 602 and outputs a flow-volume output.

The microcomputer 415 includes a first flow-volume characteristic adjusting block (first flow-volume characteristic adjusting unit) 800 which gives desired characteristics to an output value of the flow-volume detecting circuit 601, a first flow-volume buffer 801 which buffers an output value of the first flow-volume characteristic adjusting block 800, a second flow-volume buffer 802 which buffers the output value of the first flow-volume characteristic adjusting block 800, an average flow-volume calculating block (average flow-volume calculating unit) 803 which calculates an average value of the output value (flow-volume signal) of the first flow-volume characteristic adjusting block 800 buffered in the first flow-volume buffer 801, an amplitude quantity calculating block 804 which calculates an amplitude quantity of the output value of the first flow-volume characteristic adjusting block 800 buffered in the first flow-volume buffer 801, an amplitude ratio calculating block (amplitude ratio calculating unit) 805 which calculates an amplitude ratio of the output value of the flow-volume detecting circuit 601 based on a calculation value of the average flow-volume calculating block 803 and a calculation value of an amplitude quantity calculating block (amplitude quantity calculating unit) 804, a frequency analyzing block (frequency analyzing unit) 806 which analyzes a frequency of the output value of the first flow-volume characteristic adjusting block 800 buffered in the second flow-volume buffer 802, a flow-volume correction filter 810, and a second flow-volume characteristic adjusting block (second flow-volume characteristic adjusting unit) 809 which gives desired characteristics to the output value filtered by the flow-volume correction filter 810.

The flow-volume correction filter 810 includes a moving average filter 811, a pulsation error reducing filter 813, a first filter selecting unit 807, a timer block (timer unit) 814, and a third filter selecting unit 815. The pulsation error reducing filter 813 is also called a pulsation reducing filter or a pulsation correction filter, and is a filter adopted in the case in which there is a cause causing pulsation in a flow-volume signal in the measurement environment and reduces the pulsation of the flow-volume signal. The moving average filter 811 is a filter suitable to be adopted when there is almost no flow volume in the measured environment, has the same function as a low pass filter, and reduces noise on a high frequency side included in the flow-volume signal.

The moving average filter 811 and the pulsation error reducing filter 813 are configured to receive the output value (output signal) of the first flow-volume characteristic adjusting block 800 and the output value (output signal) of the average flow-volume calculating block, and the signals processed by the moving average filter 811 and the pulsation error reducing filter 813 are each input to the first filter selecting unit 807. The output value of the first flow-volume characteristic adjusting block 800 is input to the first filter selecting unit 807, and the first filter selecting unit 807 selects an output value (output signal) of any of the first flow-volume characteristic adjusting block 800, the moving average filter 811, or the pulsation error reducing filter 813 and sends the selected output value to the third filter selecting unit 815. It is to be noted that a signal line which directly inputs the output value of the first flow-volume characteristic adjusting block 800 to the third filter selecting unit 815 by allowing the output value of the first flow-volume characteristic adjusting block 800 to bypass the first filter selecting unit 807 is provided. In addition, the output values of the amplitude ratio calculating block 805 and the frequency analyzing block 806 are input to the first filter selecting unit 807 as a signal for allowing the first filter selecting unit 807 to select a filter.

The signal of the timer block 814 is input to the third filter selecting unit 815, and used by selecting the filter that processes in the third filter selecting unit 815. In this case, since the third filter selecting unit 815 refers to the amplitude ratio calculated by the amplitude ratio calculating block 805, the amplitude ratio calculated by the amplitude ratio calculating block 805 is input to the third filter selecting unit 815. The timer block 814 is provided outside the flow-volume correction filter 810 in FIG. 12-1, but may be regarded as a part of the flow-volume correction filter 810. The same goes for the second method and the first method which will be described later.

Figure 13:
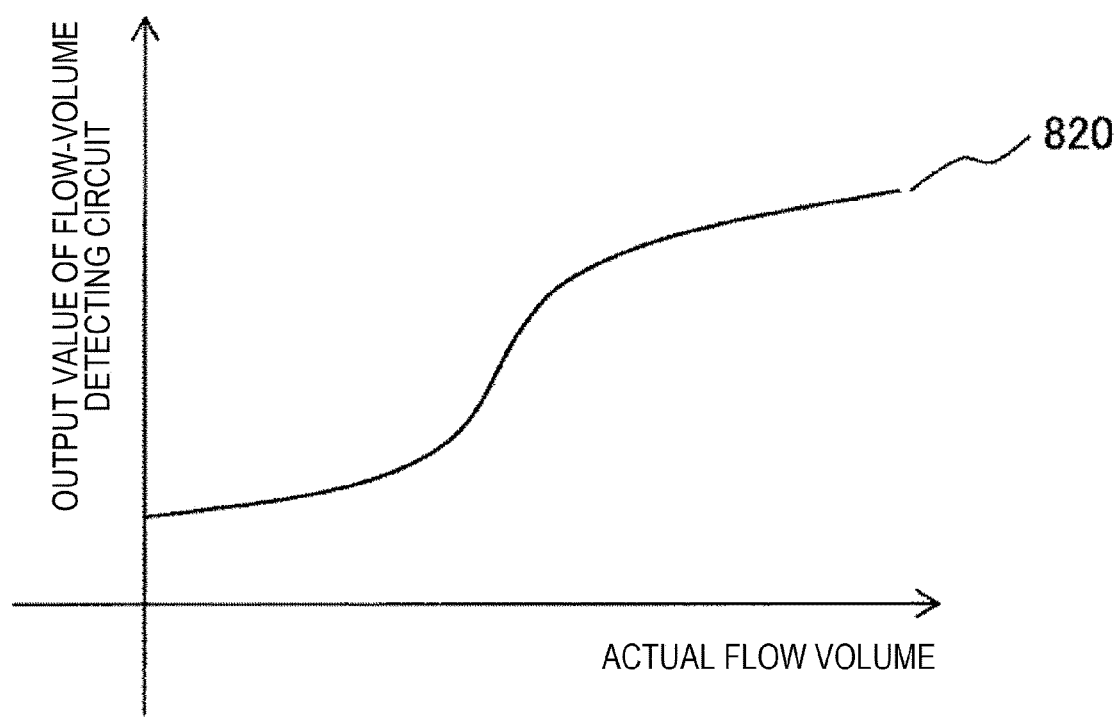
FIG. 13 is a graph showing output characteristics of a flow-volume detecting circuit.
Figure 14:
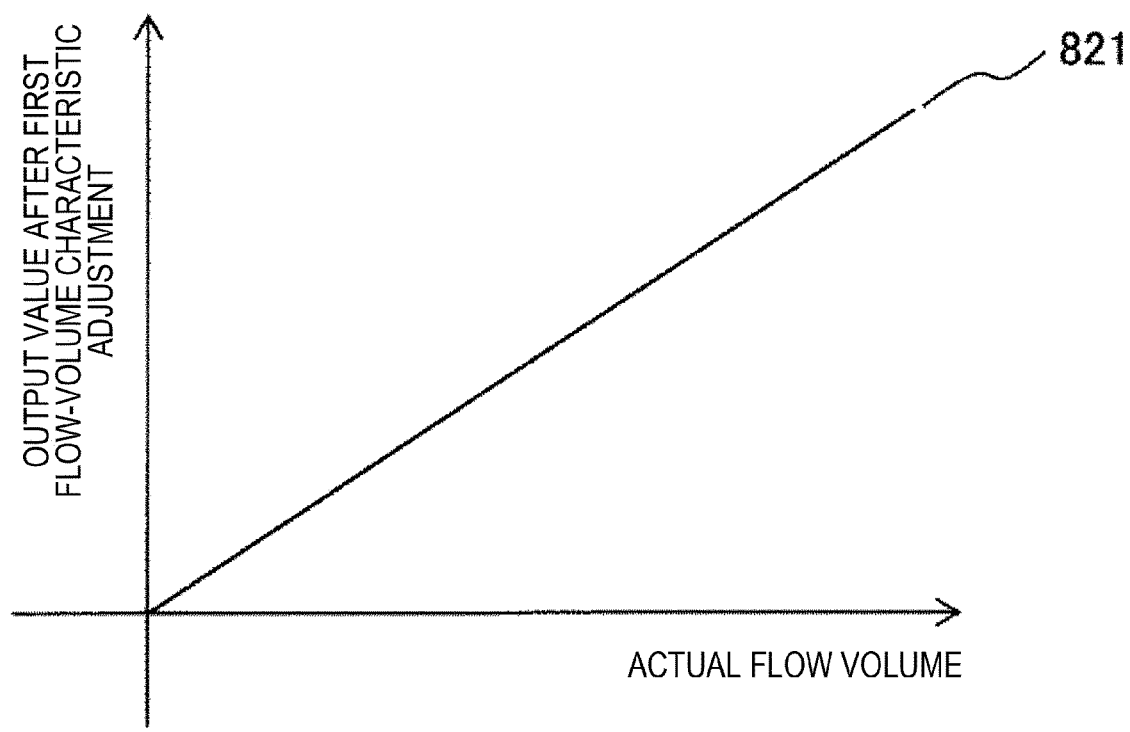
FIG. 14 is a graph showing the output characteristics after a first flow-volume characteristic adjustment block performs flow-volume characteristic adjustment.

FIG. 13 is a graph showing output characteristics of the flow-volume detecting circuit. FIG. 14 is a graph showing the output characteristics after the first flow-volume characteristic adjusting block performs the flow-volume characteristic adjustment.

The microcomputer 415 performs various calculations on the flow-volume output obtained by the processing unit 604 in the flow-volume detecting circuit 601. Therefore, the first flow-volume characteristic adjusting block 800 converts the output characteristic 820 of the flow-volume detecting circuit 601 shown in FIG. 13 into internal calculation characteristics 821 shown in FIG. 14.

The first flow-volume buffer 801 and the second flow-volume buffer 802 buffer the flow-volume value converted by the first flow-volume characteristic adjusting block 800 so that at least one cycle of pulsation of the flow-volume is retained.

The average flow-volume calculating block 803 calculates the average value of the flow-volume value stored in the first flow-volume buffer 801. The amplitude quantity calculating block 804 calculates a difference between a maximum value and a minimum value of the flow-volume value stored in the first flow-volume buffer 801 as the amplitude quantity (the amplitude value of the pulsation). The amplitude ratio calculating block 805 divides an amplitude quantity Fam calculated by the amplitude quantity calculating block 804 by an average flow-volume value Fav calculated by the average flow-volume calculating block 803 to calculate an amplitude ratio (Fam/Fav) with respect to the average flow-volume value.

The frequency analyzing block 806 performs a discrete Fourier transform on the flow-volume values stored in the second flow-volume buffer 802 to obtain a spectrum for each analysis frequency. As shown in Equation 1, the analysis frequency is calculated based on the number of engine cylinders 112, for example, a generated rotational speed range from idling revolutions per minute to maximum revolutions per minute. Therefore, the analysis frequency range may be limited in advance. For example, from spectra for each analysis frequency obtained, the frequency of the maximum spectrum, or the maximum spectrum, and a frequency calculated by various approximation methods in the vicinity of the maximum spectrum are set as the pulsation frequency of the measured gas 30.

[Equation 1]

$$\text{Freq\_min} = \frac{\text{N\_Cylinder} \times \text{Revolutions\_min}}{60 \times den}$$

$$\text{Freq\_max} = \frac{\text{N\_Cylinder} \times \text{Revolutions\_max}}{60 \times den}$$

$$den = \begin{cases} \frac{\text{N\_Cylinder}}{2} & \ldots \text{N\_Cylinder}\%2 = 0 \text{ (In case of even number)} \\ \text{N\_Cylinder} & \ldots \text{N\_Cylinder}\%2 = 1 \text{ (In case of even number)} \end{cases}$$

In Equation 1, Freq_min is a minimum analysis frequency [Hz], Freq_max is a maximum analysis frequency [Hz], N_Cylinder is the number of engine cylinders, Revolutions_min is a minimum number of revolutions [rpm], Revolutions_max is maximum revolutions per minute [rpm].

Figures 1, 15:
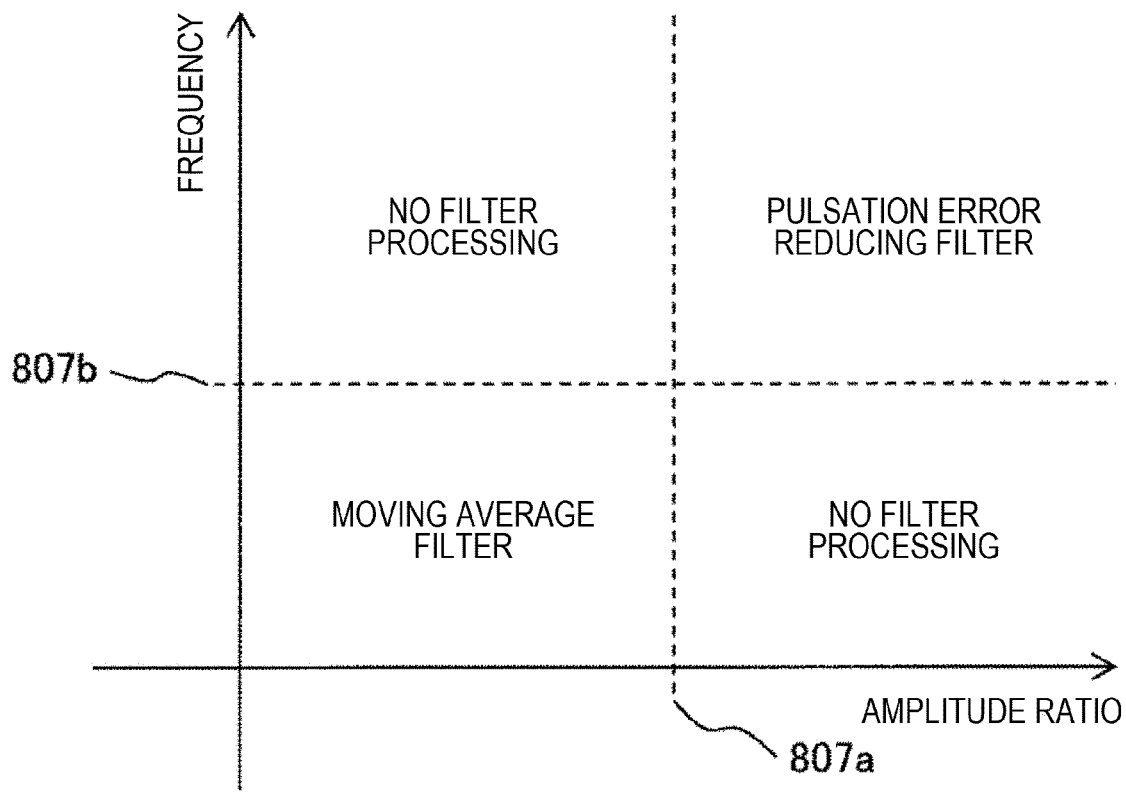
Figures 2, 15:
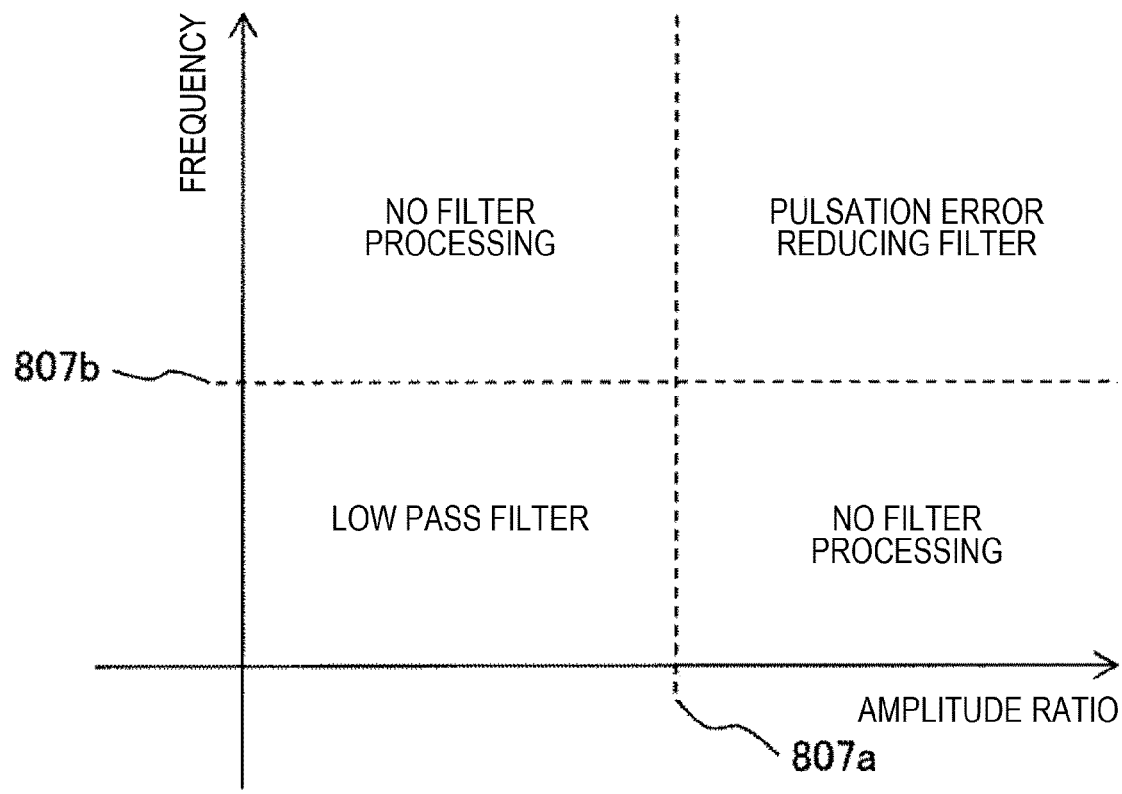
Figures 3, 15:
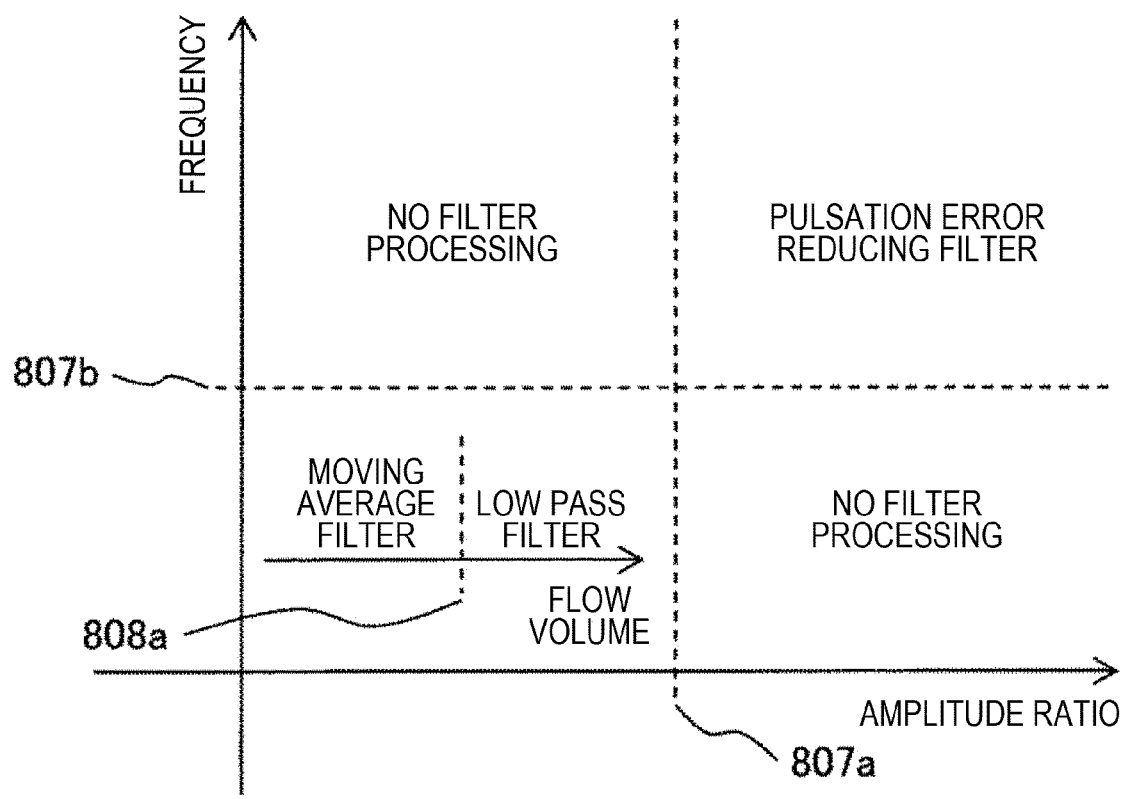

A filter switching method will be described with reference to FIG. 15-1. FIG. 15-1 is a diagram showing a relationship between a determination condition and applied filter characteristics, according to an embodiment of the present invention.

The first filter selecting unit 807 compares the amplitude ratio calculated by the amplitude ratio calculating block 805 with an amplitude ratio threshold value 807a and compares the frequency calculated by the frequency analyzing block 806 with a frequency threshold value 807b. As shown in FIG. 15-1, when the amplitude ratio calculated by the amplitude ratio calculating block 805 is larger than the amplitude ratio threshold value 807a and the frequency calculated by the frequency analyzing block 806 is larger than the frequency threshold value 807b, the first filter selecting unit 807 selects the output value (output signal) of the pulsation error reducing filter 813. By doing so, it possible to correct the response delay in a radio frequency state in which the pulsation error due to the response characteristics of the flow-volume detecting circuit 601 tends to be large and in a state in which the signal output from the processing unit 604 dynamically changes.

On the other hand, when the amplitude ratio calculated by the amplitude ratio calculating block 805 is smaller than the amplitude ratio threshold value 807a and the frequency calculated by the frequency analyzing block 806 is smaller than the frequency threshold value 807b, the first filter selecting unit 807 selects the output value (output signal) of the moving average filter 811. By doing so, it is possible to suppress a relatively large noise component in a low frequency state in which the pulsation error due to the response characteristics of the flow-volume detecting circuit 601 tends to be small and in a state in which the signal output from the processing unit 604 is small.

In addition, when the amplitude ratio calculated by the amplitude ratio calculating block 805 is larger than the amplitude ratio threshold value 807a and the frequency calculated by the frequency analyzing block 806 is smaller than the frequency threshold value 807b and when the amplitude ratio calculated by the amplitude ratio calculating block 805 is smaller than the amplitude ratio threshold value 807a and the frequency calculated by the frequency analyzing block 806 is larger than the frequency threshold value 807b, the first filter selecting unit 807 selects an output value that is not filtered. That is, in this case, the filter processing is not performed. Since a response in the response characteristics of the flow-volume detecting circuit 601 can be made in the radio frequency state in which the pulsation error tends to be large due to the response characteristics of the flow-volume detecting circuit 601 but in the state in which the change in the signal output from the processing unit 604 is small, and in the low frequency state in which the pulsation error is small due to the response characteristics of the flow-volume detecting circuit 601 but in the state in which the change in the signal output from the processing unit 604 is large, the filter processing is not applied.

When the amplitude ratio calculated by the amplitude ratio calculating block 805 exceeds a predetermined threshold value, the third filter selecting unit 815 performs clocking by the timer block 814 and selects a signal to which the filter processing is not applied for a predetermined period of time. As a result, when the amplitude ratio calculated by the amplitude ratio calculating block 805 varies in the vicinity of the amplitude ratio threshold value 807a, when the frequency calculated by the frequency analyzing block 806 varies with the frequency threshold value 807b, when the amplitude calculated by the amplitude ratio calculating block 805 varies in the vicinity of the amplitude ratio threshold value 807a, and when the frequency calculated by the frequency analyzing block 806 varies at the frequency threshold value 807b, it is possible to prevent the switching of the filtering process from frequently occurring. Although counting down or counting up is performed in the timer block 814 to determine whether or not a predetermined period of time has elapsed, it is possible to apply the filtering processing selected by the first filter selecting unit 807 at all times by setting the count value.

Figure 16:
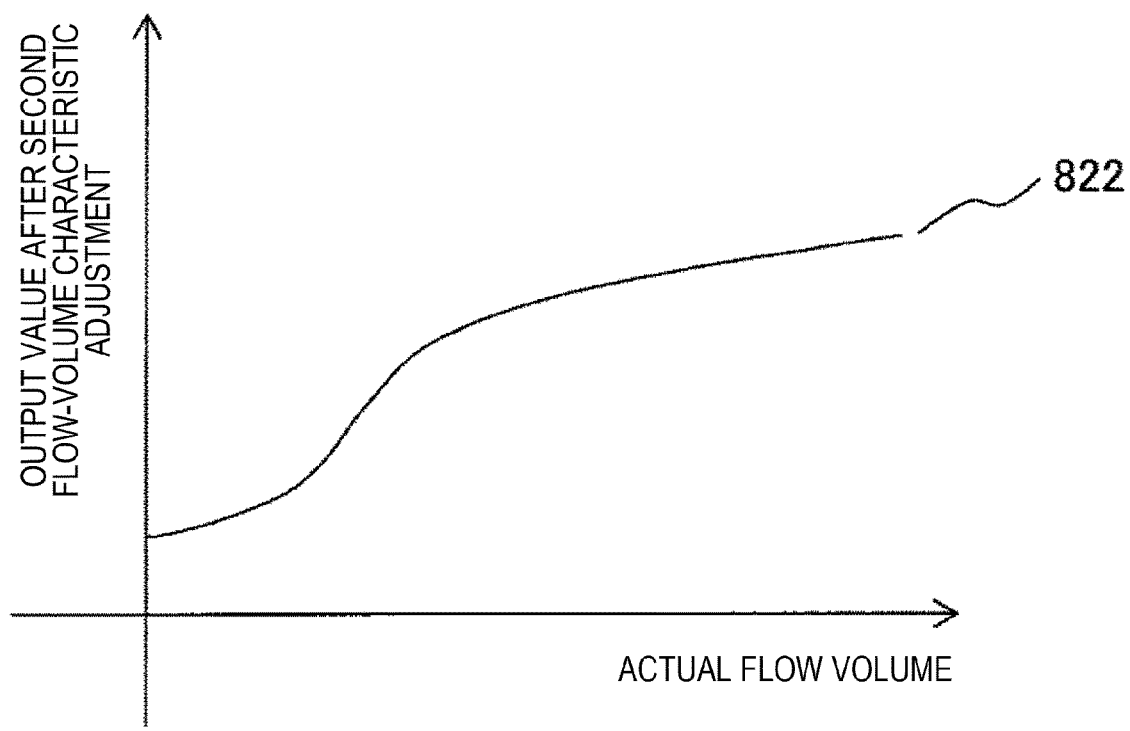
FIG. 16 is a diagram showing output characteristics obtained by performing a second flow-volume characteristic investigation.

The second flow-volume characteristic adjusting block 809 converts the flow-volume output in the internal calculation characteristics 821 shown in FIG. 14, which is calculated by the flow-volume calculating method selected by the first filter selecting unit 807, into output characteristics 822 of the flow-volume detecting apparatus shown in FIG. 16.

[Second Method (Second Configuration)]

A second method of detecting a flow volume with high accuracy by switching the flow-volume calculation method according to each flow-volume state will be described. A description of the same parts as the first method will be omitted.

FIG. 12-2 is a block diagram showing a configuration of a physical quantity detecting apparatus according to an embodiment of the present invention.

In a flow-volume detecting apparatus according to the second method, as shown in FIG. 12-2, the second method is different from the first method in that the moving average filter 811 of the flow-volume correction filter 810 in the first method is replaced by a low pass filter 812. The low pass filter 812 is a filter suitable to be adopted when a flow volume is small, has the same function as the moving average filter, and reduces noise on the high frequency side included in the flow-volume signal. The low pass filter 812 may be configured to be capable of setting a plurality of cutoff frequencies to be applied according to a magnitude of the flow volume detected by the flow-volume detecting unit 602 or a value of the flow-volume signal input to the low pass filter 812. The other configuration including the signal flow is the same as the configuration in the first method shown in FIG. 12-1.

FIG. 15-2 is a diagram showing a relationship between a determination condition and applied filter characteristics, according to an embodiment of the present invention.

In the second method, the amplitude ratio threshold value 807a and the frequency threshold value 807b are set in the same manner as in the first method, and as shown in FIG. 15-2, in the case of the same condition as the condition of selecting the moving average filter 811 by the first method, the first filter selecting unit 807 selects the low pass filter 812. The condition of selecting the pulsation error reducing filter 813 and the condition of not performing the filtering processing are set to the same condition as the first method as shown in FIG. 15-2. By doing so, the low pass filter 812 can suppress a relatively large noise component in the low frequency state in which the pulsation error due to the response characteristics of the flow-volume detecting circuit 601 is small and in the state in which the signal output from the processing unit 604 is small. The case in which the pulsation error reducing filter 813 is selected and the case in which the filter processing is not performed are as described in the first method.

[Third Method (Third Configuration)]

A third method of detecting a flow volume with high accuracy by switching the flow-volume calculation method according to each flow-volume state will be described. A description of the same parts as the first method and the second method will be omitted.

FIG. 12-3 is a block diagram showing a configuration of a physical quantity detecting apparatus according to an embodiment of the present invention.

As shown in FIG. 12-3, the flow-volume detecting apparatus according to the third method is different from the configuration of the first method and the configuration of the second method in that both the moving average filter 811 and the low pass filter 812 are provided in the flow-volume correction filter 810, and furthermore the second filter selecting unit 808 is provided to select either the moving average filter 811 or the low pass filter 812 so as to transmit a signal to the first filter selecting unit 807. Other configurations are the same as the configuration in the first method shown in FIG. 12-1 and the configuration in the second method shown in FIG. 12-2.

In the third method, each of the moving average filter 811, the low pass filter 812, and the pulsation error reducing filter 813 is configured so that the output value (output signal) of the first flow-volume characteristic adjusting block 800 is input. The output values (output signals) of the moving average filter 811 and the low pass filter 812 are each input to the second filter selecting unit 808, and the second filter selecting unit 808 selects either the output value of the moving average filter 811 or the output value of the low pass filter 812 and transmits the selected value to the first filter selecting unit 807. The output value (output signal) of the average flow-volume calculating block 803 is input to the second filter selecting unit 808 in order to select the output values of each filter 811 and 812.

The output values of the first flow-volume characteristic adjusting block 800, the second filter selecting unit 808, and the pulsation error reducing filter 813 are input to the first filter selecting unit 807, and the first filter selecting unit 807 selects any of the output values of the first flow-volume characteristic adjusting block 800, the second filter selecting unit 808, and the pulsation error reducing filter 813 and transmits the selected output value to the third filter selecting unit 815. It is to be noted the output value of the first flow-volume characteristic adjusting block 800 is directly input to the third filter selecting unit 815 by bypassing the first filter selecting unit 807.

FIG. 15-3 is a diagram showing a relationship between a determination condition and applied filter characteristics, according to an embodiment of the present invention.

The condition of selecting the pulsation error reducing filter 813 and the condition of not performing the filtering processing are set to the same condition as the first method and the second condition as shown in FIG. 15-3. The effect obtained by this signal processing is as described in the first method.

On the other hand, when the amplitude ratio calculated by the amplitude ratio calculating block 805 is smaller than the amplitude ratio threshold value 807a and the frequency calculated by the frequency analyzing block 806 is smaller than the frequency threshold value 807b, the first filter selecting unit 807 selects the output of the second filter selecting unit.

The second filter selecting unit 808 compares the average flow-volume value calculated by the average flow-volume calculating block 803 with a flow-volume threshold value 808a. As shown in FIG. 15-3, when the average flow-volume value calculated by the average flow-volume calculating block 803 is larger than the flow-volume threshold value 808a, the low pass filter 812 is selected, and when the average flow-volume value calculated by the average flow-volume calculating block 803 is smaller than the flow-volume threshold value 808a, the moving average filter 811 is selected.

As described in the first method and the second method, either the moving average filter 811 or the low pass filter 812 may be used, and in either case, the same effect is obtained as described above. However, when there is a pulsation or the like in the flow-volume signal, a deviation in the central value of the flow-volume signal occurs in the low pass filter 812. In addition, for the purpose of removing the noise, there are cases where it is advantageous to use the low pass filter 812. For this reason, the moving average filter 811 is used in the region in which the flow volume is small and the accuracy is required, and the low pass filter 812 is used in the region in which the flow volume is large.

[Fourth Method (Fourth Configuration)]

A fourth method of detecting a flow volume with high accuracy by switching the flow-volume calculation method according to each flow-volume state will be described. A description of the same parts as the first method to the third method will be omitted.

When buffer lengths of the first flow-volume buffer 801 and the second flow-volume buffer 802 are equal or when it is possible to change a reference range of the buffer, a plurality of flow-volume buffers are not provided and may be integrated in a buffer satisfying the required maximum buffer length. In addition, the second flow-volume buffer 802 may buffer the flow-volume output obtained by the processing unit 604 in the flow-volume detecting circuit 601 so that at least the flow-volume pulsation cycle or more is retained.

The physical quantity detecting apparatus 300 and the ECU 200 are connected to each other by a communication cable, and communication using a digital signal is performed according to a communication standard such as SENT, LIN, and CAN. In the present embodiment, a signal is input from the microcomputer 415 to a LIN driver 420, and LIN communication is performed from the LIN driver 420. The information output from the LIN driver of the physical quantity detecting apparatus 300 to the ECU 200 is superimposed and output by the digital communication using a single or two-wire communication cable.

The corrected absolute humidity calculated by the absolute humidity calculating unit of the physical quantity detecting apparatus 300 is used for various engine operation controls by the control unit 62 of the ECU 18. In addition, the ECU 18 can directly use the information on the total error for various engine operation control.

In the embodiment shown in FIG. 11 described above, the case in which the physical quantity detecting apparatus 300 has the LIN driver 420 and the LIN communication is performed, but the present invention is not limited thereto, and as shown in FIG. 11-2, the direct communication with the microcomputer 415 may be performed without using the LIN communication.

The physical quantity detecting apparatus 300 of the present embodiment includes a flow-volume detecting apparatus. The flow-volume detecting apparatus 300 may be constituted by a single flow-volume detecting apparatus or may be configured by a combination of other detecting apparatuses such as the humidity detecting apparatus.

According to the present invention, by switching the applied filter according to the amplitude ratio of the flow-volume measurement value and the frequency analysis result of the flow-volume measurement value, it is possible to reduce the flow-volume error by mainly applying the filter corresponding to the intake pulsation in the state in which the measured fluid is pulsated. On the other hand, for example, in the case where the measured flow volume is small, it is possible to reduce the flow-volume detection error by mainly applying the filter corresponding to noise. As a result, the physical quantity detecting apparatus 300 of the present embodiment can handle a wide measurement flow-volume range and various flow-volume states. In addition, since there are only of the flow-volume measurement value and the physical quantity calculated based on the flow-volume measurement value, a measurement element other than the flow-volume detecting circuit becomes unnecessary, and the scale of the system can be reduced.

Although the embodiments of the present invention have been described above in detail, the present invention is not limited to the above-described embodiments, and various design changes can be made without departing from the spirit of the present invention described in the claims. For example, the above-described embodiments have been described in detail in order to easily explain the present invention in an easy-to-understand manner, and are not necessarily limited to those having all the configurations described. Further, apart of the configuration of one embodiment can be replaced by the configuration of another embodiment, and the configuration of another embodiment can also be added to the configuration of one embodiment. Furthermore, it is possible to add, delete, and replace other configurations with respect to a part of the configuration of each embodiment.

REFERENCE SIGNS LIST 30 measured gas
124 main passage 300 physical quantity detecting apparatus
302 housing
400 circuit board
404, 405, 406 through-hole
407, 408 cutout portion
421A, 421B pressure sensor (third detecting unit)
422 humidity sensor (second detecting unit)
601 flow-volume detecting circuit
602 flow-volume detecting unit (first detecting unit)
604 processing unit
415 microcomputer
800 first flow-volume characteristic adjusting block
801 first flow-volume buffer
802 second flow-volume buffer
803 average flow-volume calculating block
804 amplitude quantity calculating block
805 amplitude ratio calculating block
806 frequency analyzing block
807 first filter selecting unit
808 second filter selecting unit
808a flow-volume threshold value
809 second flow-volume characteristic adjusting block
807a amplitude ratio threshold value
807b frequency threshold value
810 flow-volume correction filter
811 moving average filter
812 low pass filter
813 pulsation error reducing filter
814 timer block
815 third filter selecting unit
820 output characteristics of flow-volume detecting circuit
821 internal calculation characteristics
822 output characteristics of flow-volume detecting apparatus

The invention claimed is:

1. A flow-volume detecting apparatus, comprising:
a flow-volume detecting unit which measures a flow volume of a measured fluid;
a flow-volume state determining unit which determines a flow-volume state of the measured fluid based on an output from the flow-volume detecting unit;
an average flow-volume calculating unit which calculates an average flow-volume value;
an amplitude quantity calculating unit which calculates an amplitude value of pulsation;
a plurality of filters which process a flow-volume signal; and
an amplitude ratio calculating unit which calculates a pulsation amplitude ratio which is a ratio of the amplitude value of pulsation to the average flow-volume value;
a frequency analyzing unit which analyzes a pulsation frequency, wherein the flow-volume state determining unit determines the flow-volume state based on at least the pulsation amplitude ratio and the pulsation frequency;
a filter selecting unit which selects a filter that processes the flow-volume signal, wherein the filter selecting unit selects the filter that processes the flow-volume signal according to the flow-volume state determined by the flow-volume state determining unit.

2. The flow-volume detecting apparatus according to claim 1, further comprising:
a pulsation correction filter which reduces the pulsation of the flow-volume signal as the plurality of filters; and
a noise reducing filter which reduces noise of the flow-volume signal,
wherein the filter selecting unit includes a first filter selecting unit which selects either the noise reducing filter or the pulsation correction filter, and
the first filter selecting unit adopts the pulsation correction filter when the pulsation amplitude ratio is larger than a predetermined threshold value and the pulsation frequency is larger than a predetermined threshold value and selects the noise reducing filter when the pulsation amplitude ratio is equal to or smaller than the predetermined threshold value and the pulsation frequency is equal to or smaller than the predetermined threshold value.

3. The flow-volume detecting apparatus according to claim 2, further comprising:
a moving average filter and a low pass filter as the noise reducing filter,
wherein the filter selecting unit includes a second filter selecting unit which selects either the moving average filter or the low pass filter in addition to the first filter selecting unit, and
the second filter selecting unit selects the moving average filter when the average flow-volume value is smaller than a predetermined threshold value and selects the low pass filter when the average flow-volume value is larger than the predetermined threshold value of the average flow-volume value, in a case in which the noise reducing filter is selected.

4. The flow-volume detecting apparatus according to claim 2, wherein the filter selecting unit includes a third filter selecting unit which selects any one of a flow-volume signal processed by the noise reducing filter or the pulsation correction filter selected by the first filter selecting unit and a flow-volume signal that is not processed by the noise reducing filter and the pulsation correction filter, and
the third filter selecting unit selects the flow-volume signal that is not processed by the noise reducing filter and the pulsation correction filter for a predetermined period of time when the pulsation amplitude ratio exceeds the predetermined threshold value.

5. The flow-volume detecting apparatus according to claim 2, wherein the filter selecting unit includes a third filter selecting unit which selects any one of a flow-volume signal processed by the noise reducing filter or the pulsation correction filter selected by the first filter selecting unit and a flow-volume signal that is not processed by the noise reducing filter and the pulsation correction filter, and
the third filter selecting unit selects the flow-volume signal that is not processed by the noise reducing filter and the pulsation correction filter when an output value of the amplitude ratio calculating unit is smaller than a predetermined threshold value and an output value of the frequency analyzing unit is larger than a predetermined threshold value and when the output value of the amplitude ratio calculating unit is larger than the predetermined threshold value and the output value of the frequency analyzing unit is smaller than the predetermined threshold value.

6. The flow-volume detecting apparatus according to claim 5, wherein the third filter selecting unit selects the flow-volume signal that is not processed by the noise reducing filter and the pulsation correction filter for a predetermined period of time when the pulsation amplitude ratio exceeds the predetermined threshold value.

7. The flow-volume detecting apparatus according to claim 2, further comprising:

a low pass filter which can set a plurality of cutoff frequencies as the noise reducing filter.

* * * * *